US011331818B2

(12) United States Patent
Meeker et al.

(10) Patent No.: US 11,331,818 B2
(45) Date of Patent: May 17, 2022

(54) REMOTELY CONTROLLED PACKABLE ROBOT

(71) Applicant: Foster-Miller, Inc., Waltham, MA (US)

(72) Inventors: David C. Meeker, Natick, MA (US); Timothy J. Mason, Uxbridge, MA (US); Andrew Kirouac, Chelmsford, MA (US); Christopher Leon, Somerville, MA (US); William Abraham Crowley, Pittsburgh, PA (US); Ryan Wasserman, Medford, MA (US)

(73) Assignee: Foster-Miller, Inc., Waltham, MA (US)

(*) Notice: Subject to any disclaimer, the term of this patent is extended or adjusted under 35 U.S.C. 154(b) by 366 days.

(21) Appl. No.: 16/594,791

(22) Filed: Oct. 7, 2019

(65) Prior Publication Data

US 2020/0114529 A1   Apr. 16, 2020

Related U.S. Application Data

(60) Provisional application No. 62/744,281, filed on Oct. 11, 2018.

(51) Int. Cl.
*B25J 13/00*  (2006.01)
*B25J 9/00*   (2006.01)
(Continued)

(52) U.S. Cl.
CPC ........... *B25J 19/023* (2013.01); *B25J 9/0009* (2013.01); *B25J 13/006* (2013.01); *B60L 50/60* (2019.02);
(Continued)

(58) Field of Classification Search
CPC ....... B60L 11/1838; B60L 50/60; B25J 5/005; B25J 9/0009; B25J 13/006; B25J 19/023;
(Continued)

(56) References Cited

U.S. PATENT DOCUMENTS 1,592,654 A   7/1926  Bremer
3,215,219 A  11/1965  Forsyth et al.
(Continued)

FOREIGN PATENT DOCUMENTS

CN   1861333 A   11/2006
CN   2933748 Y    8/2007
(Continued)

OTHER PUBLICATIONS

Written Opinion of the International Searching Authority for PCT Application No. PCT/US2018/040975 dated Sep. 18, 2018, five (5) pages.
(Continued)

*Primary Examiner* — Minnah L Seoh
*Assistant Examiner* — Felicia L. Brittman
(74) *Attorney, Agent, or Firm* — Iandiorio Teska & Coleman, LLP

(57) ABSTRACT

A remotely controlled packable robot includes a chassis, a motive subsystem for maneuvering the chassis, and an open channel under the robot defined by the chassis and the motive subsystem. A rearward arm base member mount is located between the chassis and a rotatable arm shoulder and is pivotable with respect to the chassis to store the arm underneath the robot in the open channel.

36 Claims, 62 Drawing Sheets

(51) Int. Cl.
*B60L 50/60* (2019.01)
*B62D 55/06* (2006.01)
*B25J 5/00* (2006.01)
*B62D 55/065* (2006.01)
*B25J 19/02* (2006.01)

(52) U.S. Cl.
CPC .............. *B25J 5/005* (2013.01); *B62D 55/06* (2013.01); *B62D 55/065* (2013.01)

(58) Field of Classification Search
CPC ...... B25J 55/065; B62D 55/06; B62D 55/065; H02J 7/0042; H02J 7/0045; H02J 7/0093; H02J 7/00306; H02J 7/00714; H02J 7/00716; H02J 50/10
USPC ........ 180/65.1; 320/116, 125, 132, 135, 166
See application file for complete search history.

(56) References Cited

U.S. PATENT DOCUMENTS

| | | | |
|---|---|---|---|
| 3,306,250 | A | 2/1967 | Pitchford |
| 3,417,832 | A | 12/1968 | Ziccardi |
| 3,869,011 | A | 3/1975 | Jensen |
| 4,337,846 | A | 7/1982 | Yonemoto et al. |
| 4,702,331 | A | 10/1987 | Hagihara et al. |
| 4,709,773 | A | 12/1987 | Clement et al. |
| 4,727,949 | A | 3/1988 | Rea et al. |
| 4,932,491 | A | 6/1990 | Collins, Jr. |
| 4,932,831 | A | 6/1990 | White et al. |
| 4,977,971 | A | 12/1990 | Crane, III et al. |
| 5,022,812 | A | 6/1991 | Coughlan et al. |
| 5,337,846 | A | 8/1994 | Ogaki et al. |
| 6,263,989 | B1 | 7/2001 | Won |
| 6,431,296 | B1 | 8/2002 | Won |
| 6,668,951 | B2 | 12/2003 | Won |
| 7,348,747 | B1 | 3/2008 | Theobold et al. |
| 7,475,745 | B1 | 1/2009 | DeRoos |
| 7,546,891 | B2 | 6/2009 | Won |
| 7,556,108 | B2 | 7/2009 | Won |
| 7,581,605 | B2 | 9/2009 | Caspi et al. |
| 7,597,162 | B2 | 10/2009 | Won |
| 7,926,598 | B2 | 4/2011 | Rudakevych |
| 8,074,752 | B2 | 12/2011 | Rudakevych |
| 8,100,205 | B2 | 1/2012 | Gettings et al. |
| 8,113,304 | B2 | 2/2012 | Won |
| 8,122,982 | B2 | 2/2012 | Morey et al. |
| 8,162,083 | B2 | 4/2012 | Iwaki et al. |
| 8,176,808 | B2 | 5/2012 | Fisk et al. |
| 8,201,649 | B2 | 6/2012 | Andrus et al. |
| 8,353,373 | B2 | 1/2013 | Rudakevych |
| 8,365,848 | B2 | 2/2013 | Won |
| 8,397,842 | B2 | 3/2013 | Gettings |
| 8,573,335 | B2 | 11/2013 | Rudakevych |
| 8,616,308 | B2 | 12/2013 | Morey et al. |
| 8,644,991 | B2 | 2/2014 | Ohm et al. |
| 8,763,732 | B2 | 7/2014 | Won |
| 9,014,874 | B2 | 4/2015 | Bruck et al. |
| 9,180,920 | B2 | 11/2015 | Rudakevych |
| 9,193,066 | B2 | 11/2015 | Ohm et al. |
| 9,211,648 | B2 | 12/2015 | Grinstead et al. |
| 9,216,781 | B2 | 12/2015 | Ohm et al. |
| 9,227,654 | B2 | 1/2016 | Wolf et al. |
| 9,248,874 | B2 | 2/2016 | Won |
| 9,248,875 | B2 | 2/2016 | Wolf et al. |
| 2004/0155554 | A1 | 8/2004 | Morgante |
| 2004/0168837 | A1 | 9/2004 | Michaud et al. |
| 2004/0216931 | A1 | 11/2004 | Won |
| 2004/0216932 | A1 | 11/2004 | Giovanetti et al. |
| 2007/0209844 | A1 | 9/2007 | Kamimura |
| 2008/0093131 | A1 | 4/2008 | Couture et al. |
| 2008/0179115 | A1 | 7/2008 | Ohm et al. |
| 2008/0196946 | A1 | 8/2008 | Filippov et al. |
| 2009/0071281 | A1* | 3/2009 | Fisk .................. B25J 13/06 74/490.03 |
| 2009/0266628 | A1 | 10/2009 | Schempf et al. |
| 2010/0267311 | A1 | 10/2010 | Zimet |
| 2011/0040427 | A1 | 2/2011 | Ben-Tzvi |
| 2011/0106339 | A1 | 5/2011 | Phillips et al. |
| 2011/0168460 | A1 | 7/2011 | Goldenberg et al. |
| 2012/0199407 | A1 | 8/2012 | Morey et al. |
| 2012/0200149 | A1 | 8/2012 | Rudakevych et al. |
| 2012/0215358 | A1 | 8/2012 | Gettings et al. |
| 2013/0078888 | A1 | 3/2013 | Mayer et al. |
| 2013/0152724 | A1 | 6/2013 | Mozeika et al. |
| 2013/0268118 | A1 | 10/2013 | Grinstead et al. |
| 2013/0340560 | A1 | 12/2013 | Burridge et al. |
| 2014/0231156 | A1 | 8/2014 | Rudakevych et al. |
| 2016/0176452 | A1 | 6/2016 | Gettings et al. |
| 2018/0079073 | A1 | 3/2018 | Meeker et al. |
| 2019/0009845 | A1 | 1/2019 | Nichol |

FOREIGN PATENT DOCUMENTS

| | | |
|---|---|---|
| EP | 0197020 A1 | 3/1986 |
| WO | 2018027219 A1 | 2/2018 |

OTHER PUBLICATIONS

Written Opinion of the International Searching Authority for PCT Application No. PCT/US17/51986 dated Jan. 18, 2018, six (6) pages.
Written Opinion of the International Searching Authority for PCT Application No. PCT/US17/52157 dated Nov. 27, 2017, four (4) pages.
Written Opinion of the International Searching Authority for PCT Application No. PCT/US2017/045736 dated Oct. 31, 2017, nine (9)) pages.
International Search Report for PCT/US2017/045736, dated Oct. 31, 2017, three (3) pages.
Lewis et al., "Chaos an Intelligent Ultra-Mobile SUGV: Combining the Mobility of Wheels, Tracks, and Legs", Proceedings of SPIE—The International Society for Optical Engineering May 2005, twelve (12) pages.
Cyberneticzoo.com, 1985-ACEC Mobile Inspection Vehicle (Belgian), http://cyberneticzoo.com/teleoperators/1985-acec-mobile-inspection-vehicle-french/, pp. 1/12-10/12, May 23, 2016.
Cyberneticzoo.com, 1976-MF3 Manipulator Vehicle-Kohler (German), http://cyberneticzoo.com/teleoperators/1976-mf3manipulator-vehicle-kohler-german/, pp. 1/19-17/19, May 23, 2016.
Mohebbi et al., "Design, Simulation and Manufacturing of a Tracked Surveillance Unmanned Ground Vehicle", Proceedings of the 2010 IEEE International Conference on Robotics and Biomimetrics, Dec. 14-18, 2010, Tianjin, China, pp. 1268-1275.
Rajabi et al., "Prediction of Obstacle Climbing Capability For Tracked Vehicles", Proceedings of the 2011 IEEE International Symposium on Safety, Security and Rescue Robotics, Kyoto, Japan, Nov. 1-5, 2011, pp. 128-133.
SuperDroid Robots, Robots, Parts, and Custom Solutions, Internet Archive WaybackMachine, May 11, 2016, https://web.archive.org/web/20081114172239/http://www.superdroidrobots.com/shop/item.asp?itemid=864, pp. 1-5.

\* cited by examiner

FIG. 13 Stowed

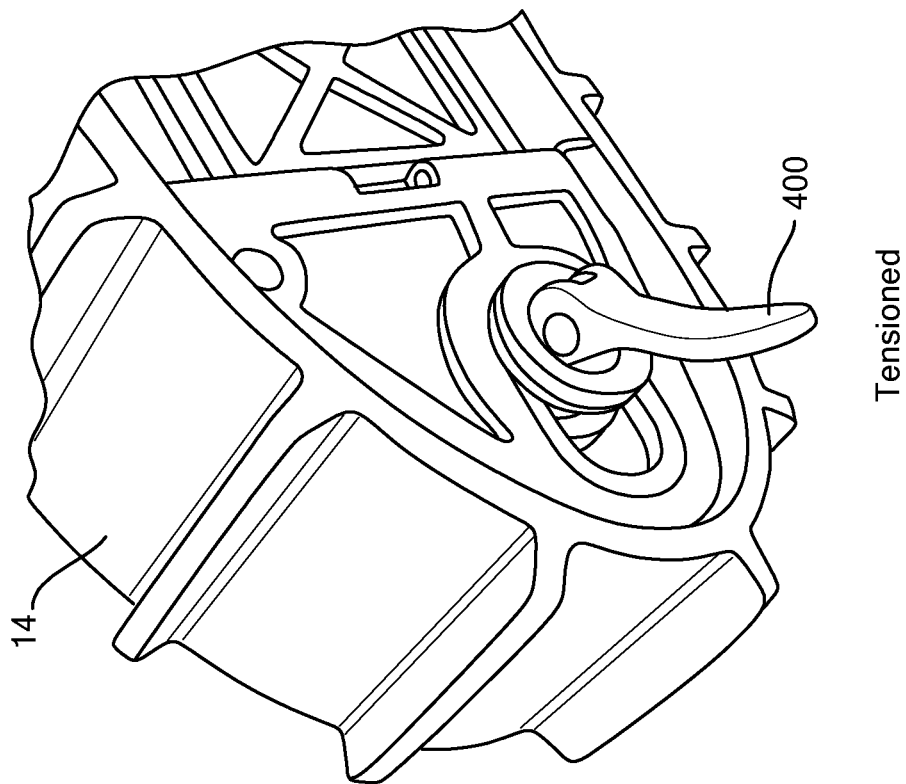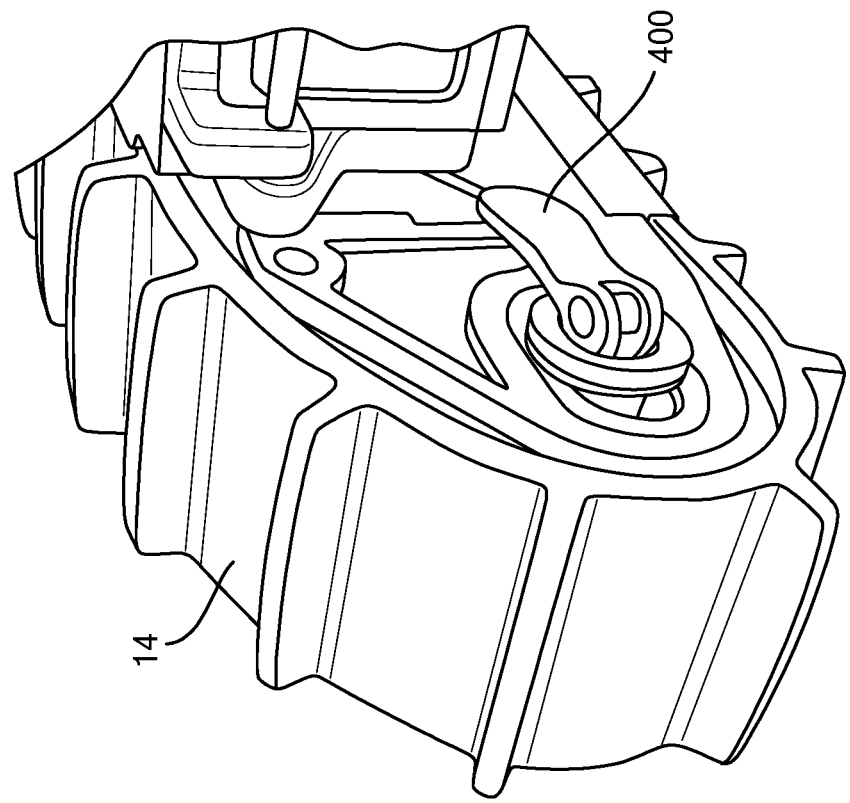
FIG. 50B

REMOTELY CONTROLLED PACKABLE ROBOT

RELATED APPLICATIONS

This application claims benefit of and priority to U.S. Provisional Application Ser. No. 62/744,281 filed Oct. 11, 2018, under 35 U.S.C. §§ 119, 120, 363, 365, and 37 C.F.R. § 1.55 and § 1.78, which is incorporated herein by this reference.

This application is also related to U.S. patent application Ser. No. 15/704,223 filed on Sep. 14, 2017 which claims the benefit of and priority to U.S. Provisional Application Ser. No. 62/396,990 filed Sep. 20, 2016 under 35 U.S.C. §§ 119, 120, 363, 365, and 37 C.F.R. § 1.55 and § 1.78, and is related to U.S. patent application Ser. No. 15/704,379 filed on Sep. 14, 2017 which claims the benefit of and priority to U.S. Provisional Application Ser. No. 62/397,055 filed Sep. 20, 2016 under 35 U.S.C. §§ 119, 120, 363, 365, and 37 C.F.R. § 1.55 and § 1.78. All said applications are incorporated herein by reference.

FIELD OF THE INVENTION

This subject invention relates to remotely controlled maneuverable ground robots.

BACKGROUND OF THE INVENTION

Several existing ground robots are fairly maneuverable but are fairly heavy and too large to fit in a soldiers backpack. See, for example, U.S. Pat. Nos. 8,201,649; 5,022,812 and 7,597,162 incorporated herein by this reference. Other robots are smaller in weight and can be placed in a backpack but are not maneuverable enough, for example, to easily climb stairs. See U.S. Pat. No. 9,180,920 and published U.S. Patent Application No. 2009/0266628 incorporated herein by this reference. See also WO/2018/027219 (PCT/US2017/1045736) incorporated herein by this reference.

BRIEF SUMMARY OF THE INVENTION

Featured is a lightweight, compact, man packable robot which in one example is highly mobile, unmanned, and can include advanced sensors and mission modules for dismounted forces. In one example, the ground robot is particularly useful for clearing buildings, caves, and other restricted terrain where close quarters combat is likely.

Featured is a remotely controlled packable robot comprising a chassis with a top surface and a bottom surface, a motive subsystem for maneuvering the chassis, and an open channel under the robot defined by the bottom surface of the chassis and the motive subsystem. There is a camera assembly and a robot arm including a rotatable shoulder, an upper arm pivotable with respect to the shoulder, a forearm, an elbow between the upper arm and the forearm, a wrist connected to the forearm, and a gripper attached to the wrist. A rearward arm base member mount between the chassis and the rotatable arm shoulder is pivotable with respect to the chassis to store the arm underneath the robot in the open channel. A forward camera assembly base member mount for the camera is pivotable with respect to the chassis to store the camera assembly underneath the robot in the open channel and there is an additional camera mount for retaining the camera assembly on the shoulder of the robot arm.

The arm shoulder camera mount preferably includes a socket member configured to engage and cover the robot shoulder. The camera mount may further include a camera mount member associated with the socket member and means for selectively positioning the camera mount member relative to the socket member. In one example means for selectively positioning includes two or more dovetail members on a side of the socket member and a channel in the camera mount member receiving a dovetail of the socket member therein. The camera mount member may further include a rail thereon and the camera assembly includes a clamp member securable to the rail and the camera assembly may include a spring portion for absorbing shock forces imparted at the camera assembly.

There may also be a latch assembly for the rearward arm base member mount including at least one ball portion on a stem upstanding from the chassis top surface and a biased slide moveable with respect to the rearward arm base member mount and including a channel receiving the ball member therethrough and terminating in a blade engaging the stem and the underside of the ball. There may also be camera mount latch assembly for the forward camera assembly base member mount including at least one ball member on a stem upstanding from the chassis top surface and a biased slide member movable with respect to the base member mount and including a channel receiving the ball member therethough and terminating in a blade engaging the stem and an underside of the ball. Also preferred is a latch assembly for releasably securing the forward camera assembly base member mount in its pivoted position a second ball member mounted to a sidewall portion of the chassis.

The robot may further include rotatable tracked flipper arms for maneuvering the chassis. The robot motive subsystem may include right and left main tracks. In one preferred embodiment, the robot includes an integrated drive assembly for each main track and flipper pair including a motor in a housing for rotating a flipper, and a stator and rotor disposed about the housing for driving a main track and a flipper track. A slip clutch is preferably attached to a flipper arm and driven by the motor via a gear train, the stator is affixed about the housing and includes teeth with windings thereabout, the rotor rotates about the housing and includes magnets therein, the rotor includes exterior teeth driving a main track, and a sprocket attached to the rotor drives a flipper track. The robot may further include a skid plate for each main track.

Also preferred is an electronics section, drive motors for the motive subsystem, first and second batteries each including a current draw limiting circuit preventing further power draw from the battery if the battery current draw exceeds a first current level, and a power distribution subsystem associated with the electronics section. The preferred power distribution subsystem includes a first stage configured to provide current to the robot electronics section, balance the current draw from the first and second batteries to the electronics section and drive motors, and limit the current draw from the first and second batteries to a second level less than the first current level. A second stage is configured to provide current to the robot drive motors and limit the current draw to a third level less than the second level. Further included is a motor controller for each drive motor configured to reduced the motor's power draw when current limiting is detected.

Also featured is a remotely controlled packable robot comprising a chassis with a top surface and a bottom surface, a pair of main side tracks for maneuvering the chassis, an open channel under the robot defined by the bottom surface of the chassis and the main tracks, a camera assembly, a robot arm including a rotatable shoulder, a robot arm base member mount between the chassis and the rotatable arm shoulder and pivotable with respect to the chassis to store the arm underneath the robot in the open channel, and a camera mount for retaining the camera assembly on the shoulder of the robot arm. The robot may further include a camera assembly base member mount pivotable with respect to the chassis.

Also featured is a remotely controlled packable robot comprising a chassis with a top surface and a bottom surface, a pair of main side tracks for maneuvering the chassis, an open channel under the robot defined by the bottom surface of the chassis and main tracks, a camera assembly, a robot arm, a rearward arm base member mount between the chassis and the rotatable arm shoulder and pivotable with respect to the chassis to store the arm underneath the robot in the open channel, and a camera mount for retaining the camera assembly on the robot arm.

Also featured is a remotely controlled robot comprising a chassis, a drive subsystem for the chassis including at least two drive motors, an electronics section in the chassis, first and second batteries each including a current draw limiting circuit preventing further power draw from the battery if the battery current draw exceeds a first current level. A power distribution subsystem is associated with the electronic section and includes a first stage configured to provide current to the robot electronics section, balance the current draw from the first and second batteries to the electronics section and drive motors, and limit the current draw from the first and second batteries to a second level less than the first current level, and a second stage configured to provide current to the robot drive motors, and limit the current draw to a third level less than the second level.

The subject invention, however, in other embodiments, need not achieve all these objectives and the claims hereof should not be limited to structures or methods capable of achieving these objectives.

BRIEF DESCRIPTION OF THE SEVERAL VIEWS OF THE DRAWINGS

Other objects, features and advantages will occur to those skilled in the art from the following description of a preferred embodiment and the accompanying drawings, in which.

DETAILED DESCRIPTION OF THE INVENTION

Figure 1:
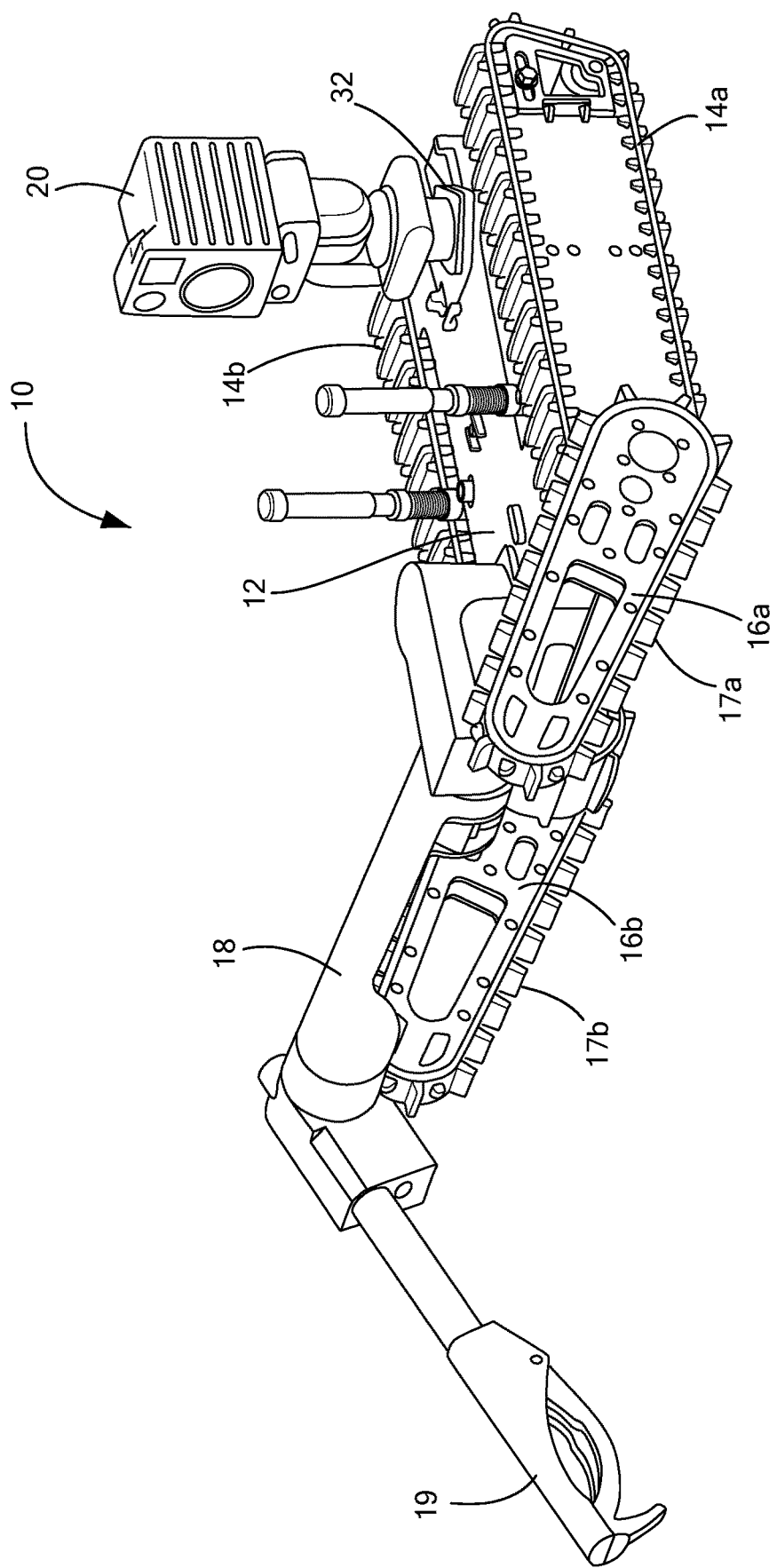
FIG. 1 is schematic view of an example of a remotely controlled packable ground robot in accordance with an example of the invention.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIG. 1 shows an example of a remotely controlled packable robot 10 including a chassis 12. A motive subsystem such as right 14a and left 14b main tracks maneuver the chassis as do optional right 16a and left 16b rearward rotatable flipper arms preferably each include a track. Robot arm 18 with end effector 19 and/or camera assembly 20 may also be included.

Figure 2:
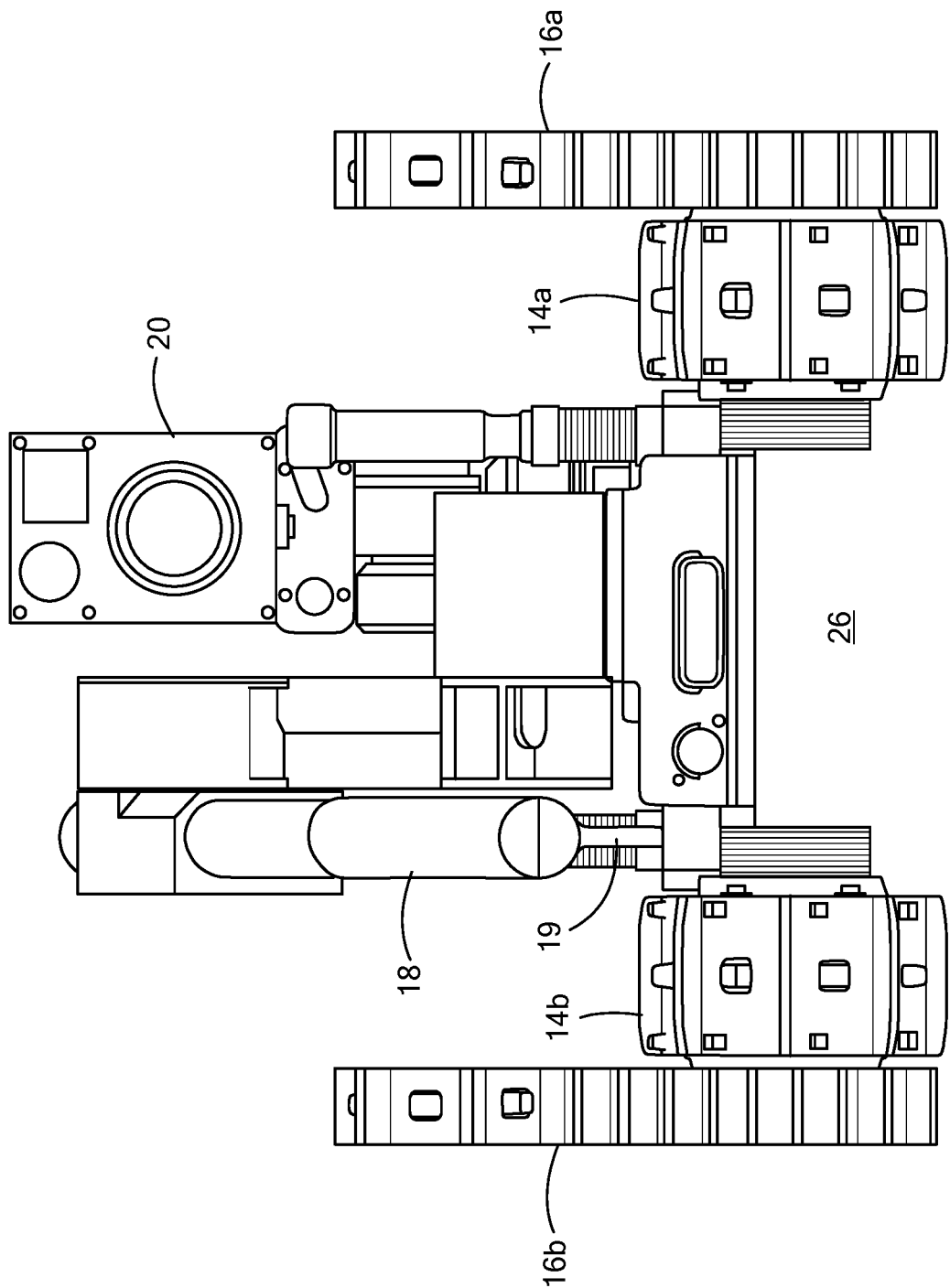
FIG. 2 is a schematic rear view of the robot shown in FIG. 1.

As shown in FIG. 2, chassis 12 is thin and plate-like in construction and includes top surface 22 and bottom surface 24 disposed high (e.g., three inches) above the ground for clearance over obstacles.

Figure 3:
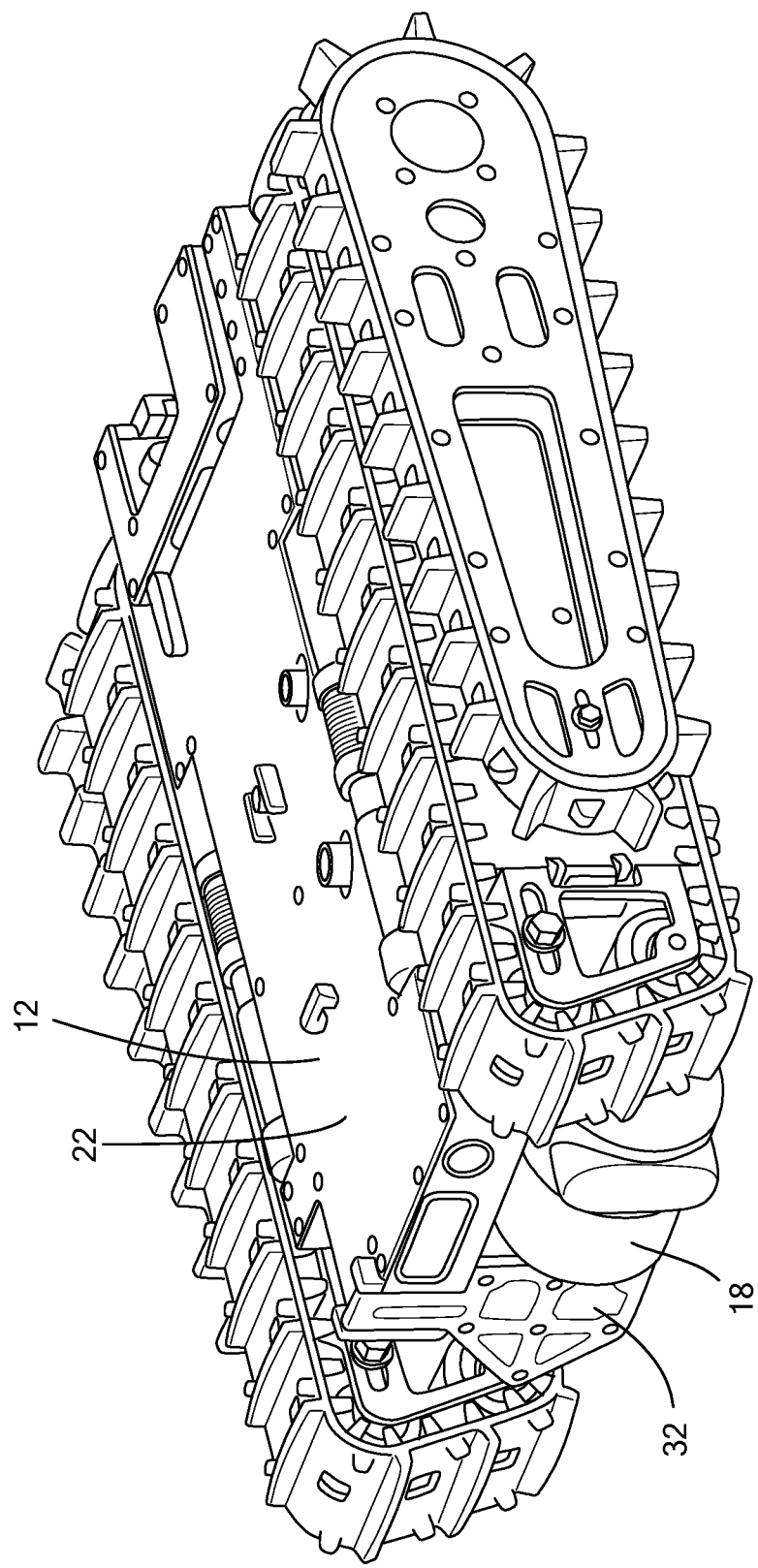
FIG. 3 is a schematic view showing the robot with its arm and camera assembly in their stowed position.

In this way, an open channel 26 under the robot is defined by the bottom surface 24 of the chassis 12 and between the main tracks 14a and 14b. For transport in a backpack by a dismounted soldier or user, both the robot arm 18 and the camera assembly 20 are folded underneath the robot chassis and reside almost completely in channel 26 as shown in FIG. 3.

Figure 4:
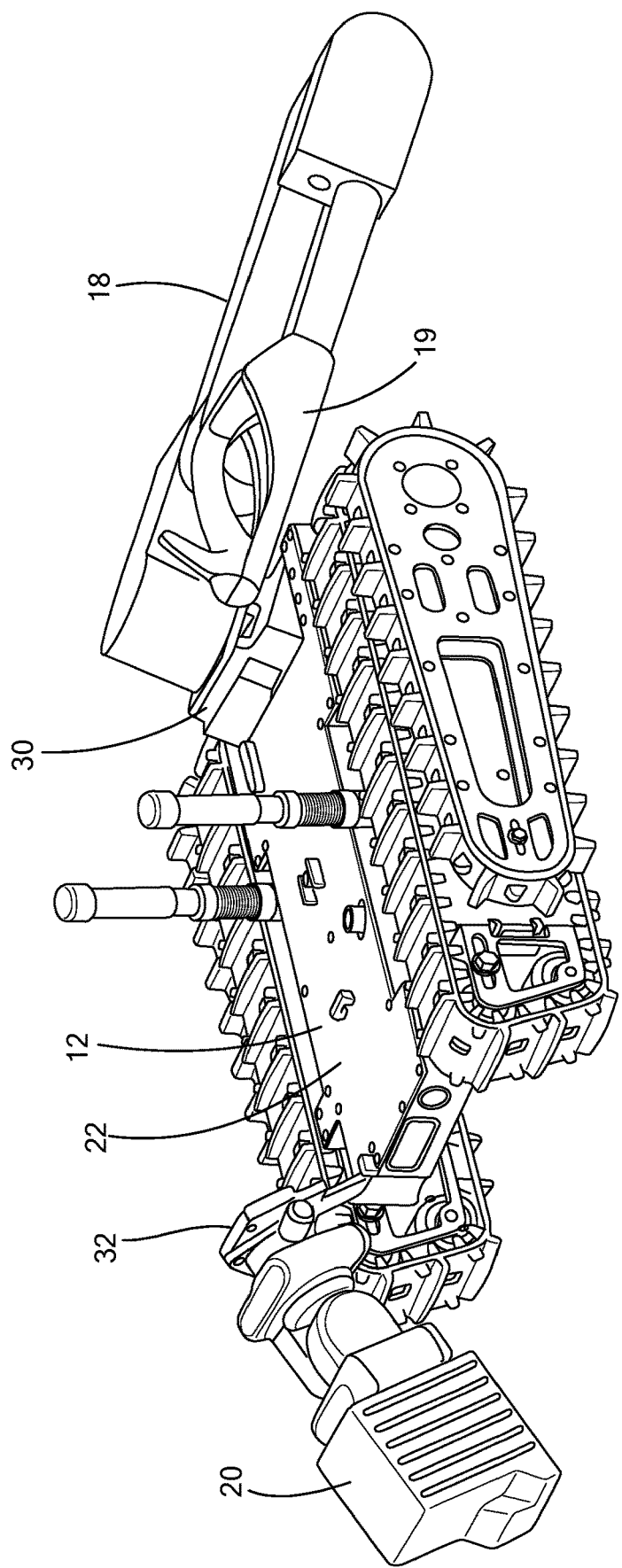
FIG. 4 is a schematic view of the robot showing the camera assembly and the robot arm being deployed.
Figure 5:
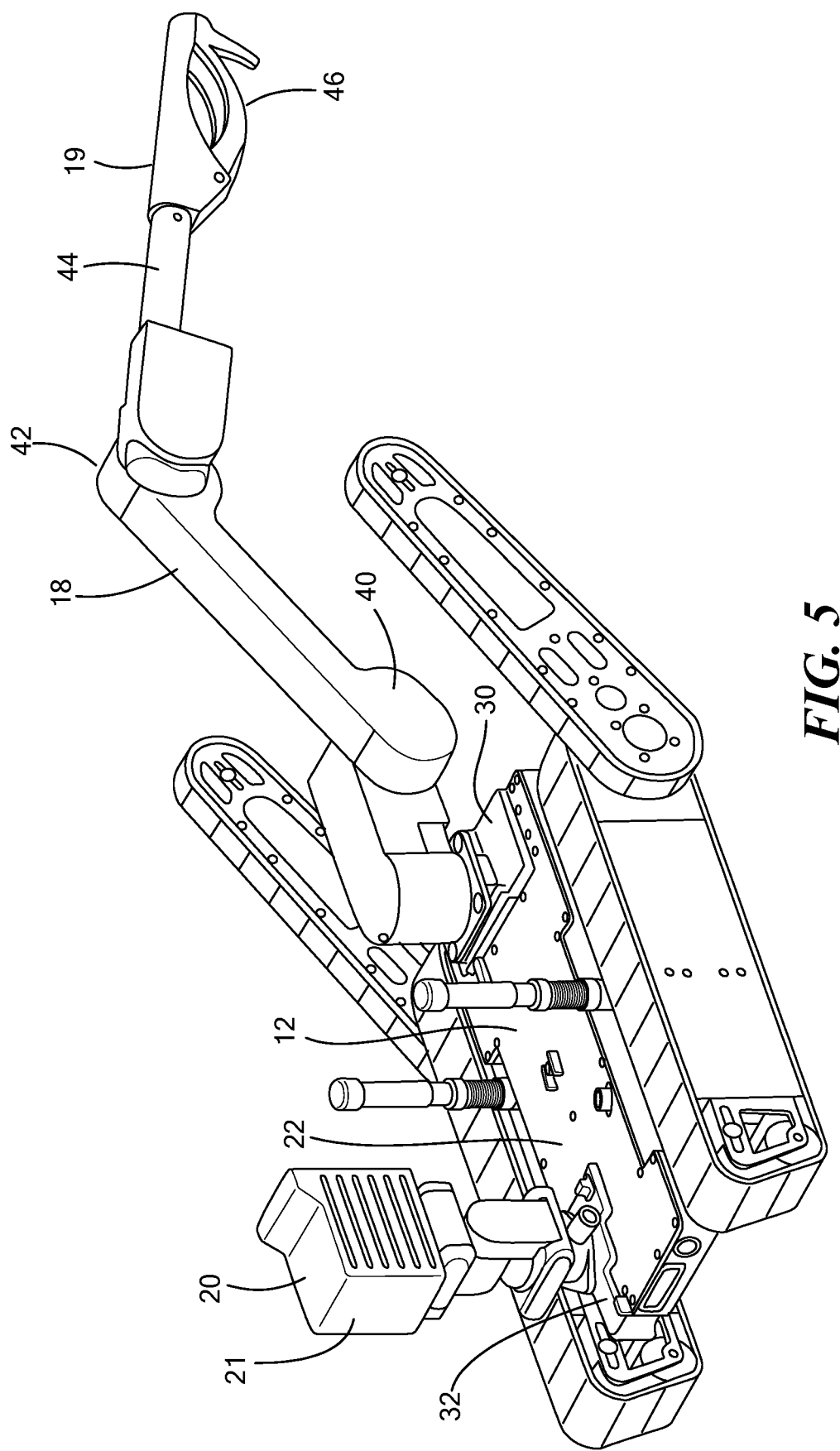
FIG. 5 is a schematic view showing the robot with the camera assembly and robot arm fully deployed.
Figure 6:
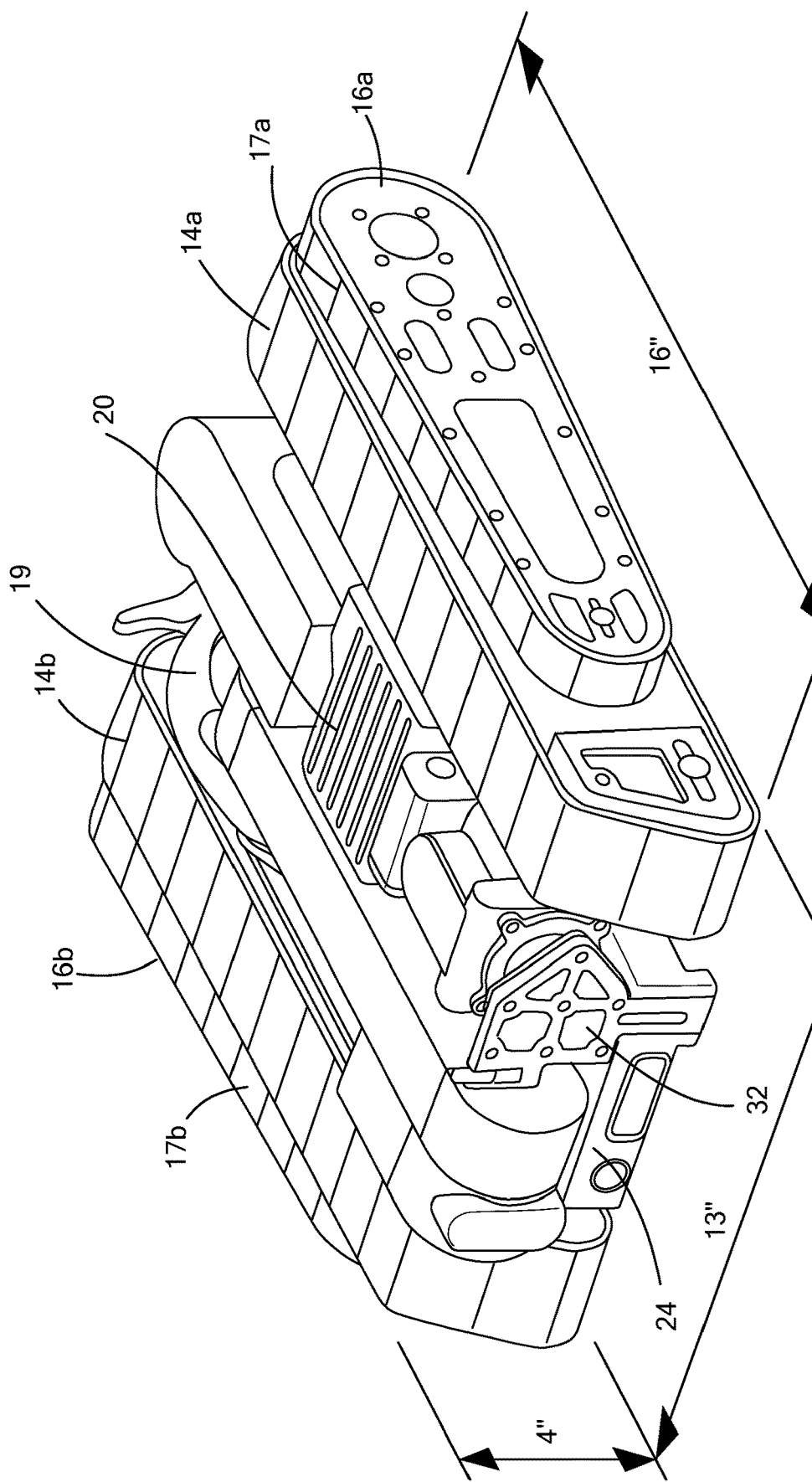
FIG. 6 is a another schematic view showing an example of the robot inverted with the camera assembly and robot arm in their stowed position in the underside of the robot.

In one preferred design, robot arm 18 is mounted onto the top of foldable base plate member 30, FIG. 4 rotatably coupled to the rear end of the chassis. In FIG. 5, the bottom of base plate member 30 is on the top of the chassis and the base plate member can be releasably secured to the top 22 of chassis 12 using, for example, a latch on chassis 12. Arm 18 is now in the deployed position extending upwards from the top surface of the chassis. In FIGS. 3 and 6, the arm base member 30 is folded relative to the chassis to a position depending downward from the chassis and the arm is stowed in the open channel under the robot next to the camera assembly.

Foldable base member plate 32 for the camera assembly 20 is rotatably coupled to the forward end of the chassis. The camera assembly 20 is coupled onto the top of this base member 32 and thus can be stowed as shown in FIGS. 3 and 6 in the open channel underneath the robot adjacent the robot arm and then deployed as shown in FIGS. 4 and 5 so camera assembly 20 extends upward from the top surface of the chassis. In FIG. 5, a latch can be used to releasably lock the bottom of camera assembly base member 32 into engagement with the top of the chassis. The robot arm and camera assembly can be manually stowed, deployed, and latched. Preferably, the base member plates 30, 32 rotate from a position where they lie on the top surface of the chassis to a position where they depend downward from an edge of the chassis (e.g., at a right angle to the plane of the chassis).

Figure 7:
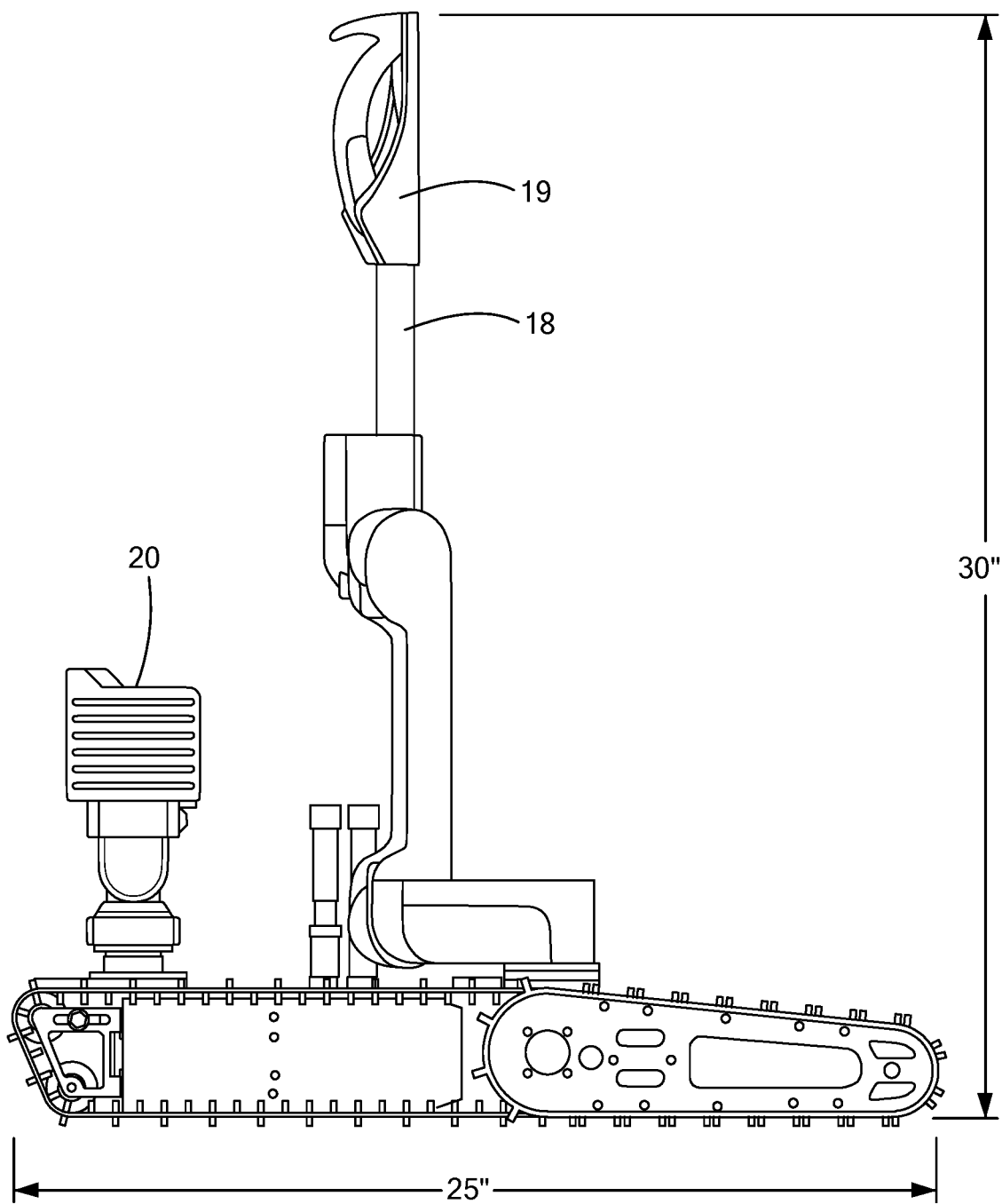
FIG. 7 is another schematic view showing the robot with the camera assembly and the robot arm deployed.

Preferably, the robot is approximately 4 inches tall and 13 inches wide and 16 long with the arm and camera assembly in the stowed position and with the flipper arms also stowed as shown in FIG. 6. In the deployed position shown in FIG. 7, the arm extends approximately 30 inches and the flippers when extended make the robot approximately 25 inches long enabling maneuverability over obstacles and, for example, up and down stairs.

Motors in the robot arm 18, FIG. 5 rotate shoulder 40 and elbow 42, rotate wrist 44 and open and close end effector 19 jaw 46. See also U.S. Pat. No. 8,176,808 incorporated herein by this reference. Camera assembly 20 may include motors to rotate and tilt the camera head 21 relative to base member 32. Camera head 20 may include a zoomable color camera as well as other imaging technology (e.g., infrared cameras, and the like).

Figure 8:
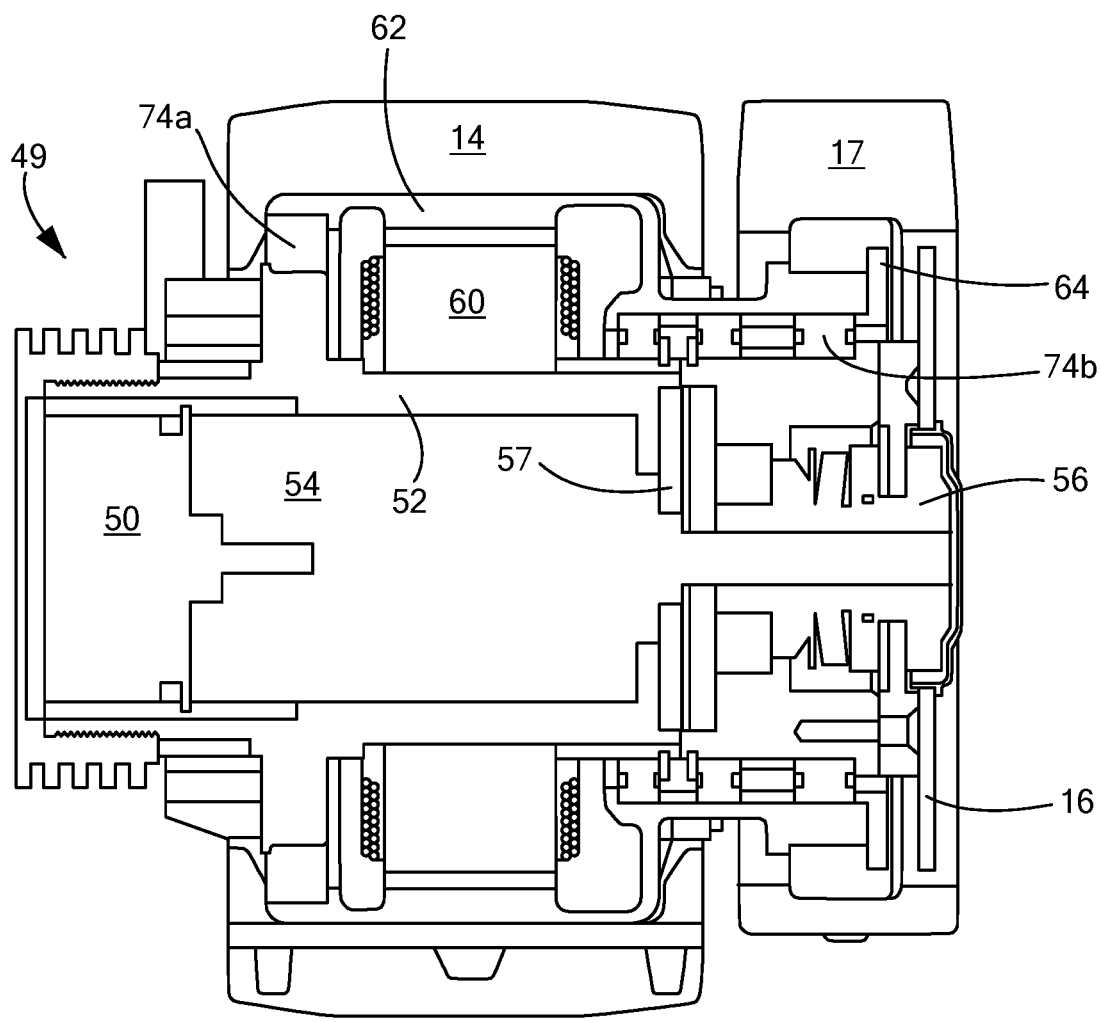
FIG. 8 is a schematic cross sectional view showing and example of a compact motor assembly in accordance with aspects of the invention.
Figure 9:
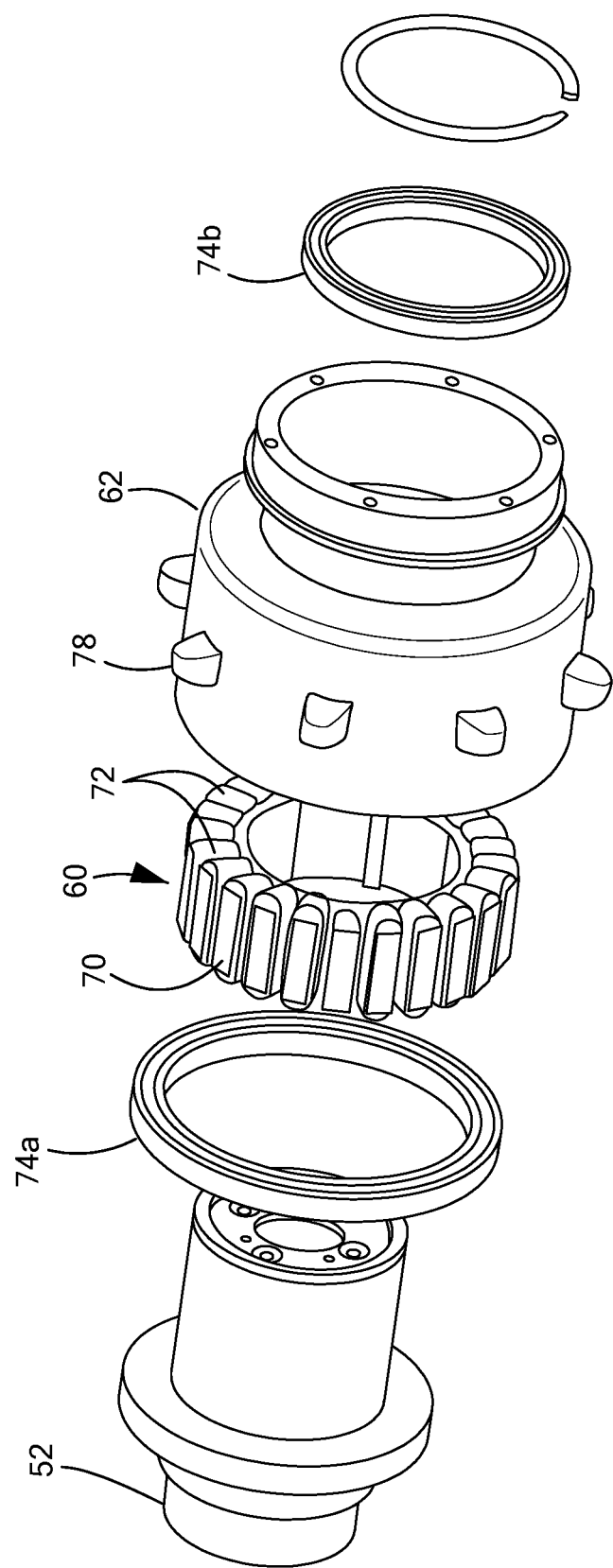
FIG. 9 is an exploded view of the drive motor.
Figure 10:
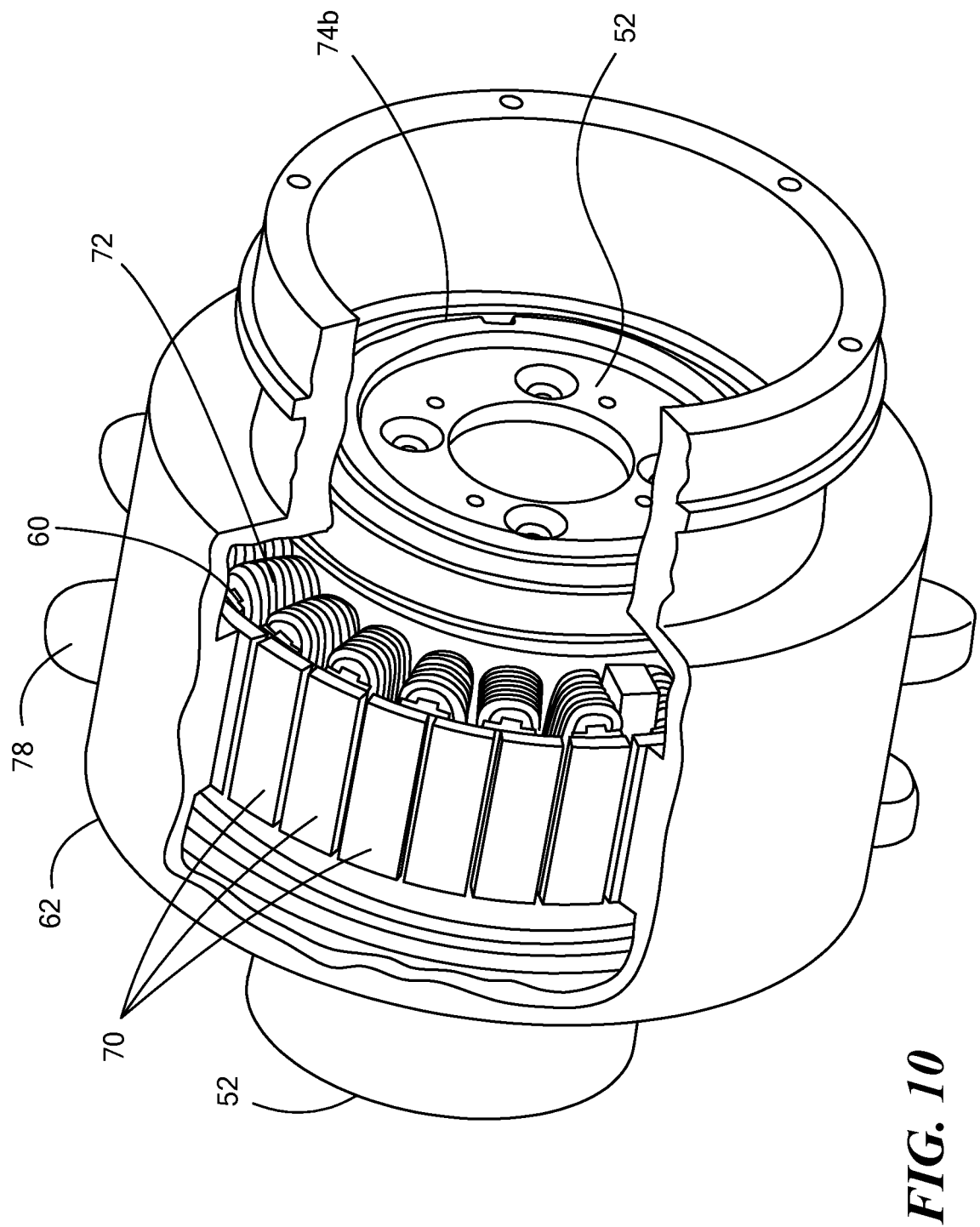
FIG. 10 is another view of the motor.

Preferably, when the flippers are incorporated, so too is an integrated concentric drive assembly 49 for each main track and flipper pair as shown in FIGS. 8-10. One such assembly, for example, would be mounted to the chassis to drive right track 14a, rotate right rear flipper 16a, and drive its track 17a. Another such assembly would be mounted to the chassis and used to drive left track 14b, rotate left rear flipper 16b and drive its track 17b.

Preferably electric motor 50 is disposed inside motor housing 52 (coupled to the chassis) and rotates a flipper arm 16 via planetary gear box 54 and slip clutch 56 which is fixed to flipper arm 16. Slip clutch 56 prevents damage to the flipper arm if the robot is dropped. Encoder 57 enables the absolute location of the flipper arm to be known. Stator 60 and rotor 62 are disposed about motor housing 52 for driving a main track 14 and the flipper track 17 via sprocket 64. Stator 60 and rotor 62 are concentric with motor 50 housing 52. In one design, stator ring 60 is a fixed about the housing 52 and includes teeth 70 each with a winding 72 thereabout. Rotor ring 62 can rotate about motor housing 52 via bearings 74a and 74b. Rotor 62 includes therein, inside the ring can, permanent magnets 80. Battery power is used to energize motor 50 and windings 72.

A main track 14 is disposed about rotor 62. Sprocket 64 has a flipper track 17 disposed about it. Sprocket 64 is coupled to rotor 62. In this way, rotation of the rotor rotates both a flipper track and a main track. Rotor 62 may include exterior teeth 78 for driving a main track.

Figure 11:
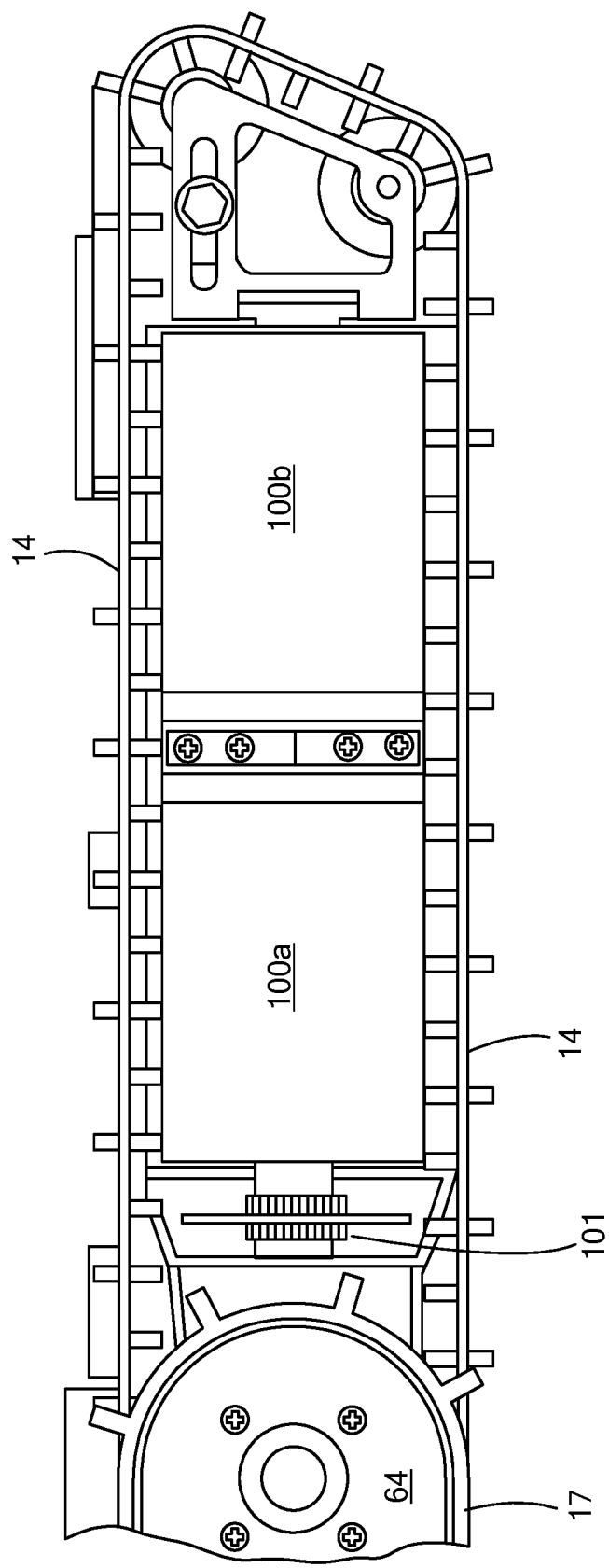
FIG. 11 is a schematic view showing an example of robot track side pods.

FIG. 11 shows two batteries 100a and 100b in a side pod disposed within a main track 14. Electronic speed controllers 101 can also be located in the side pod. This battery location provides a lower center of gravity for the robot and the batteries are hot swappable through a hinged door. Alternatively, a battery cage assembly slides into the sidepod. A track tensioning mechanism 102 is also shown.

Figure 12:
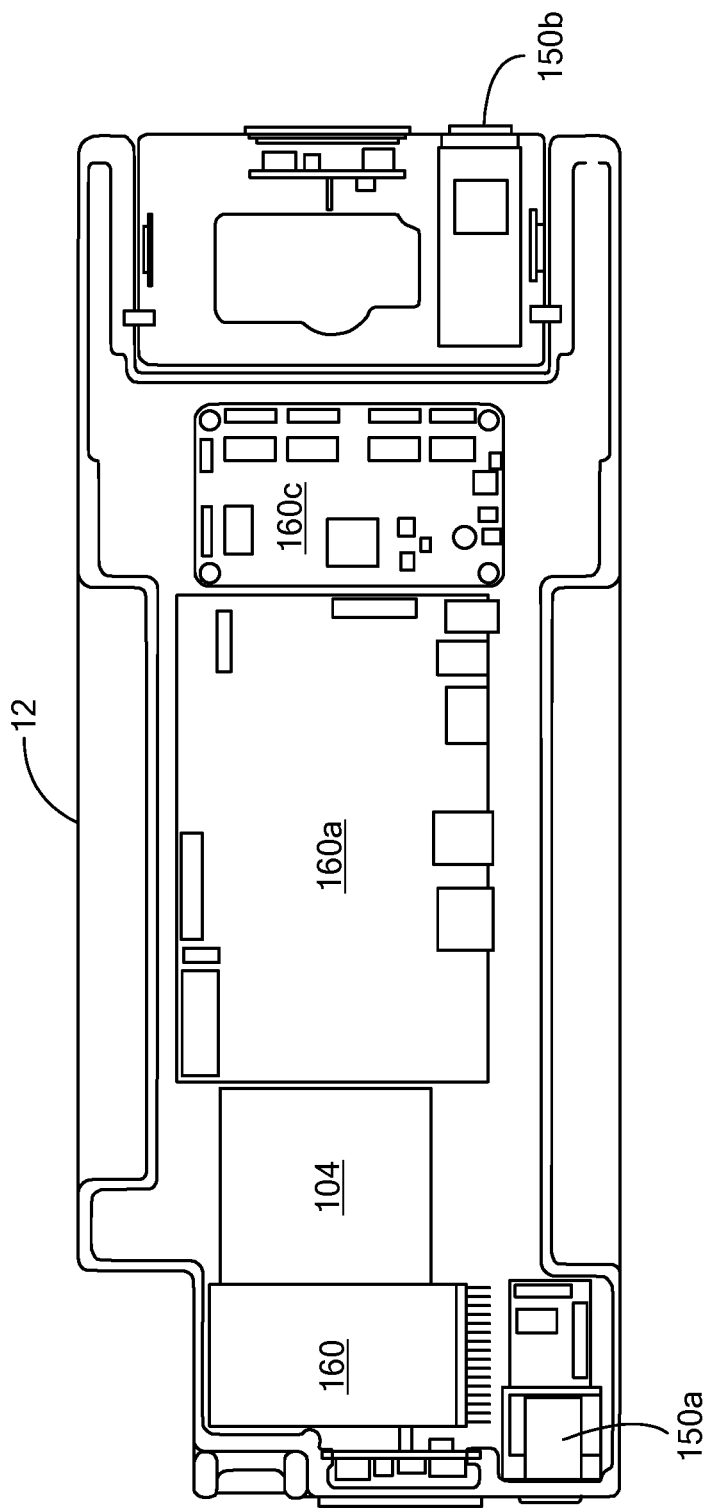
FIG. 12 is a schematic top view showing an example of the chassis component layout.

FIG. 12 shows an example of a chassis component layout including a radio 104 for remotely communicating with the robot and for transmitting video signals back to an operator control unit from the camera assembly. Various other cameras 150, printed circuit boards, and processor and controller boards 160a-160c are also shown. Pixhawk (real-time controller with integrated inertial measurement unit), Ethernet switch, and Nitrogen (embedded Linux board) boards may be used. An example of an operator control unit is shown in U.S. Pat. No. 9,014,874 incorporated herein by this reference. In some embodiments, an operator control unit may include a hardened military style tablet device.

Figure 13:
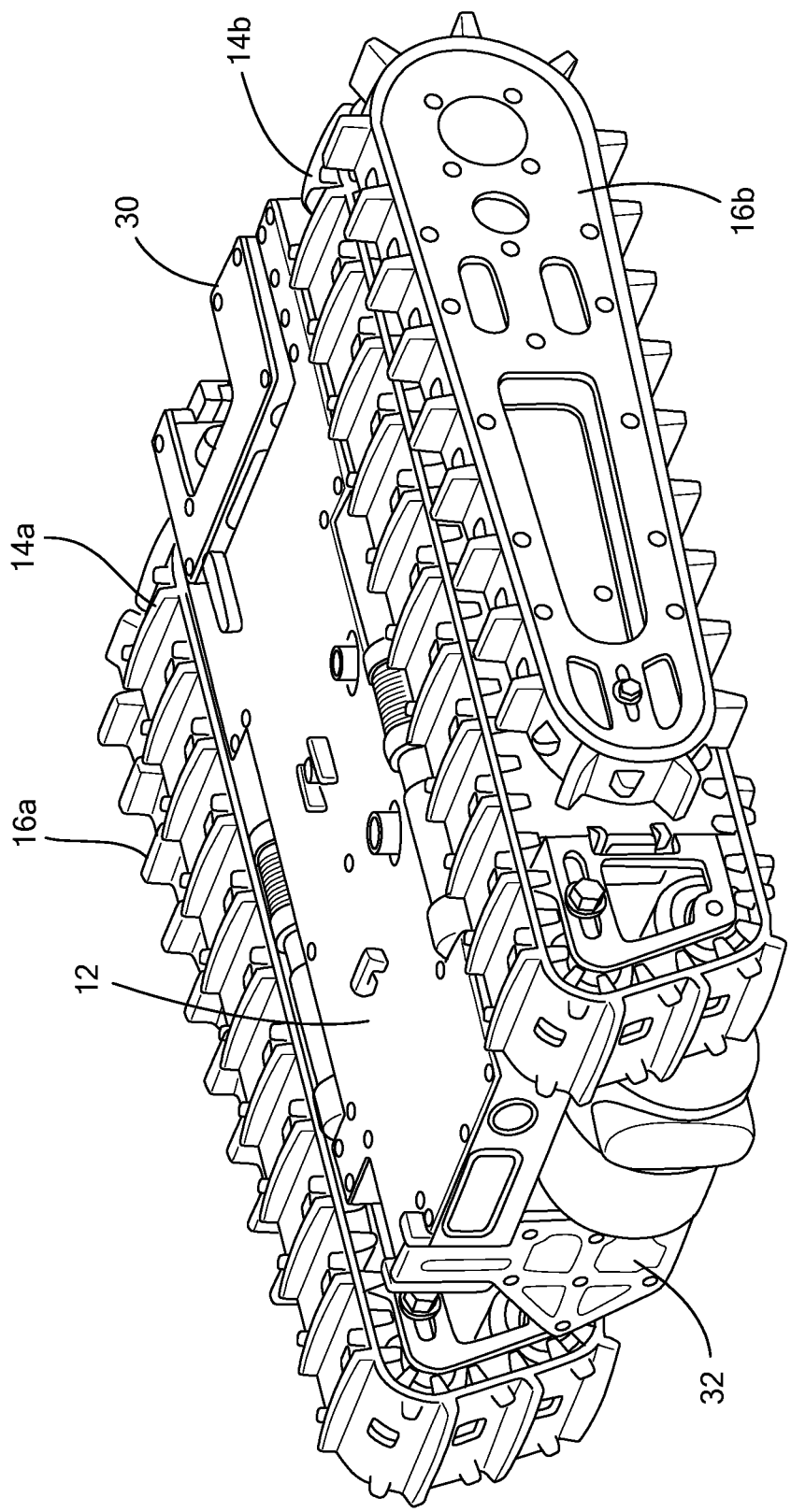
FIGS. 13-16 are schematic views showing various configuration options for a robot in accordance with examples of the invention.
Figure 14:
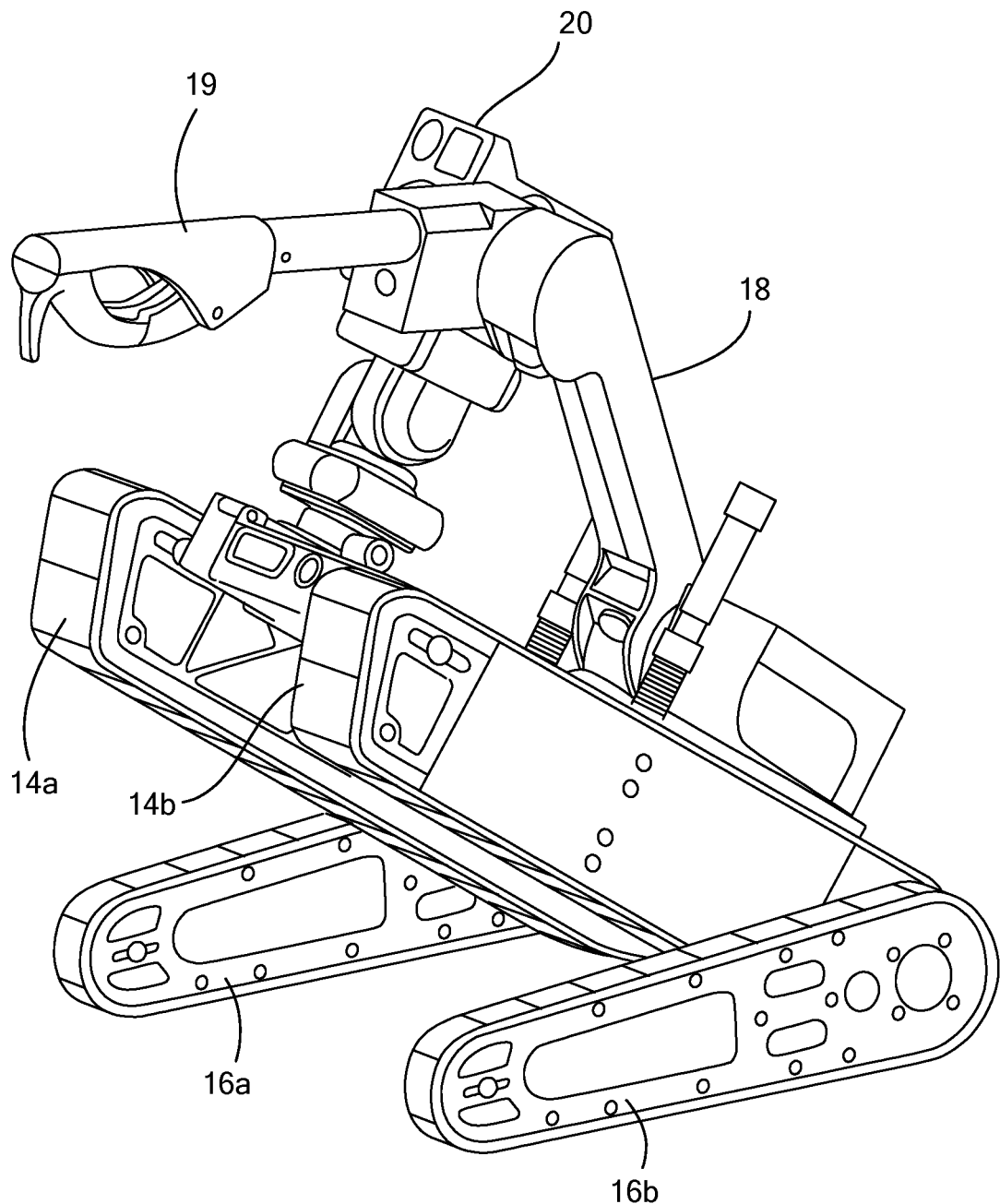
Figure 15:
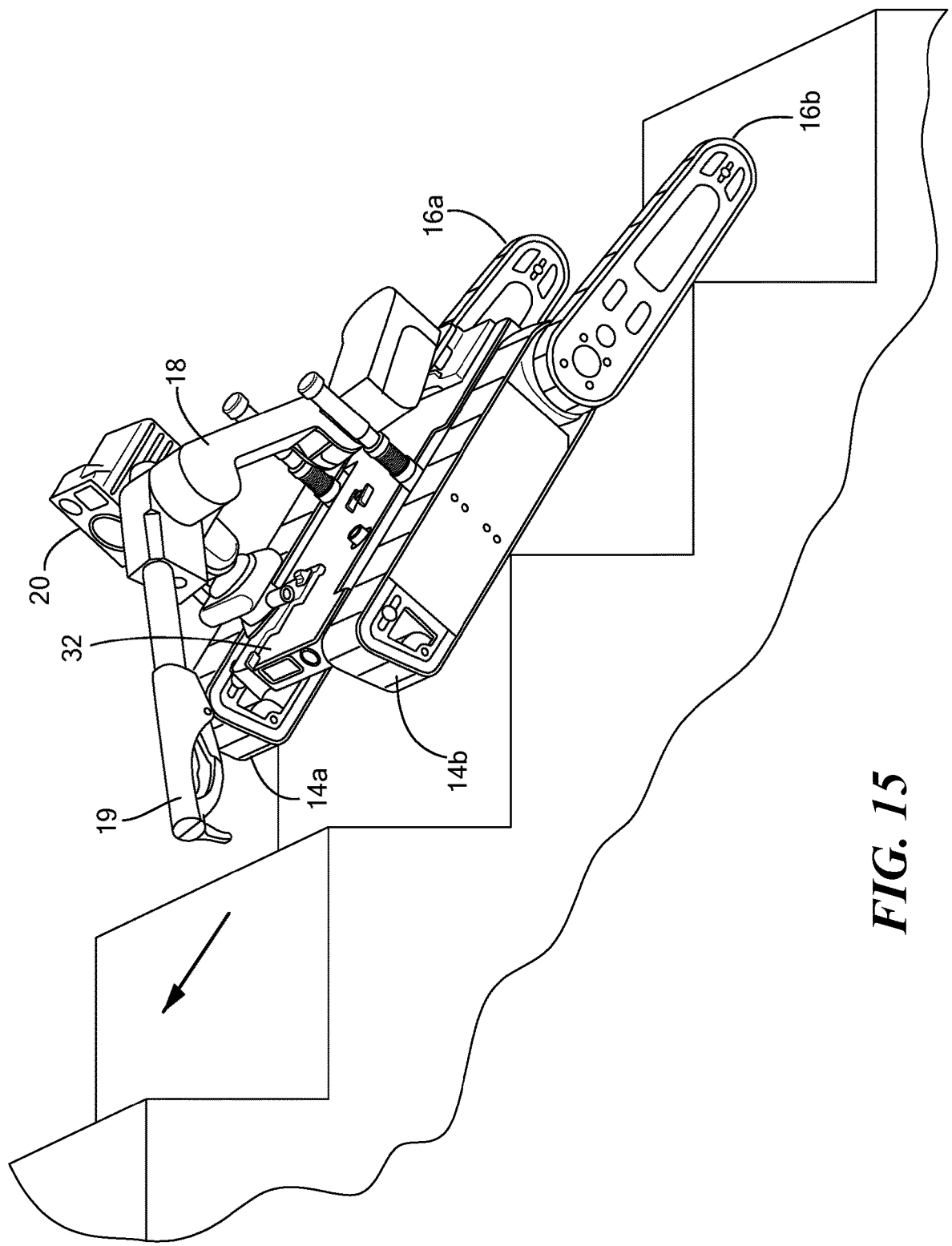
Figure 16:
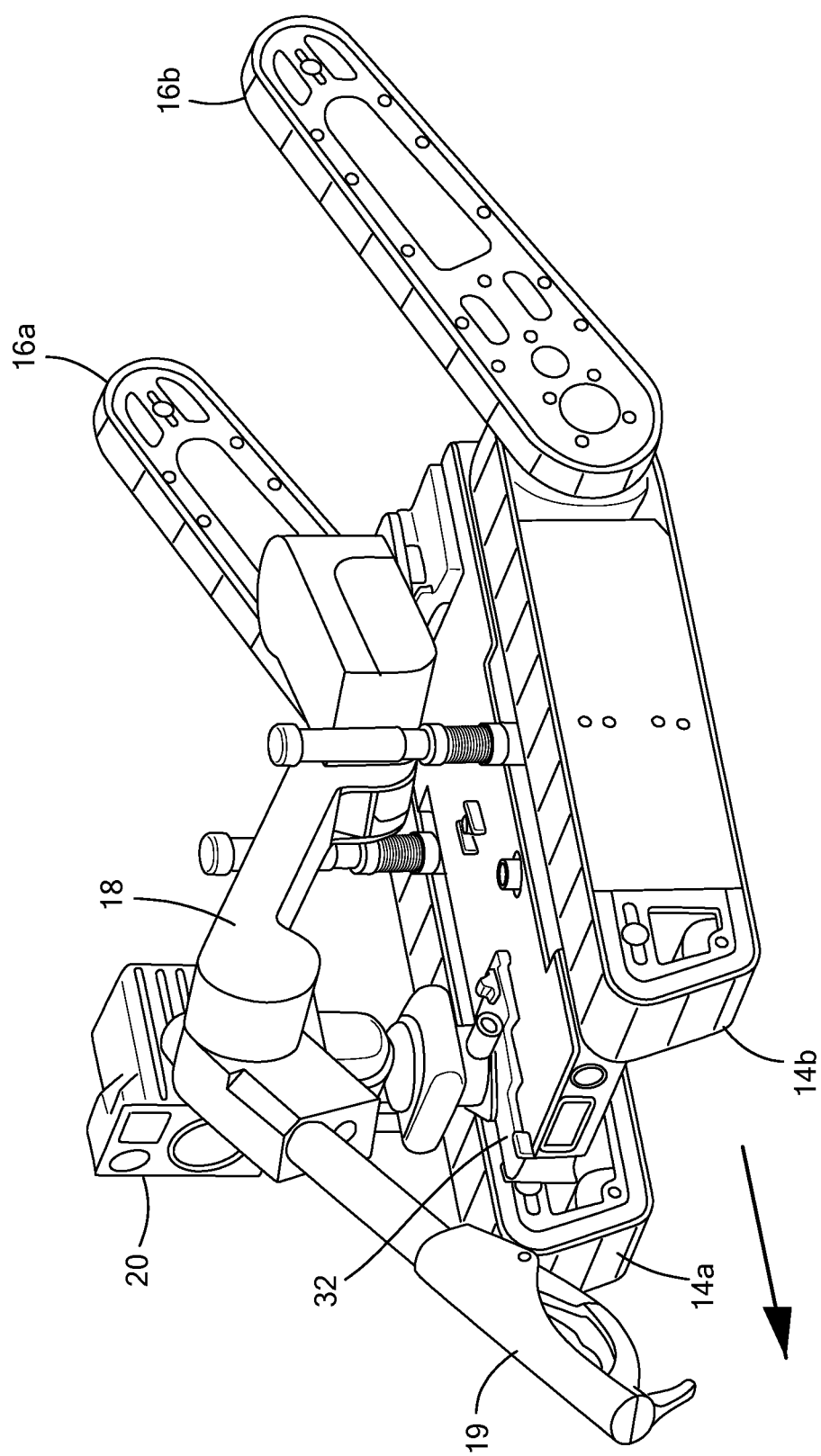
Figure 17:
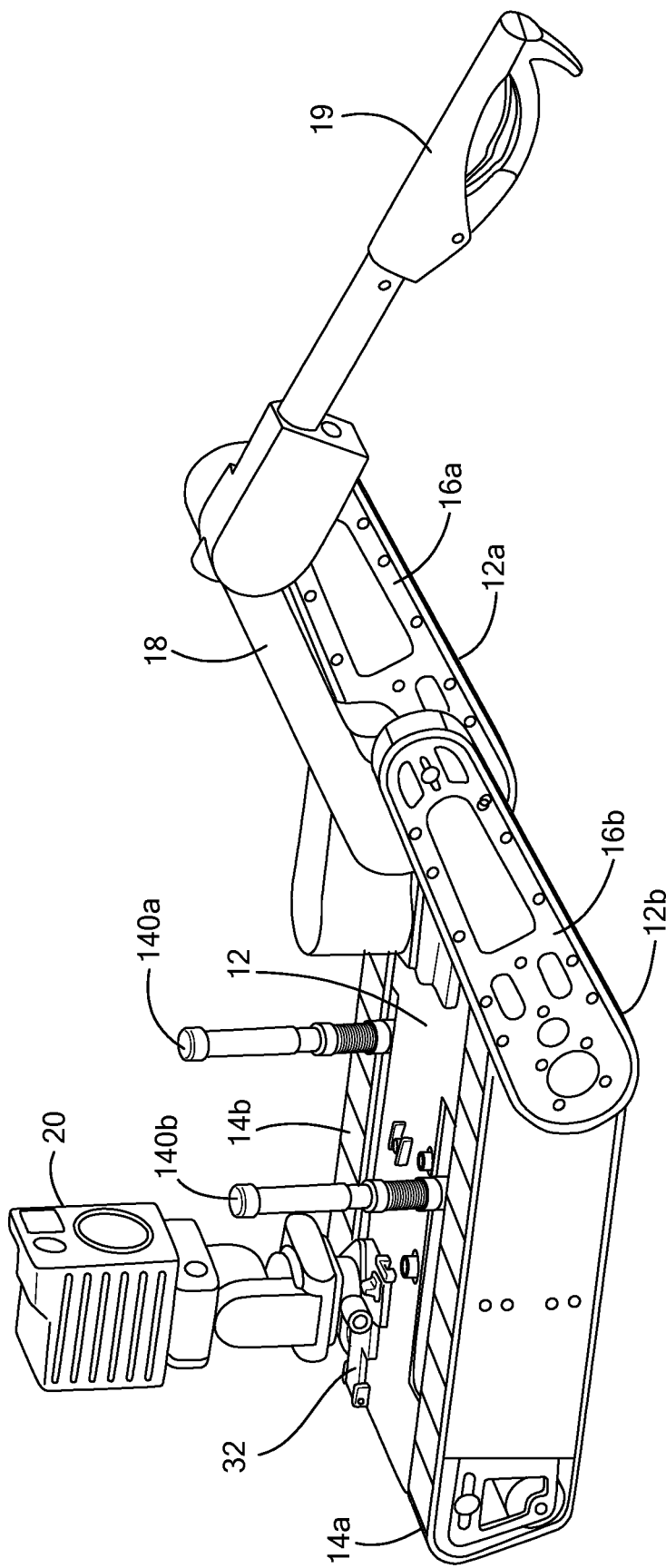
FIGS. 17-29 are views of another embodiment of one example of the robot.
Figure 18:
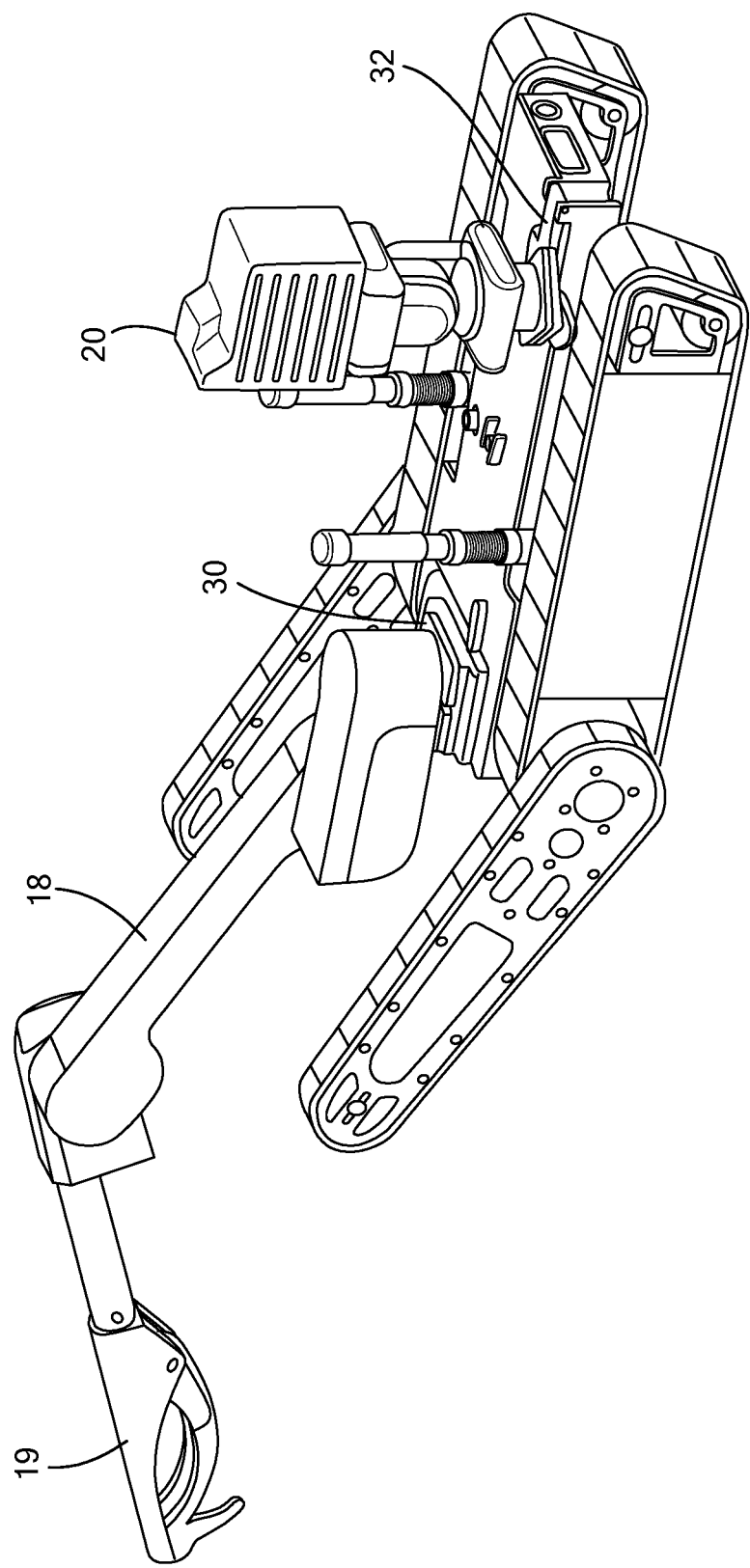

FIGS. 13-16 show various configuration options for the robot. In FIG. 13, the camera and arm are stowed underneath the robot chassis and the flippers 16a, 16b are rotated to be adjacent main tracks 14a, 14b for storage and transport of the robot. In FIG. 14, the camera assembly 20 and robot arm 18 are deployed and the flippers 14a, 14b are rotated into position to lift the forward end of the robot to initiate stair climbing or to surmount a large obstacle. FIG. 15 shows the flippers 16a, 16b rotated straight behind the robot for stabilizing the robot during climbing stairs. FIG. 16 shows the position of the flipper arms for normal operation.

Preferably, the weight of the combined system is less than 32 pounds with the operator control unit weighting less than 5 pounds. In the folded configuration, the robot fits in a tactical or assault backpack (MOLLE brand or others) which is approximately 16 inches high, 13 inches wide, and 4 inches thick. In one example, the MOLLE Assault Pack II NSN number is: 8465-01-580-0981. The robot can climb and descend 8.5 inch by 10 inch stairs, is self righting, and has a very low center of gravity. At the same time, the robot has a fairly high ground clearance.

In one example, motor 50 is an EC 32 Flat (339268) motor and 531:1 and gear box 54 is a 531:1 32C Planetary Gear Head available from Maxon Precision Motors, Inc. The chassis and side pods may be made of aluminum, the tracks can be made of polyurethane, and the flippers may be made of carbon fiber. The arm may be 4 pounds total weight, have a maximum reach of 26 inches and 5 pound lift capability at full extension. Preferably, non-back drivable gear boxes with slip clutches are used in the arm. The chassis may include cameras on the front, rear, and/or sides, for example, video and/or thermal cameras. The camera assembly may be equipped with a video camera, have a 360° continuous pan range, clockwise and counter clockwise rotation and a tilt range of −45° to +90°. Illumination sources, thermal cameras, and the like can also be equipped with the camera assembly.

FIGS. 17-27 show another embodiment of the robot where the base member 32 for the camera assembly includes a rotatable arm to which the camera assembly is attached. In this embodiment, the chassis also includes a U-shaped cut-out at the rear end thereof defining two spaced arms. The base member plate for the robot arm is located in the cut-out and is hinged between the two chassis arms and flips upside down relative to the chassis to store the arm underneath the robot. FIGS. 17-27 also show various latch mechanisms for retaining the robot arm and the camera assembly in their deployed positions on the top of the chassis.

Figure 19:
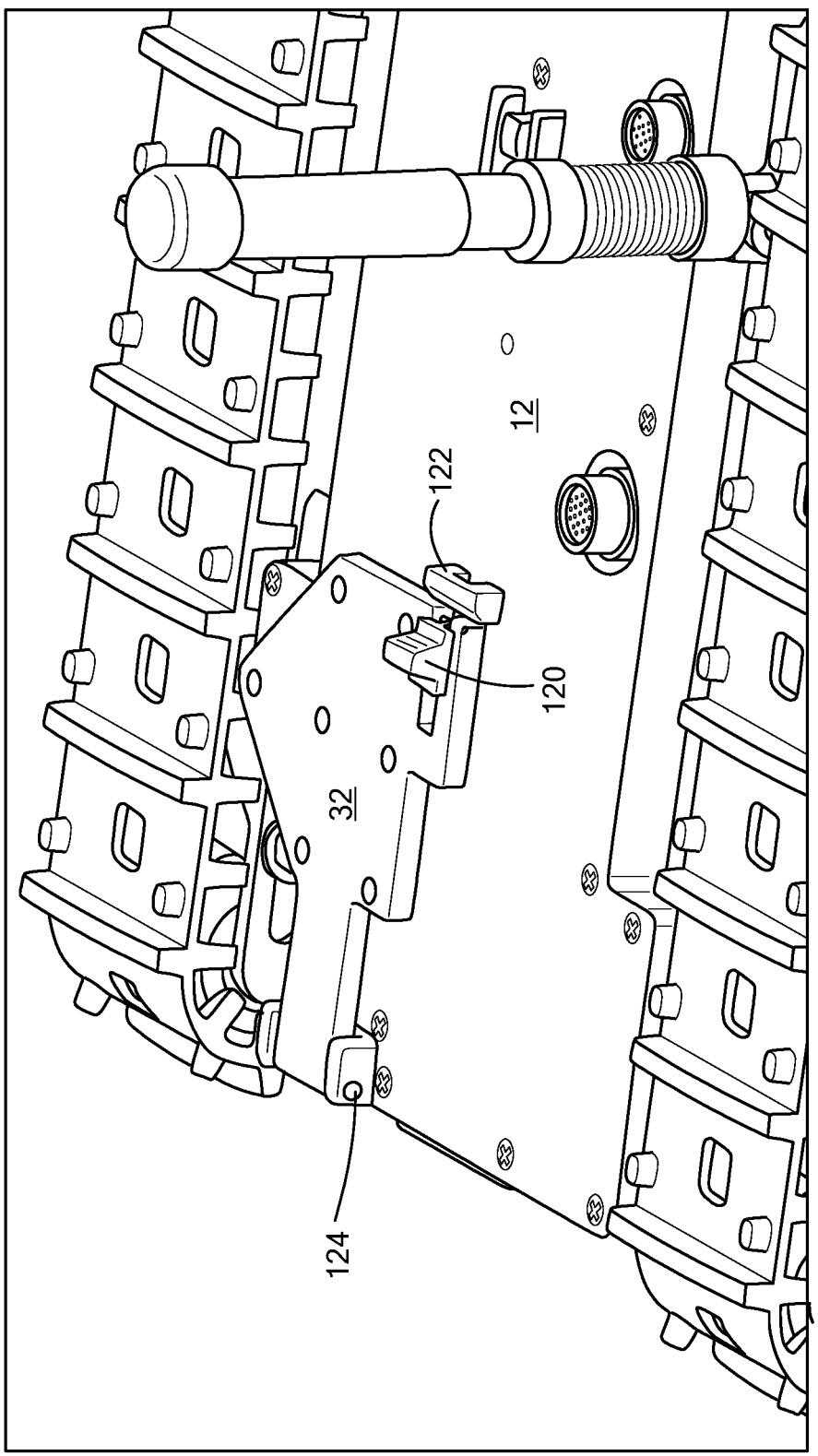
Figure 20:
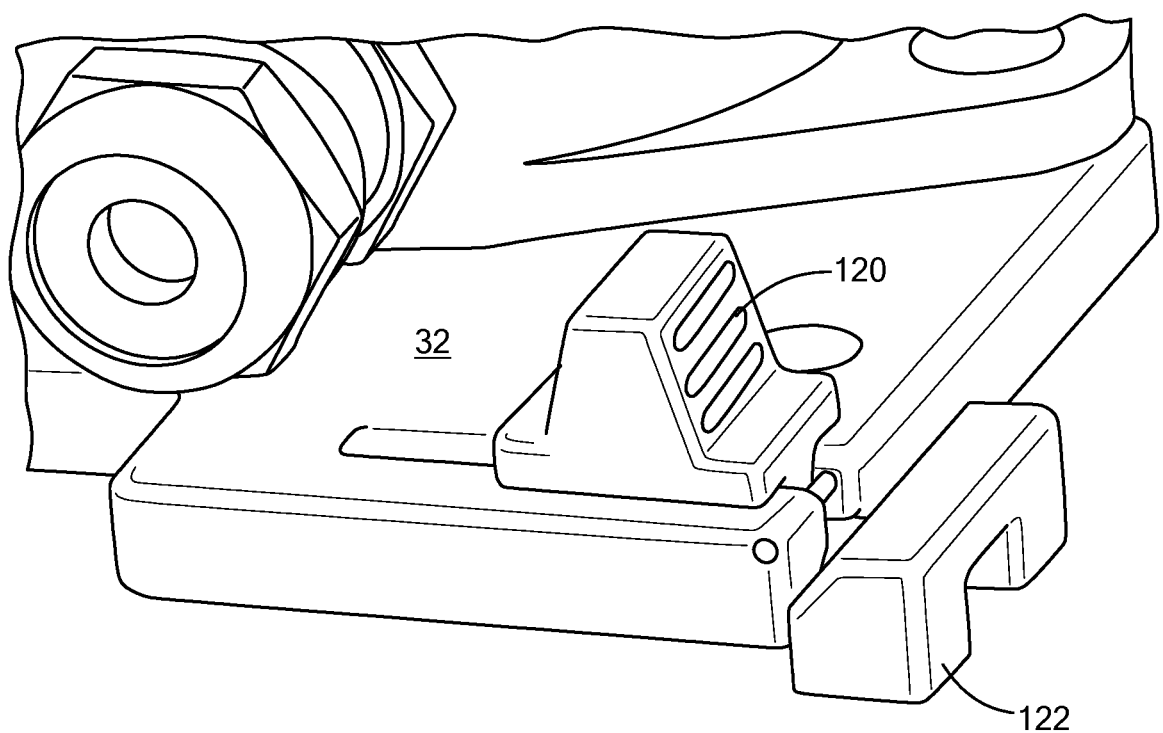

A spring loader slider 120, FIGS. 19-20 on member 32 can be used in connection with latch 122 on chassis 12 to releasably lock member 32 on top of chassis 12. Member 32 pivots about hinge 124 when released.

Figure 21:
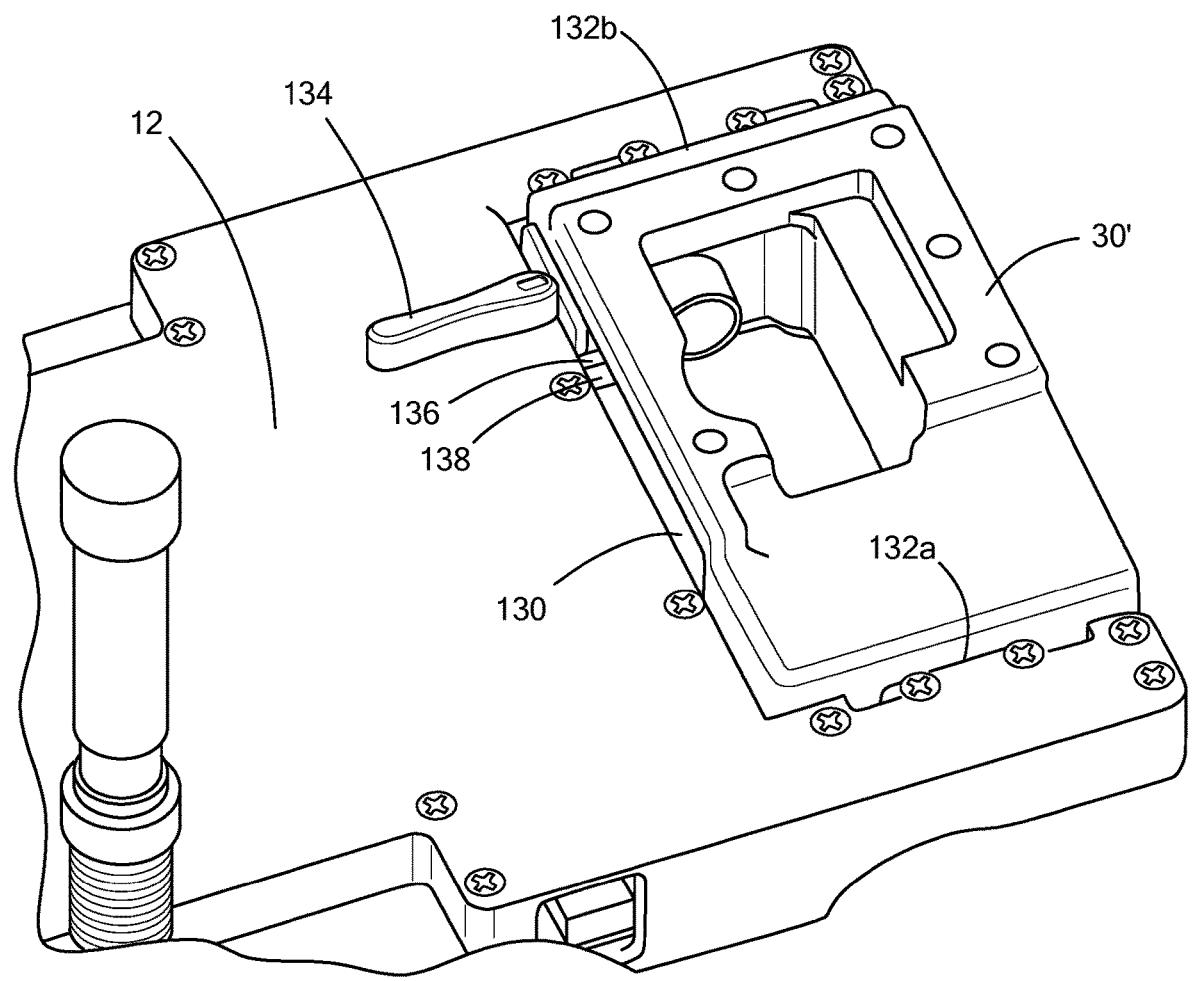
Figure 22:
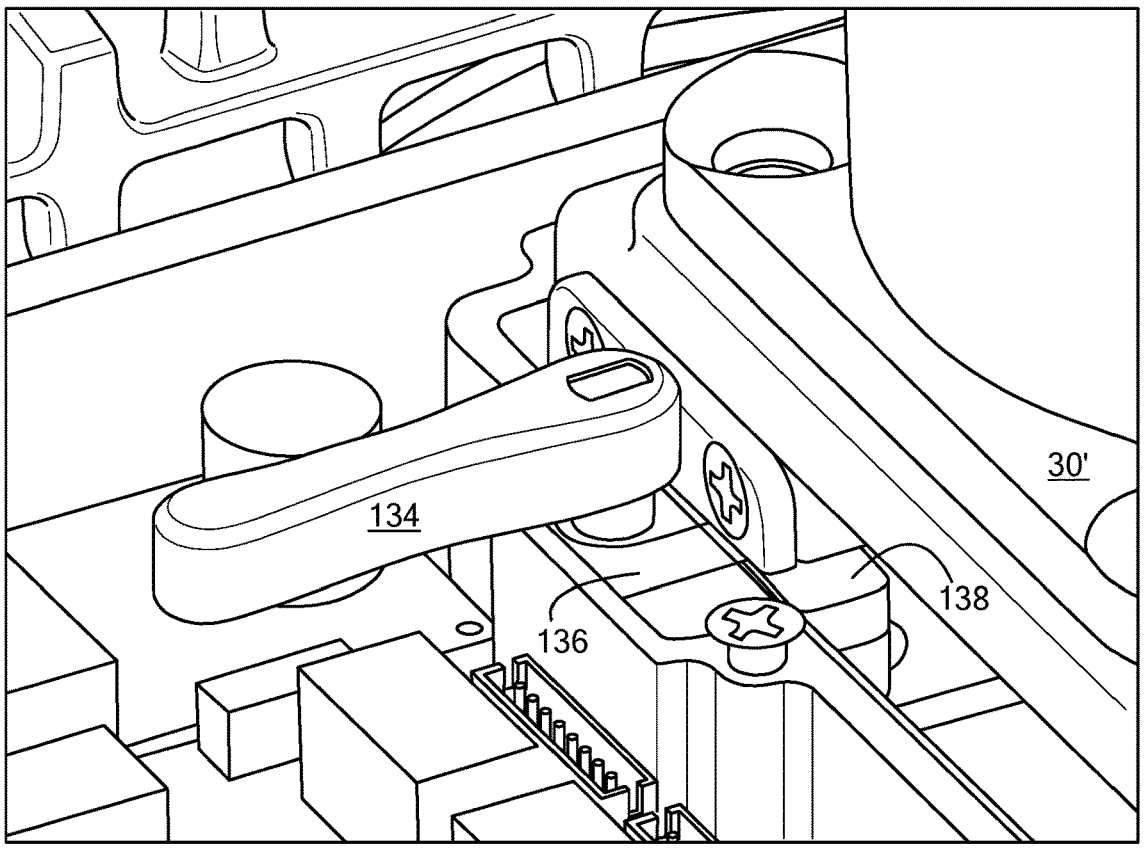
Figure 23:
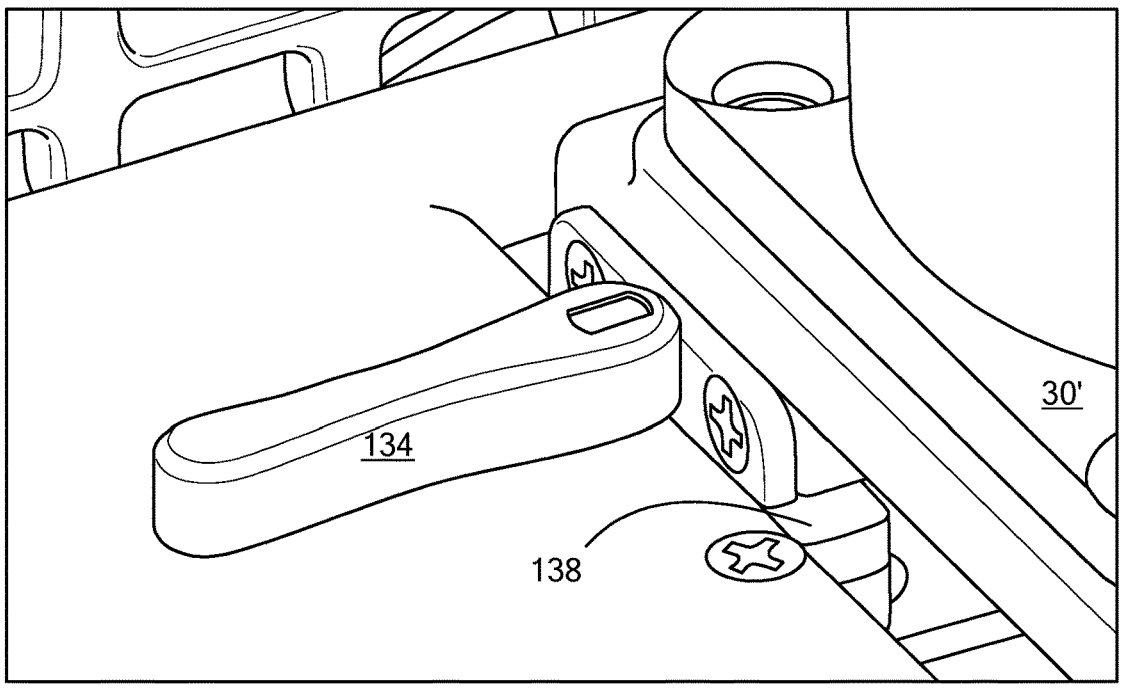
Figure 24:
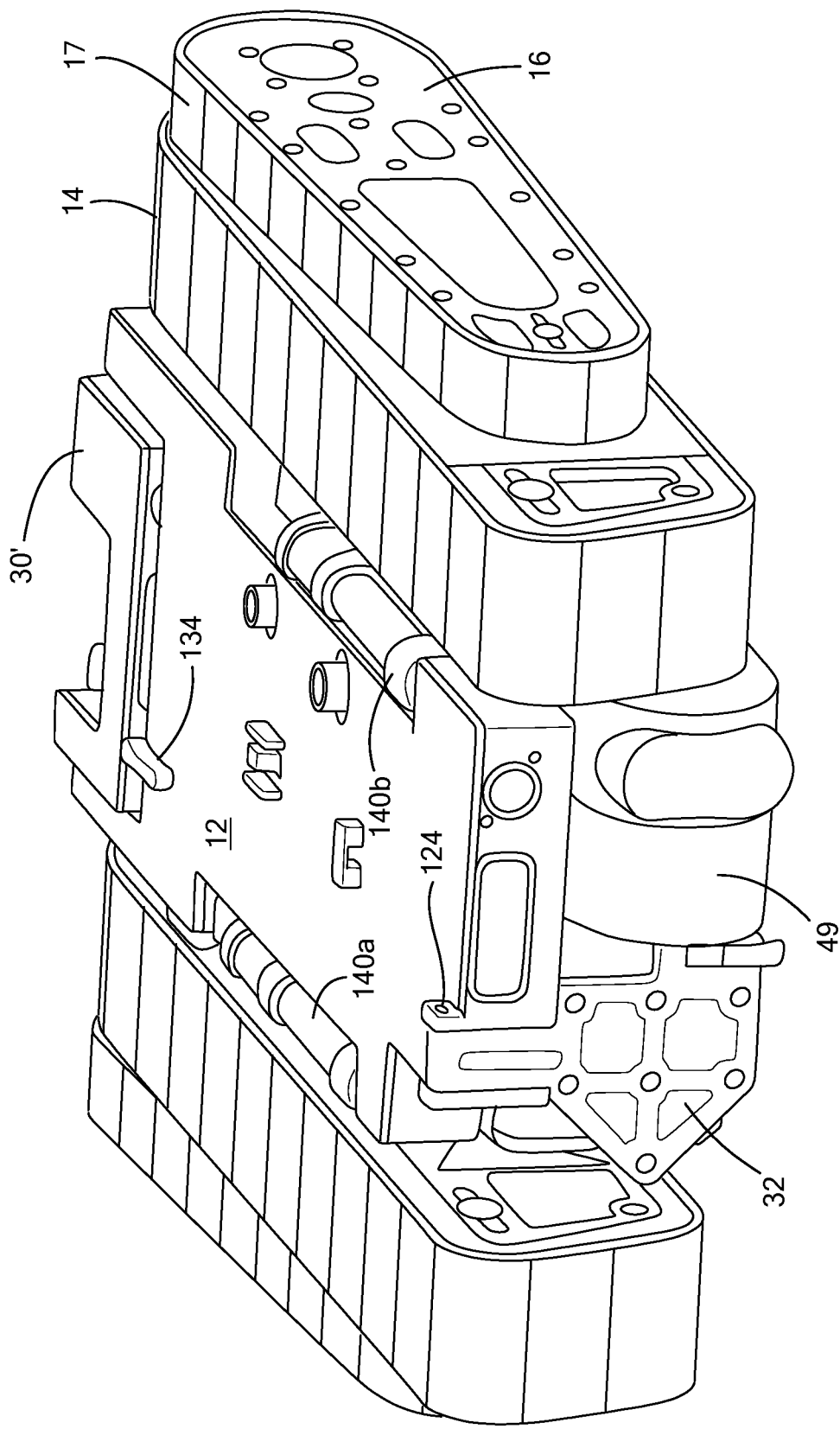
Figure 25:
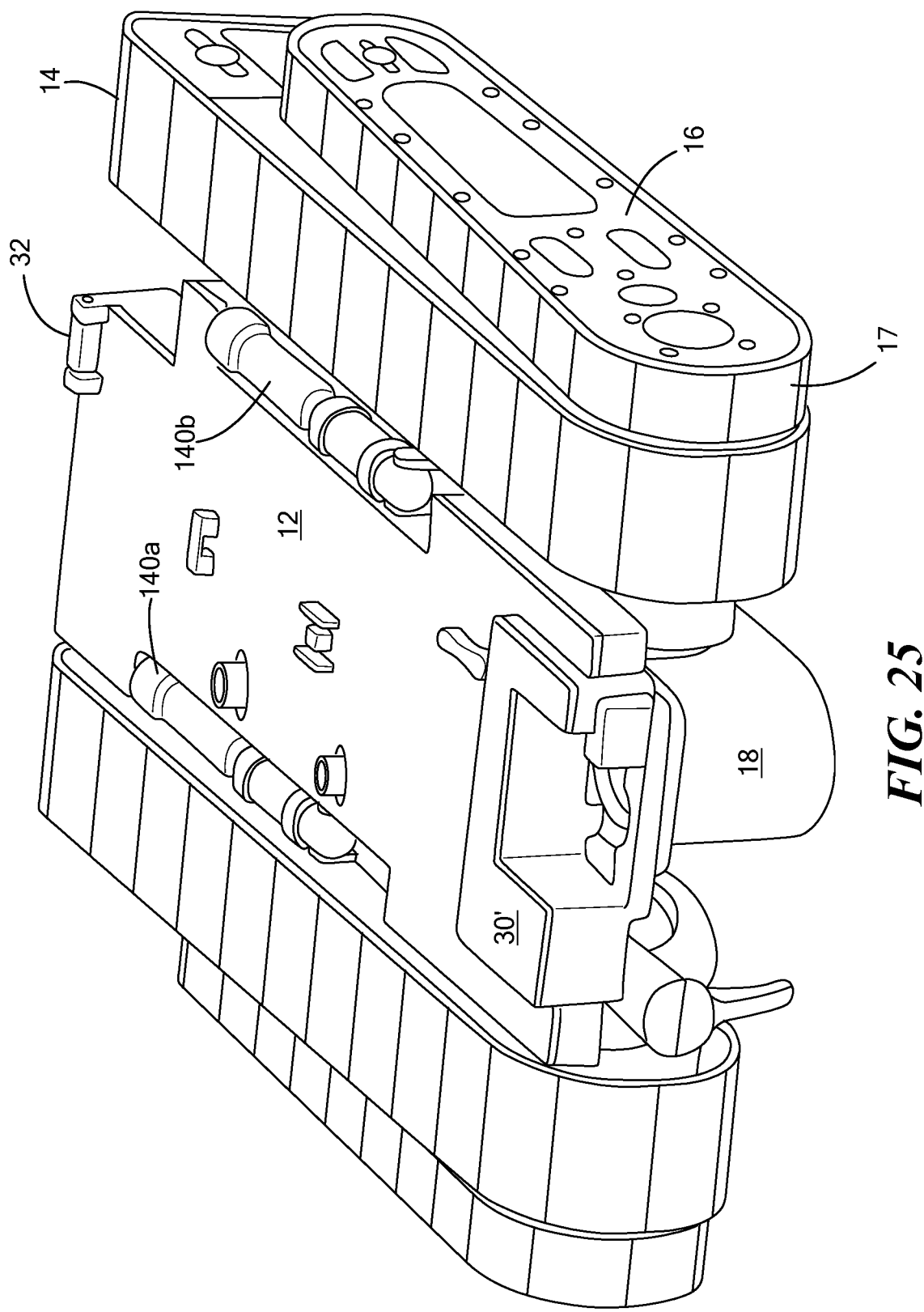
Figure 26:
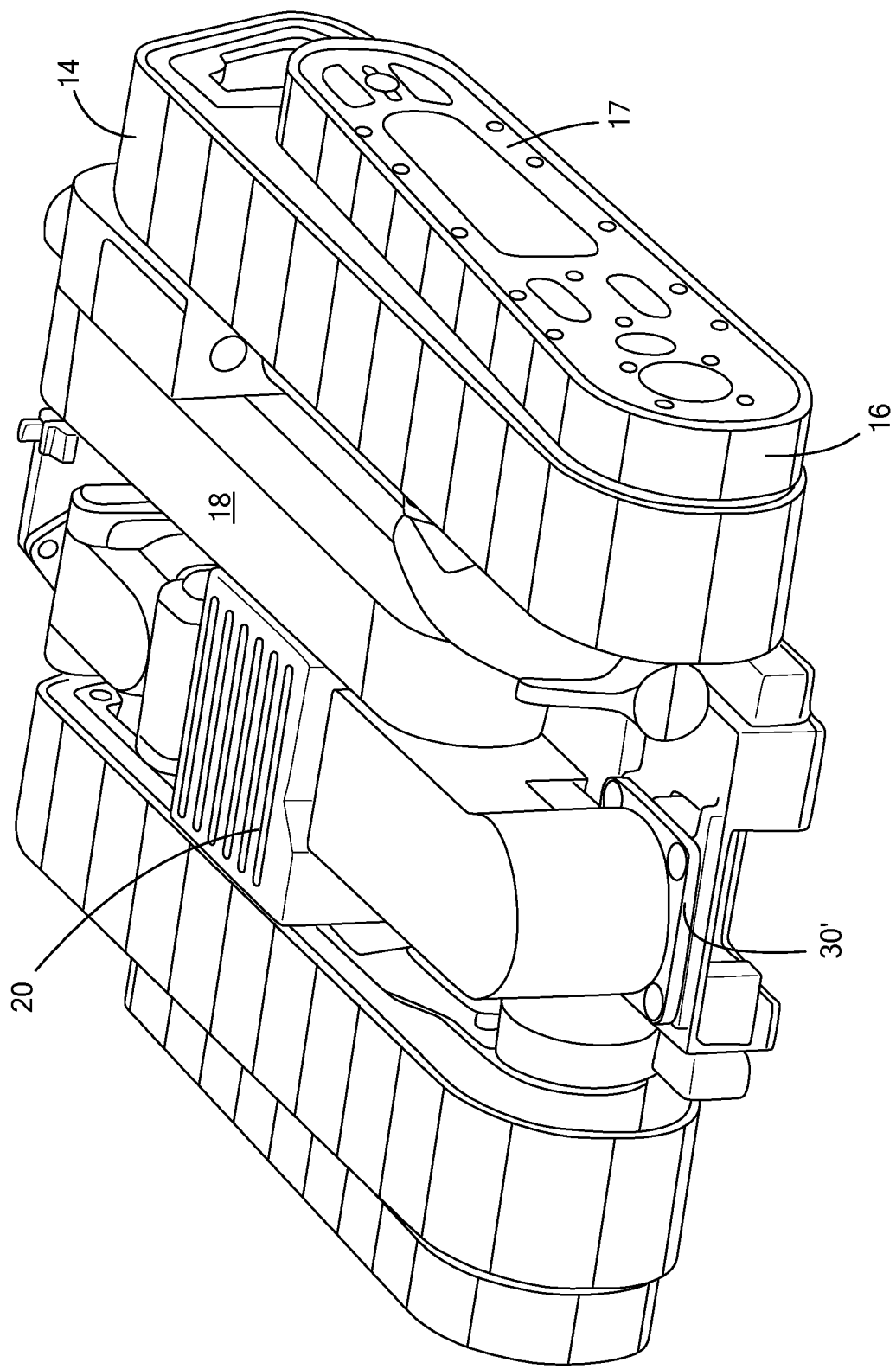
Figure 27:
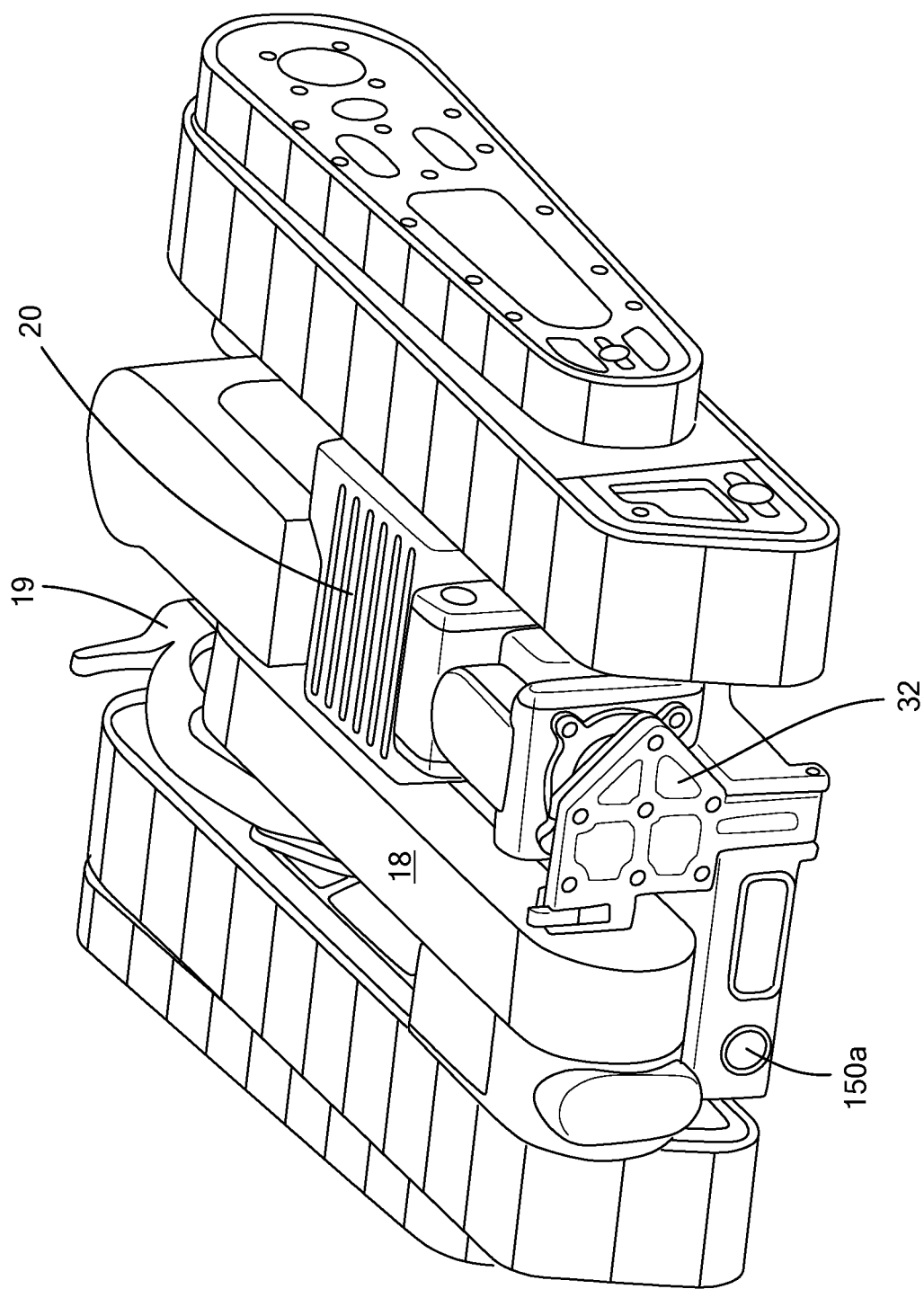

FIGS. 21-22 show member 30' to which the robot arm is attached. Member 30' resides in U-shape cut-out 130 in the end of chassis 12 and pivots about hinges 132a and 132b. Latch 134 may be used to secure folding base member 30' into the deployed position shown in FIG. 21 when latch bar 136 under chassis 12 rotates or otherwise is driven into slot 138 in the sidewall of member 30'. When the latch bar 136 is clear of slot 138 as shown in FIG. 23, member 30' can be rotated to store the robot arm under the chassis as shown in FIG. 24. See also FIGS. 24-27 which show spring loaded antennas 140a and 140b foldable relative to chassis 12 into sidewalls thereon.

Figure 28:
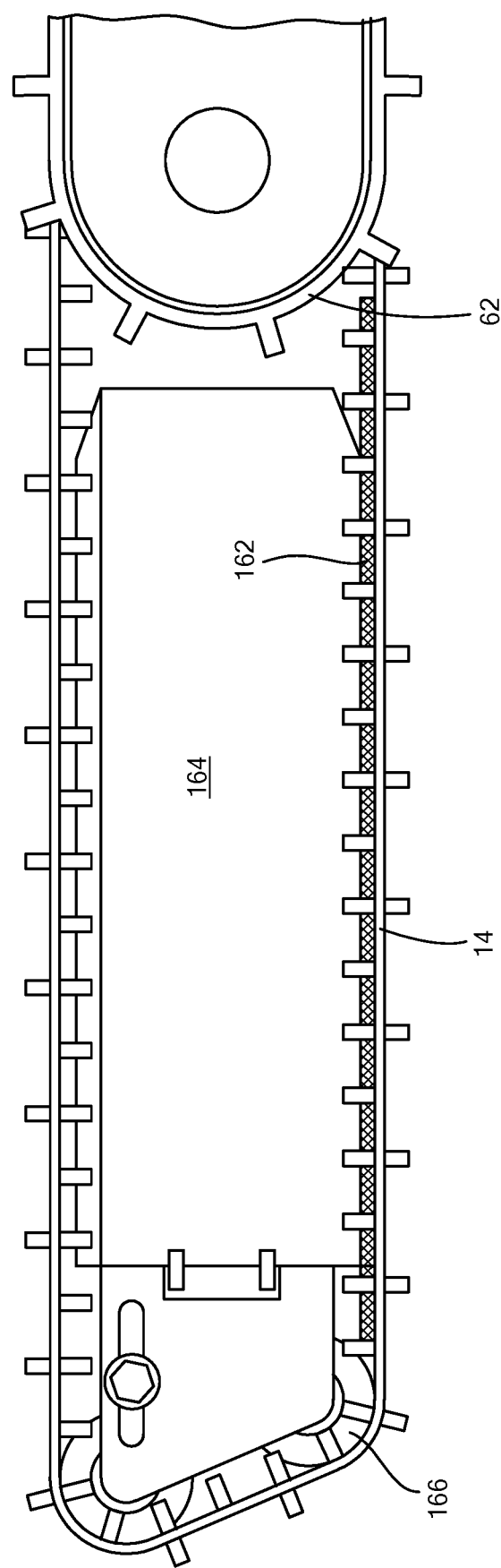
Figure 29:
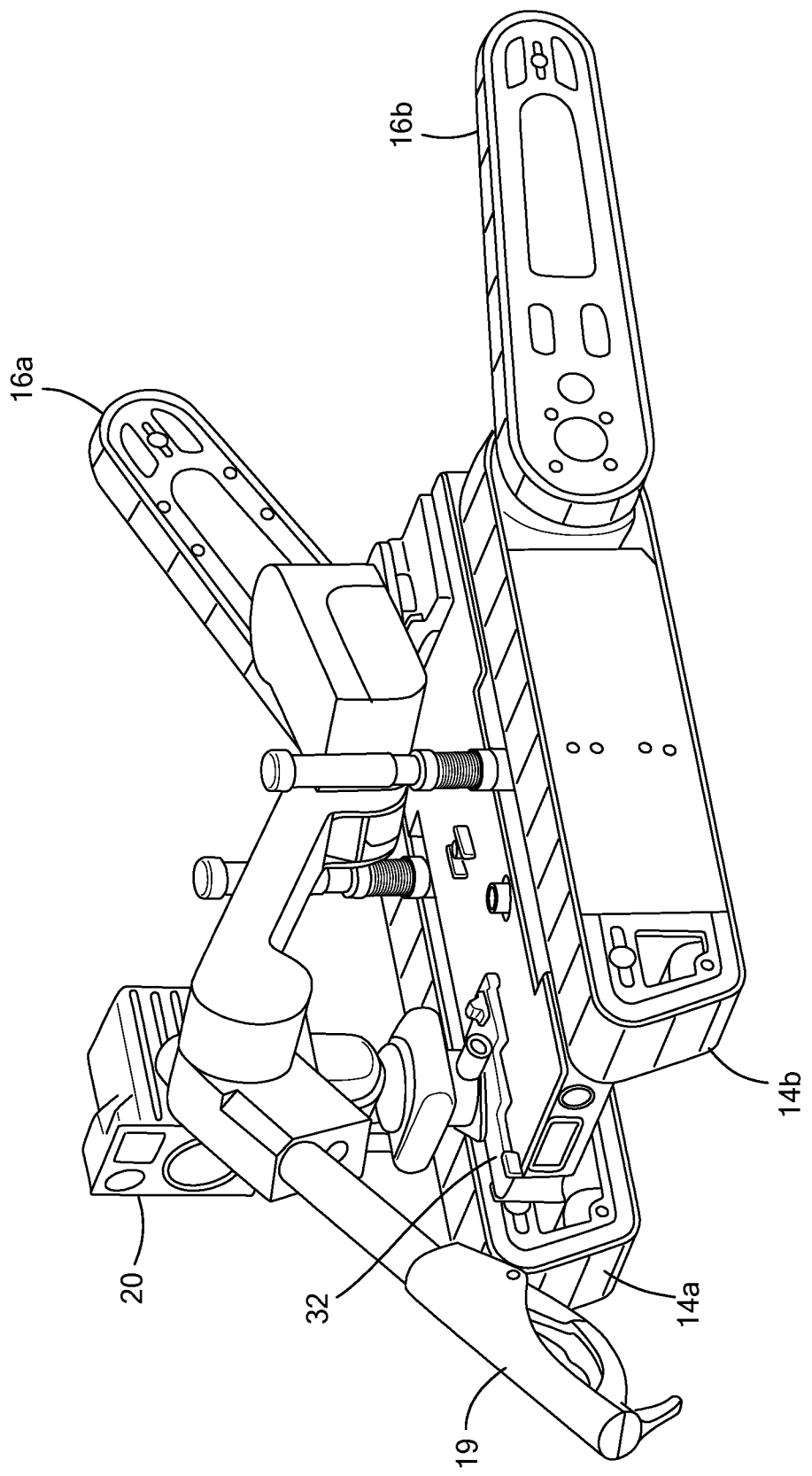

FIG. 28 shows skid plate 162 located between the sidepod 164 and the main track 14 and attached to the sidepod. The skid plate may be composed of a low friction plastic, preferably PTFE. The plate is thick enough so that the weight of the robot is born by the sidepod via the skid plate when the robot is on level ground. This configuration promotes quiet operation on flat ground. The skid plate extends beyond the sidepod, nearly touching both rotor 62 and guide roller 166. The extended length of the skid plate provides additional support of the track during stairclimbing, facilitating the motion of the robot on stairs. FIG. 29 shows independent movement of flippers 16a and 16b. The flippers may be controlled independently to facilitate maneuvering on uneven terrain.

Figure 30:
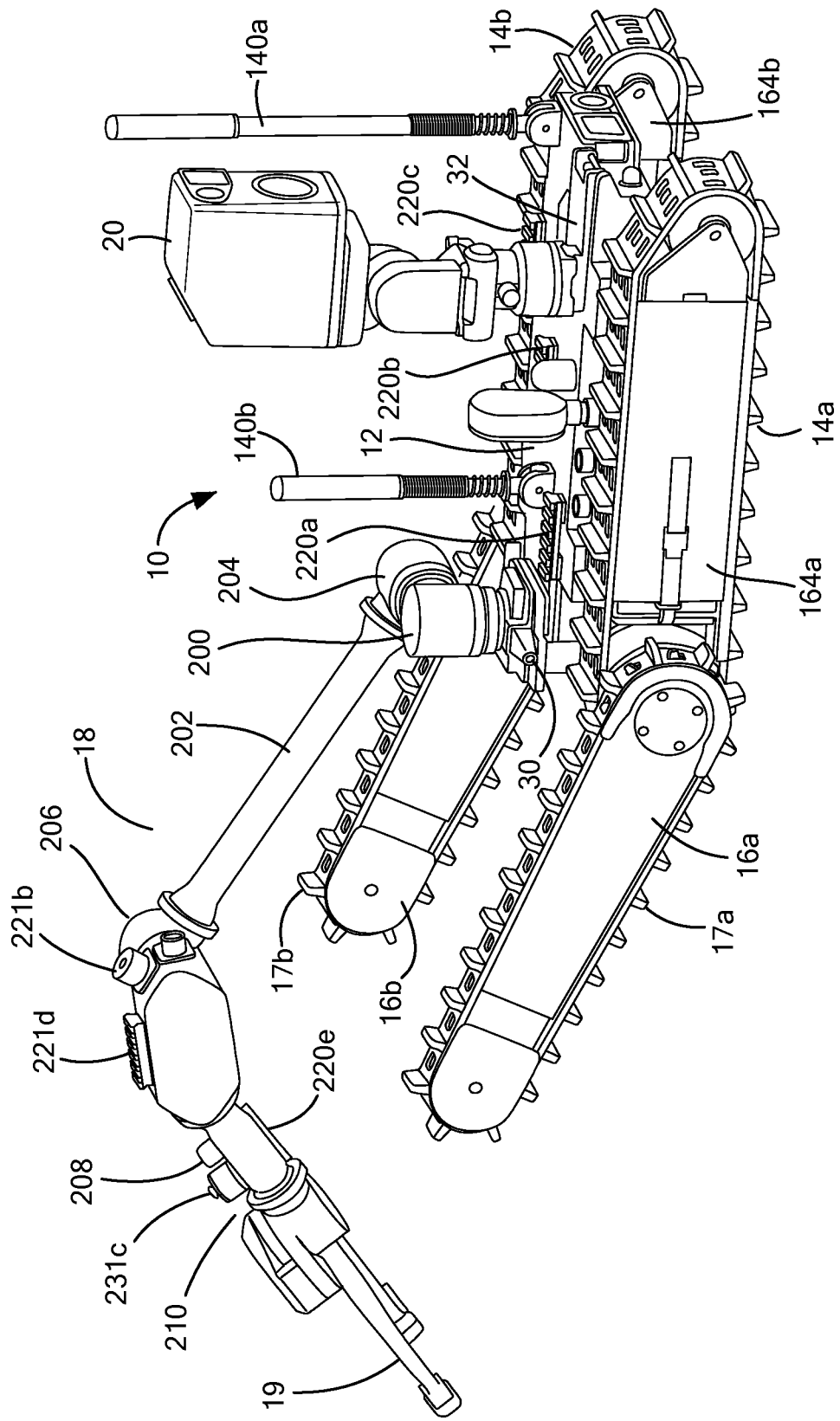
FIG. 30 is a schematic three-dimensional view showing another version of a packable robot.

FIG. 30 shows another example of a robot 10 with chassis 12 and sidepods 164a, 164b each equipped with one or more batteries and one or more drive motors. Robot arm 18 in this example includes rotatable shoulder 200 mounted (e.g., via fasteners) to foldable rear arm base member 30, upper arm 202 pivotable with respect to shoulder 200 via joint 204, elbow 206, forearm 208, wrist 210, and gripper 19 attached to wrist 210. Arm 18 may have four degrees of freedom and be configured to lift 6.5 lbs. at its full 24.7" extension. Arm shoulder 200 is mounted to pivotable rearward arm base member mount 30.

Camera assembly 20 is shown mounted to forward camera assembly base member mount 32 which also pivots relative to the chassis mount 37 may include Picatinny rail 220 for the camera. But, camera assembly 20 may be mounted to mounts 22a, 22b, and/or 22c on chassis 12 (e.g., Picatinny rails) and/or to arm 18. Thus, in some embodiments, foldable camera assembly base member mount 32 is absent.

Camera assembly 20 can be mounted to robot arm shoulder 200 and/or to other arm portions. See, for example, mount 220d on elbow section 206 and mount 220e on upper arm 210.

Preferably, when camera assembly 20 is mounted to shoulder 200, the camera assembly is removed from the shoulder when the arm 18 folds, via pivotable rearward arm base member mount 30, underneath the chassis storing the arm wholly or mostly in the open channel underneath chassis 12 between main tracks 14a and 14b. Camera assembly 20 may be remounted to mount 32 and folded underneath the robot for storage or the camera assembly can be placed in the space provided for it underneath the chassis between the two side tracks.

Electrical connectors 221a, 221b, 221c, and the like may be used to electrically connect the motors and the electronics of camera assembly 20 to the electronics section of the robot. Also, other sensors, detectors, monitors, and the like can be secured to the robot via the mounts discussed above.

Figure 31A:
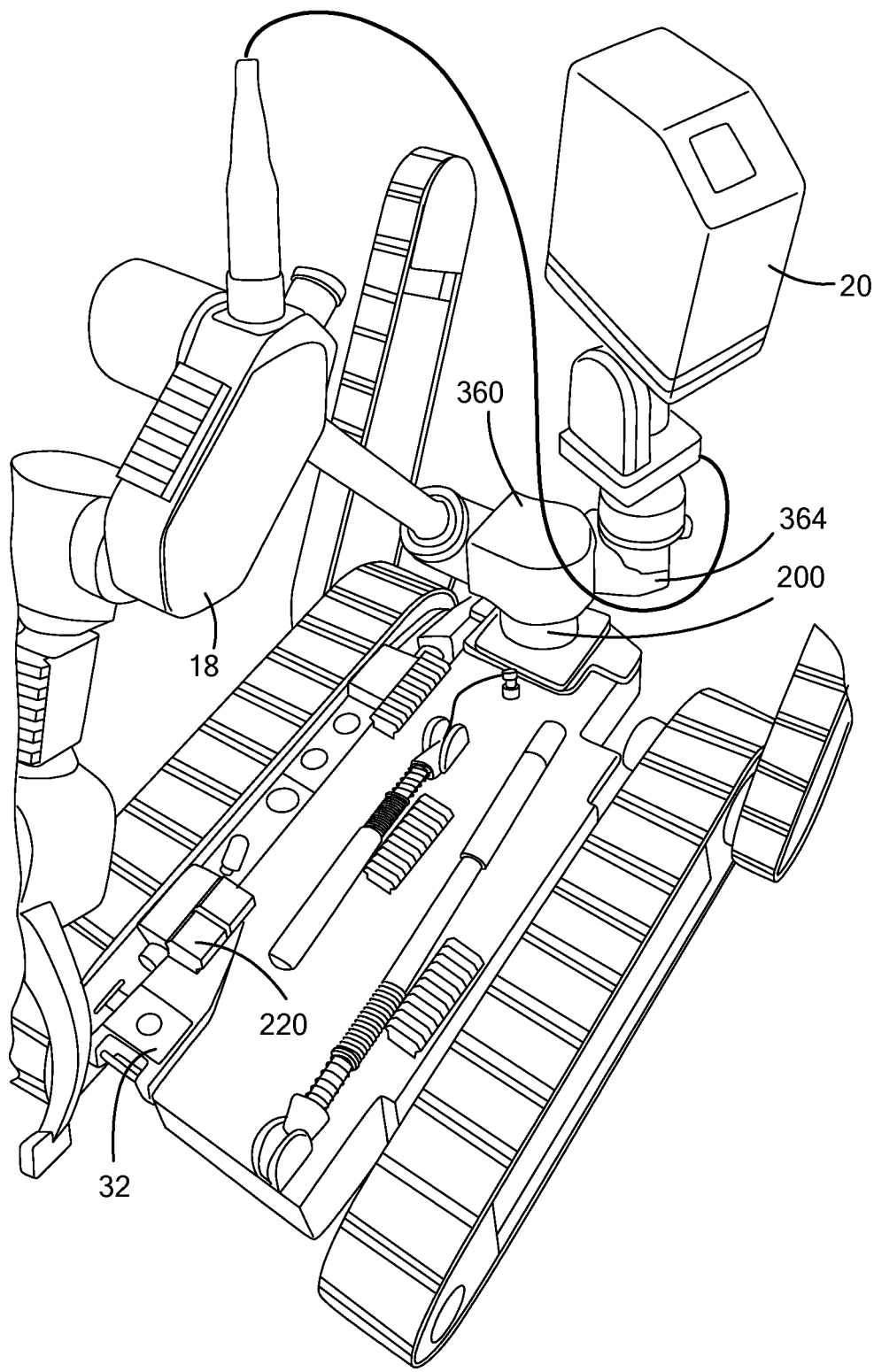
FIGS. 31A and 31B are top views of the packable robot of FIG. 30 showing the camera assembly mounted to the robot arm.
Figure 31B:
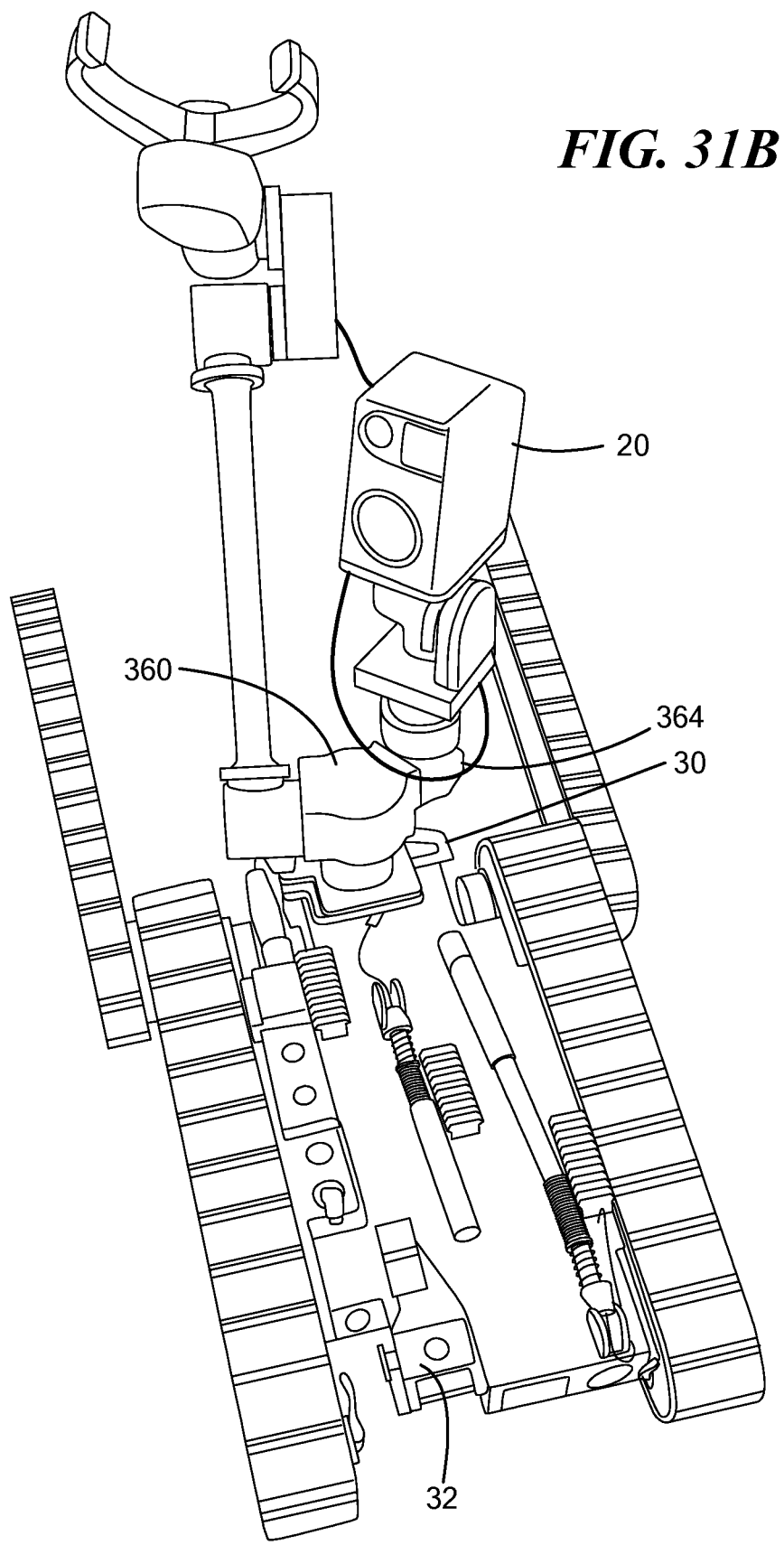
Figure 31C:
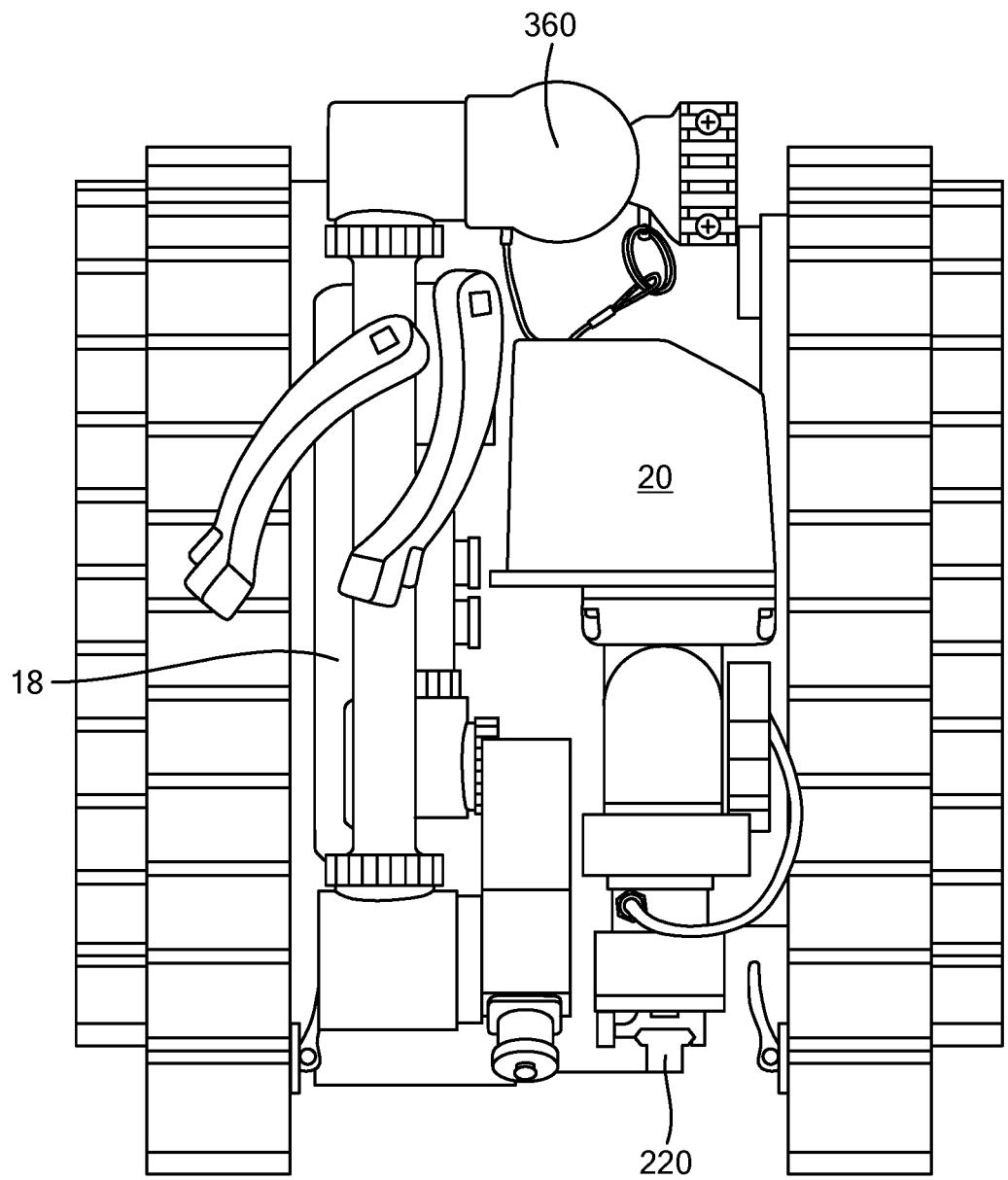
FIG. 31C is a view showing the robot arm and the camera assembly mounted thereto folded underneath the robot chassis for transport via a pack with both the robot arm and the camera assembly residing completely or almost completely in an open channel underneath the robot defined by the bottom surface of the chassis and between the main tracks.

FIGS. 31A-31B show the camera assembly 20 mounted to the robot arm. FIG. 31C also shows the camera assembly located underneath the chassis 12.

Figure 32:
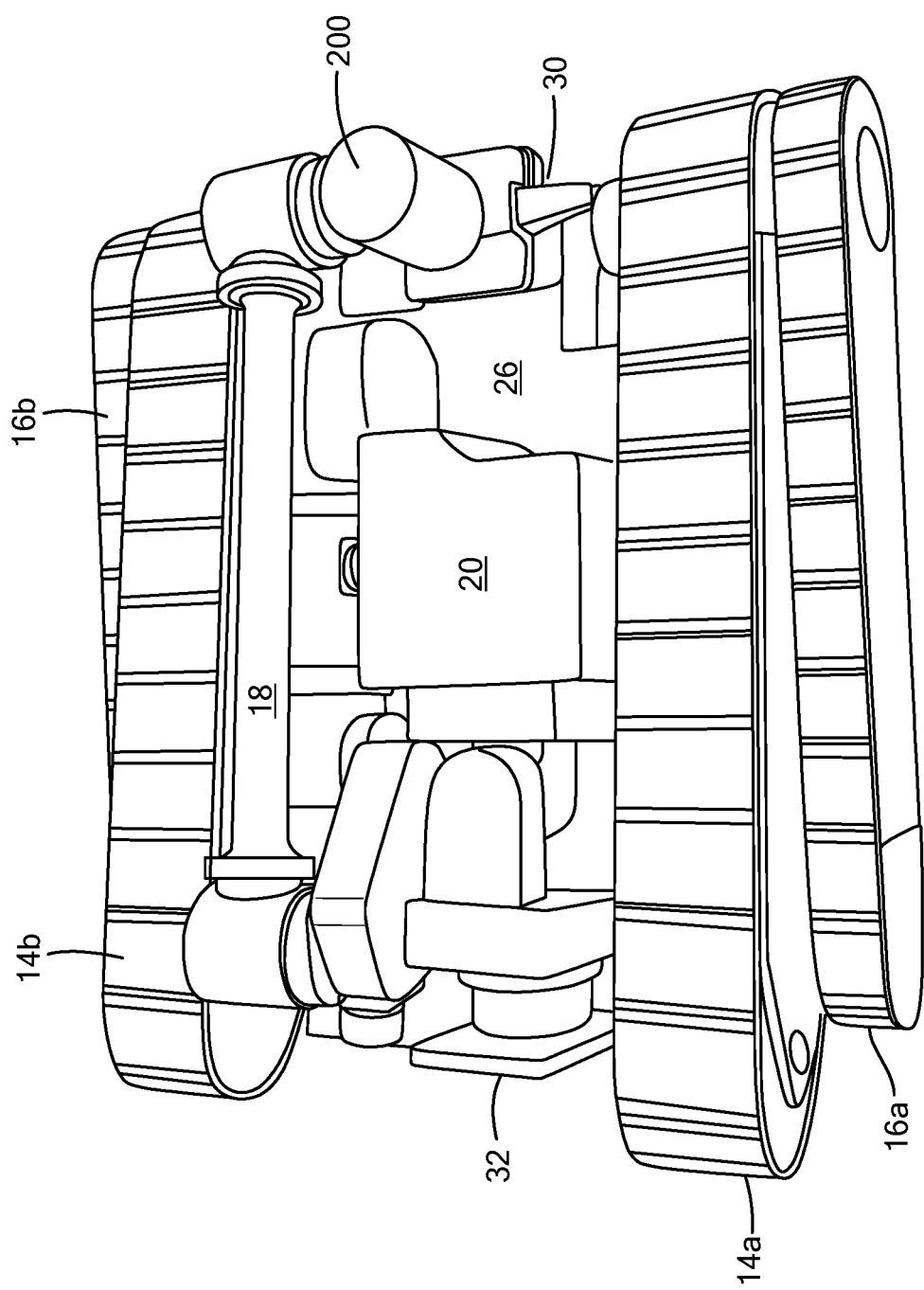
FIG. 32 is a another schematic view showing the robot arm and camera assembly folded underneath the robot chassis.

FIG. 32 shows the robot with arm 18 and camera assembly 20 folded to reside in the open channel 26 underneath the chassis and between the main tracks 14a, 14b, via foldable mounts 30 and 32, respectively. Flipper arm assembly 16a and 16b are rotated to lie adjacent main track assemblies 14a, 14b, respectively. In this way, the robot can be placed in an assault pack or larger ruck sack 230, FIG. 33.

Figure 33:
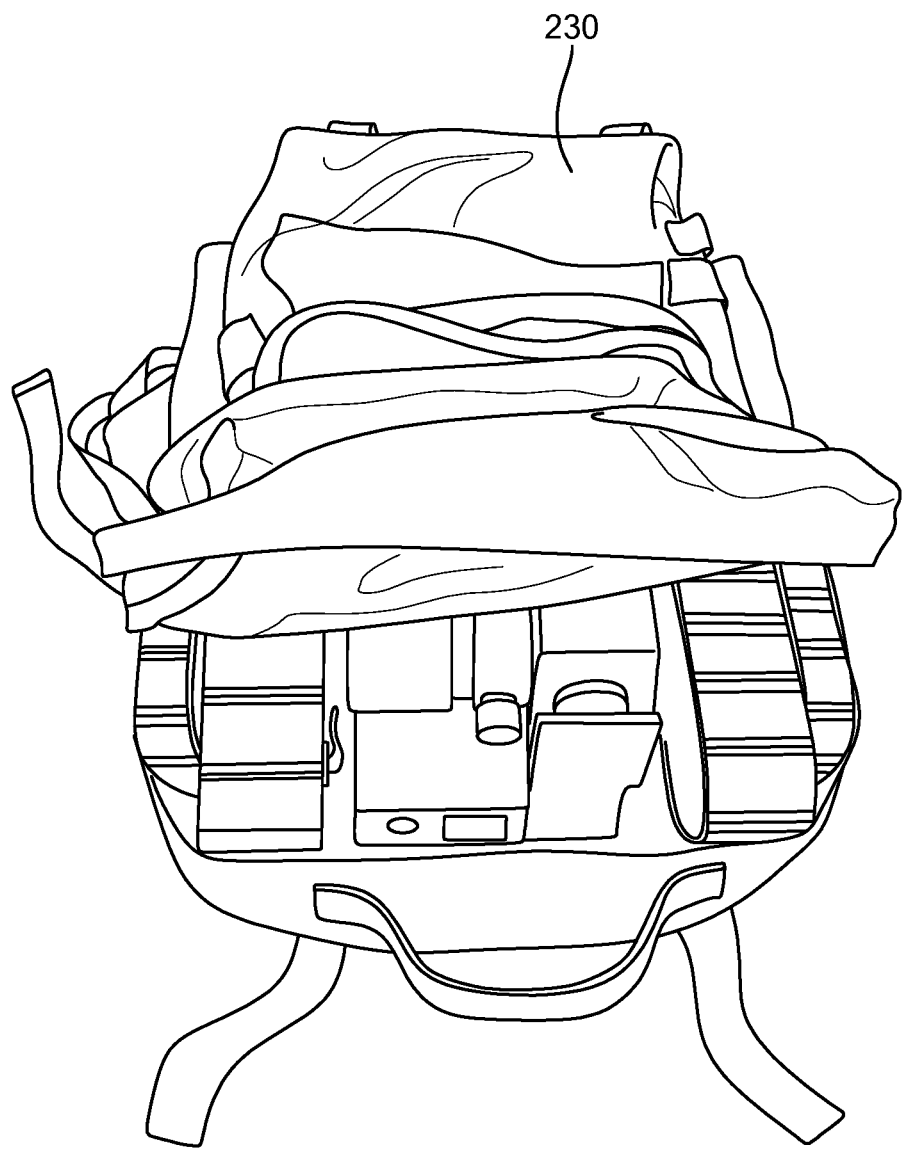
FIG. 33 is a view showing the robot of FIG. 32 inserted into an assault pack or a larger ruck sack.
Figure 34:
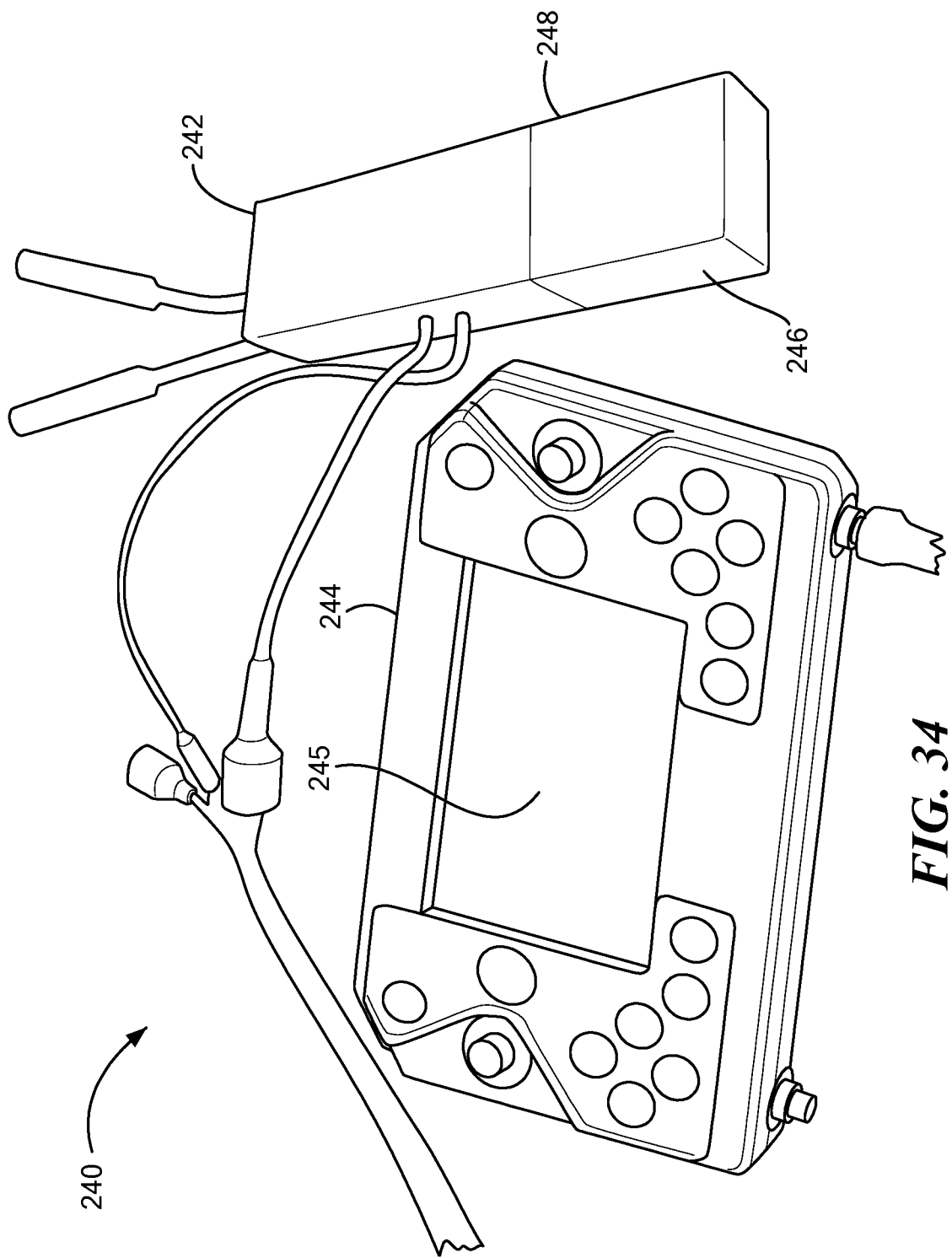
FIG. 34 is a schematic view showing an example of an operator control unit for the robot.
Figure 35:
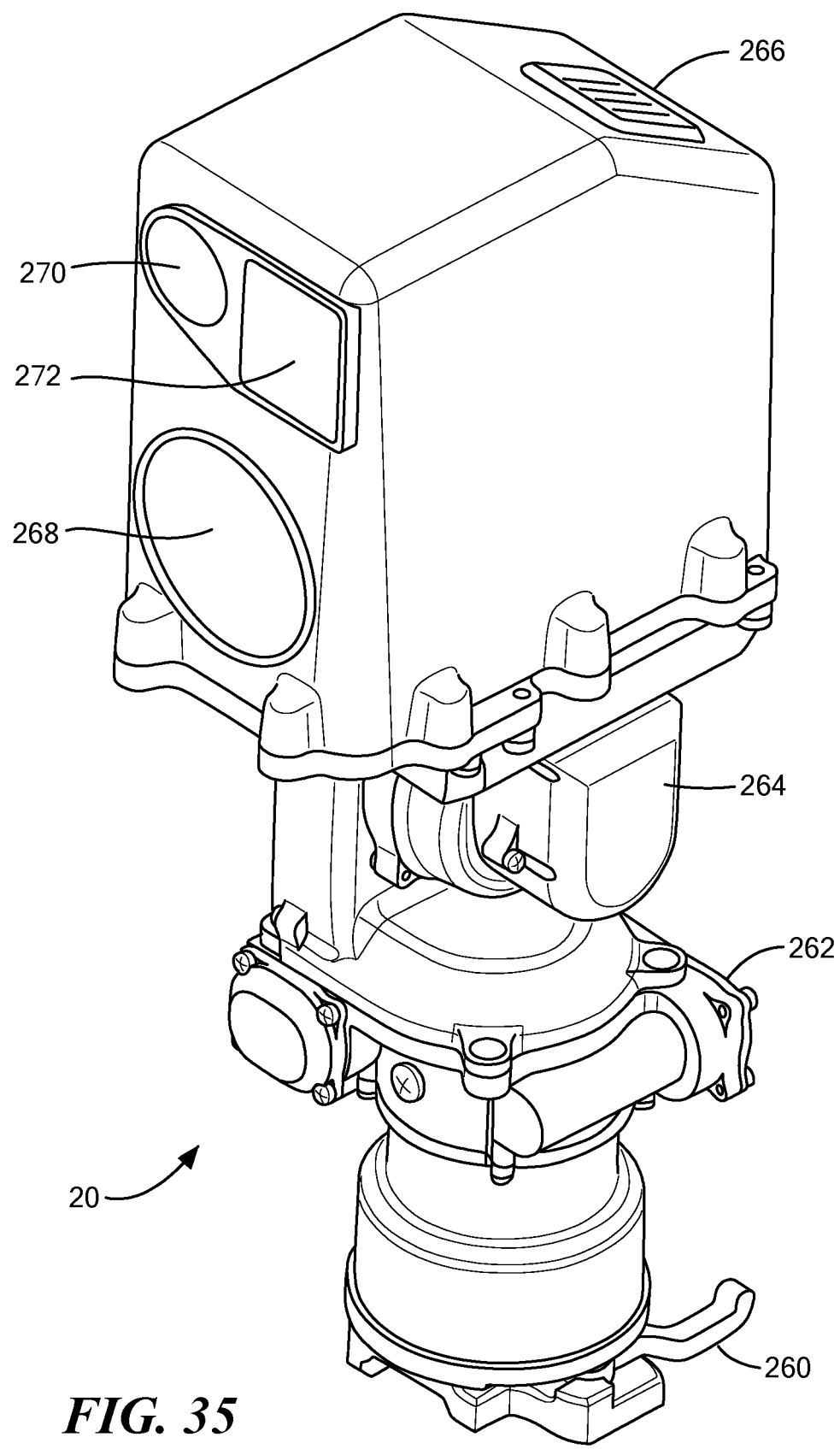
FIGS. 35-39 are schematic views showing an example of a preferred camera assembly.
Figure 36:
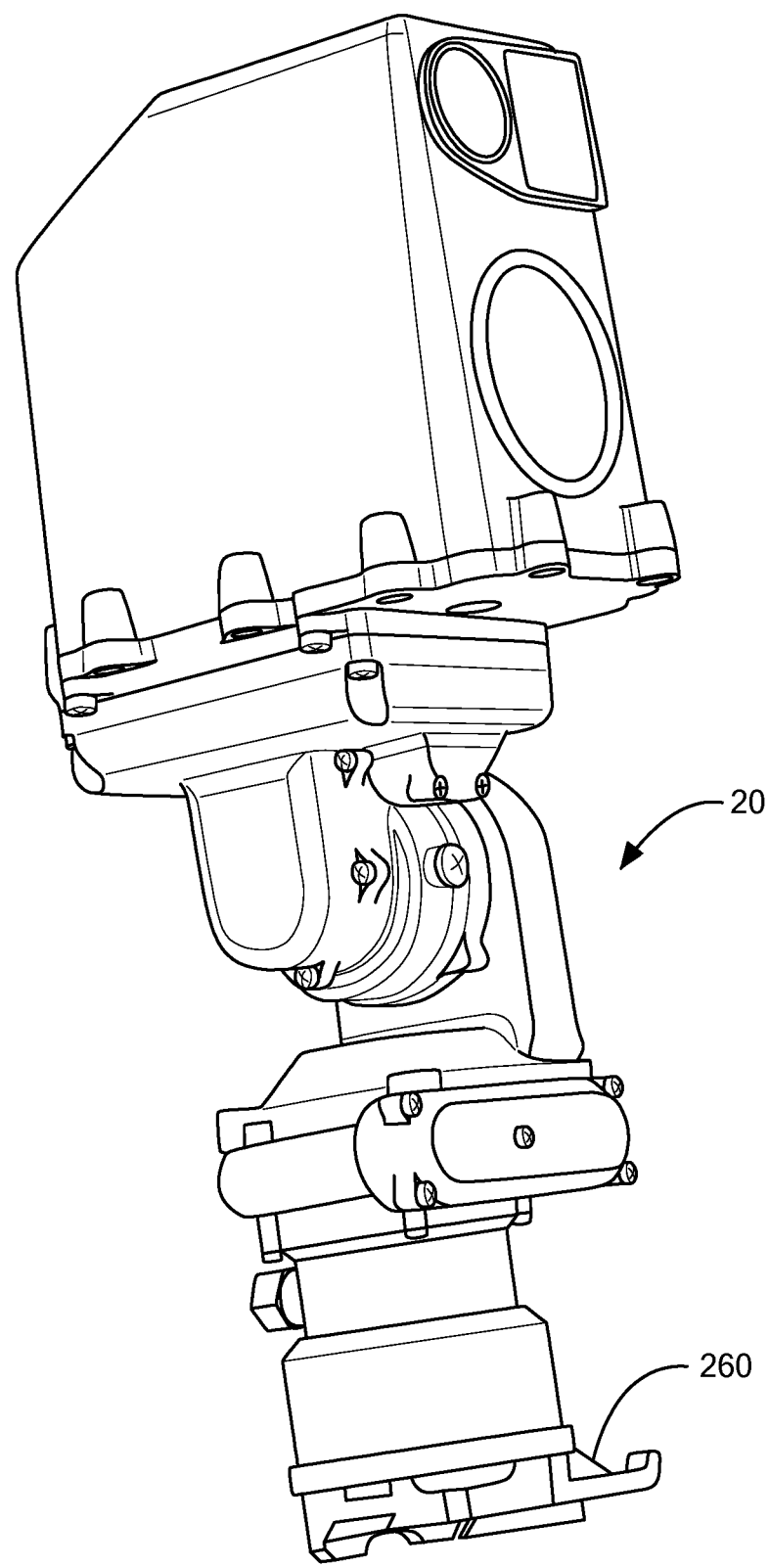

The operator control unit 240, FIG. 34 is preferably configured to fit in an outside pocket of the pack 230, FIG. 33. The operator control unit 240 may include radio 242 and hand controller 244. The hand controller may connect to a Persistent systems radio via an RJ45 connector so that the hand controller easily swaps between different radios, for example a radio in RF communication with an unmanned aerial vehicle. The hand controller features a tablet and also its own radio powered from a single BT-70716BG battery. The DC to DC converter shown supplies 16 volts to the hand controller 244. The battery is hot swappable and the tablet's battery then powers the tablet during the swap.

Camera assembly 20, FIGS. 35-39 may include a bottom clamp 260 for mounting to a Picatinny rail. The camera assembly may further include rotatable joint 262 for panning the camera 360° and rotational joint 264 for tilting the camera negative 45° to plus 90°. Camera assembly head 266 may include color camera 268, thermal imager 270, and high intensity illuminator 272 (adjustable white and/or infrared light).

Figure 37:
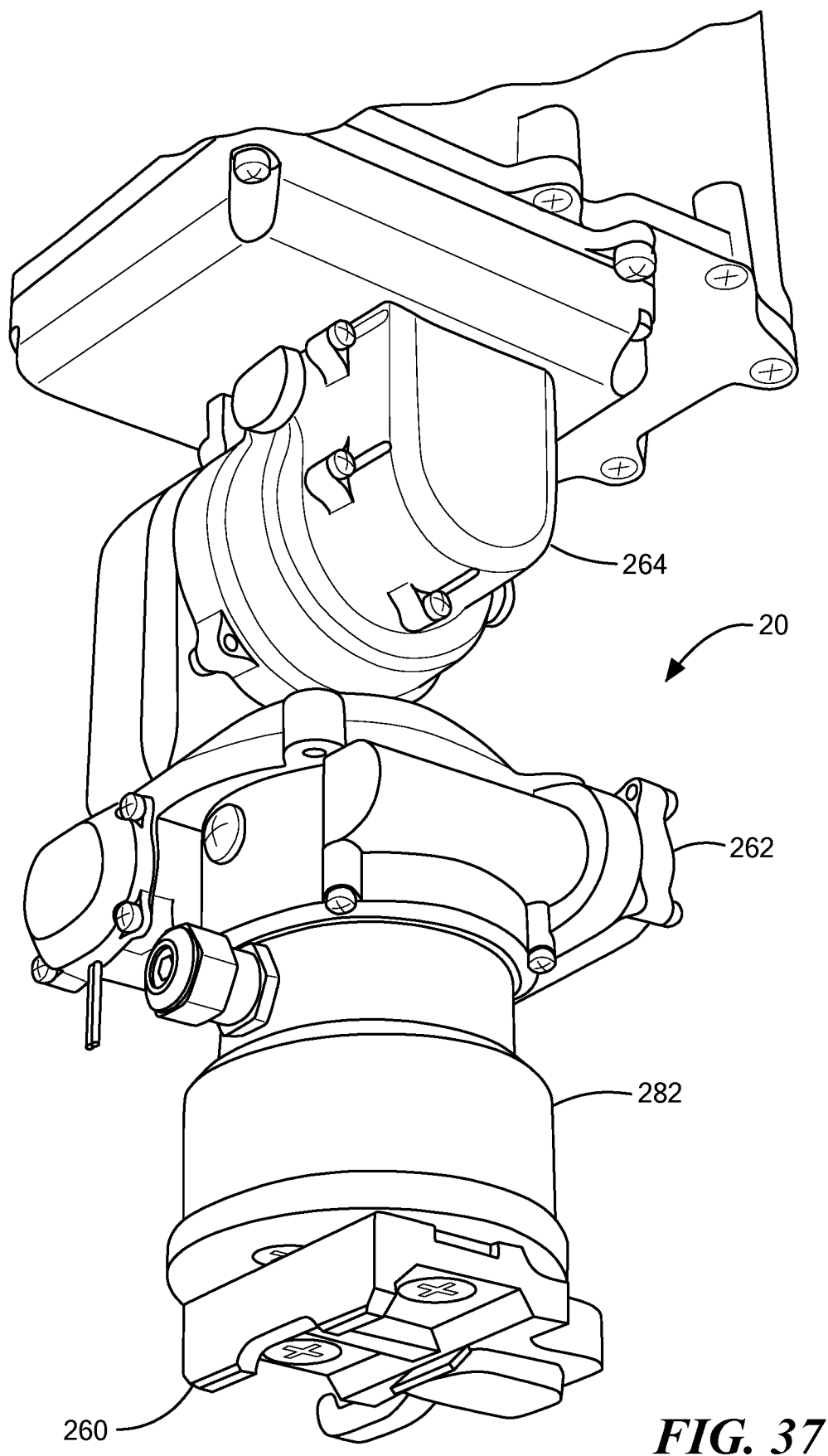
Figure 38:
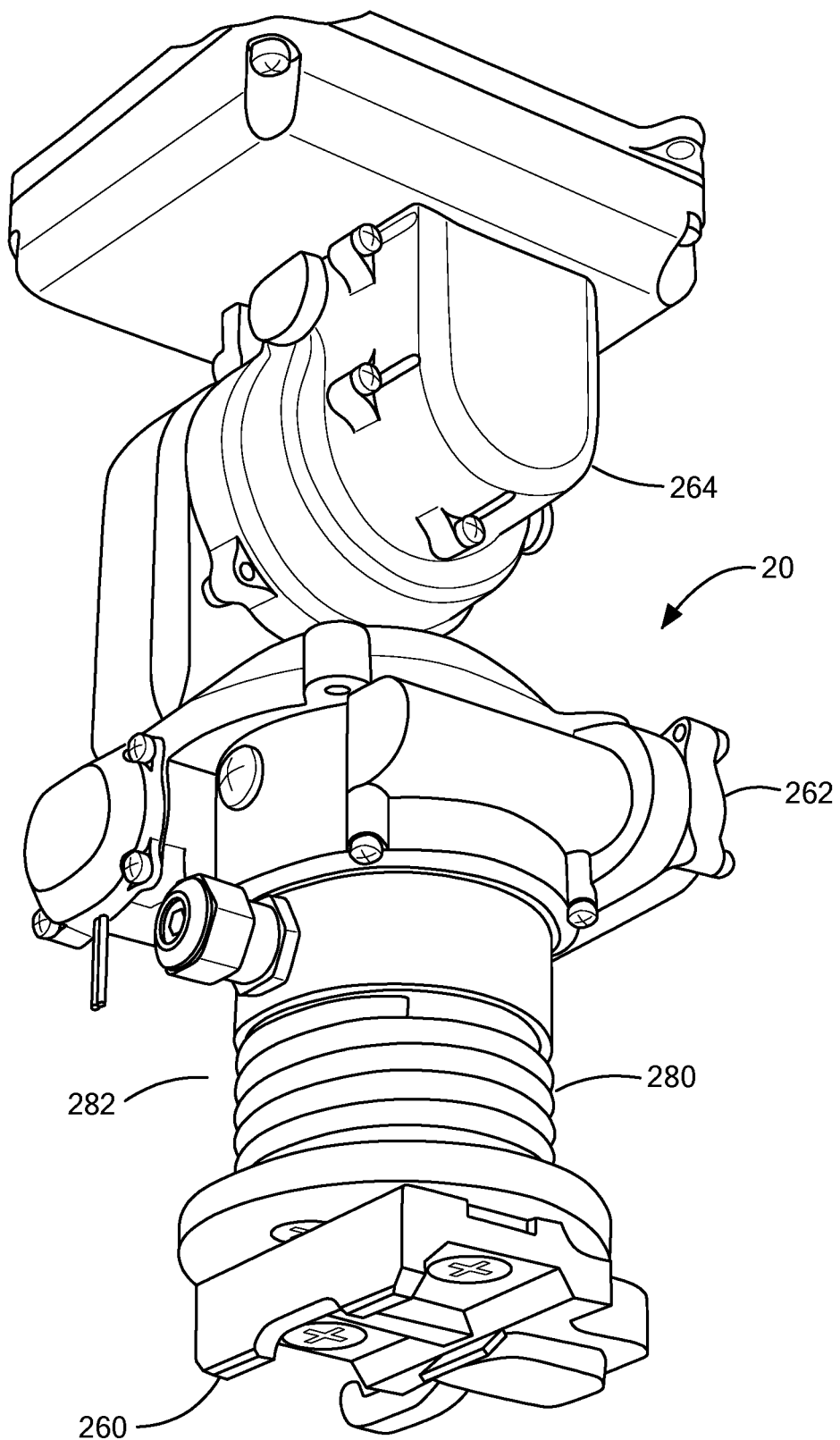
Figure 39:
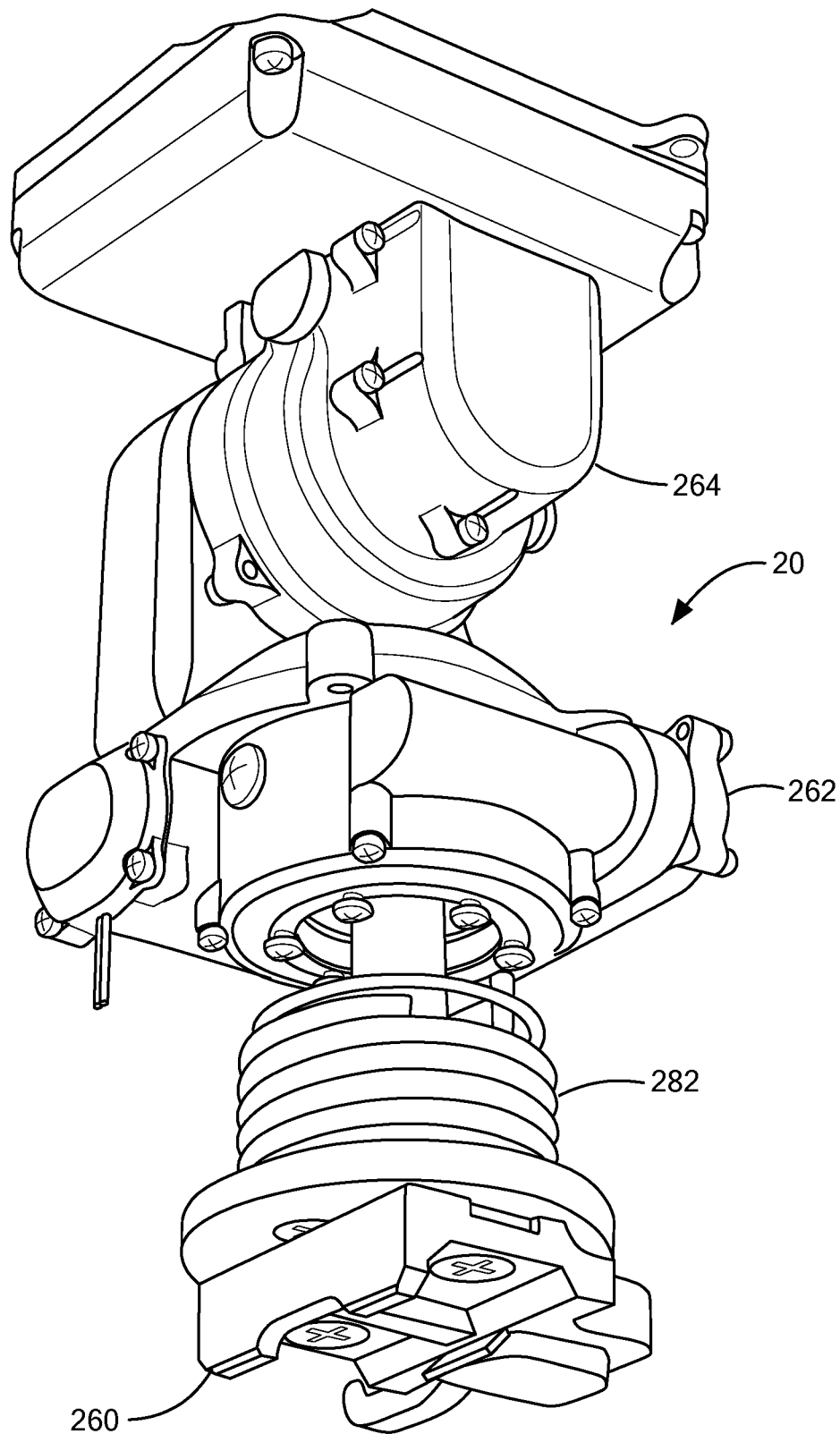

FIGS. 37-39 depict spring 280 in base portion 282 between clamp mount 260 and 360° panning portion 262 for absorbing shock forces imparted to the arm assembly during maneuvering, storage, and/or transport of the robot.

Figure 40A:
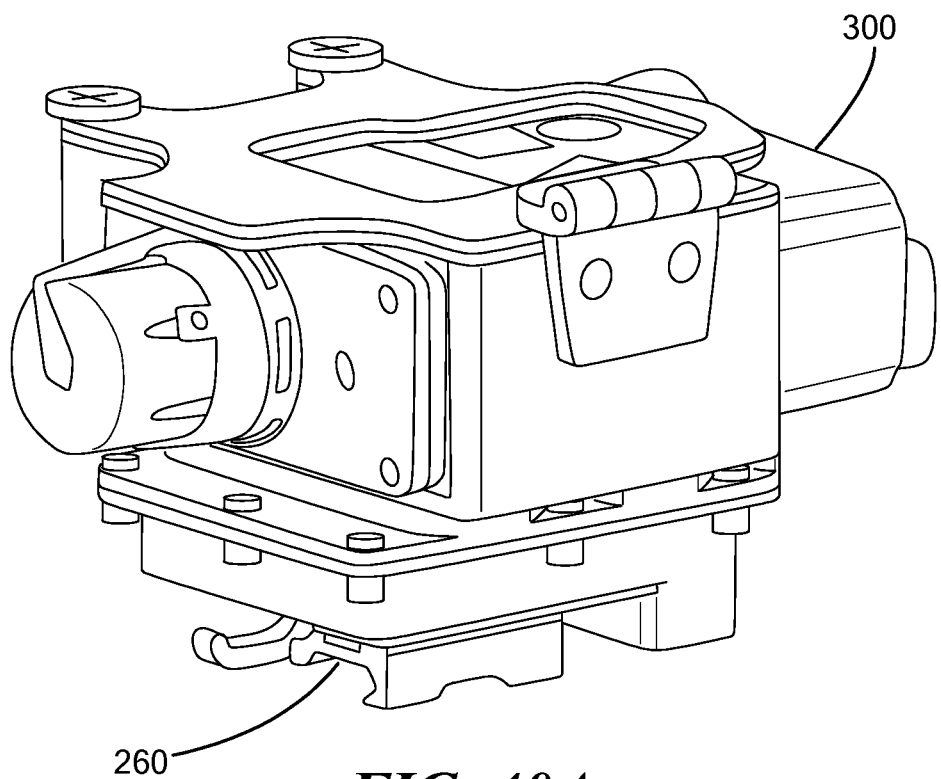
FIGS. 40A-40C are schematic views showing examples of other robot payloads.
Figure 40B:
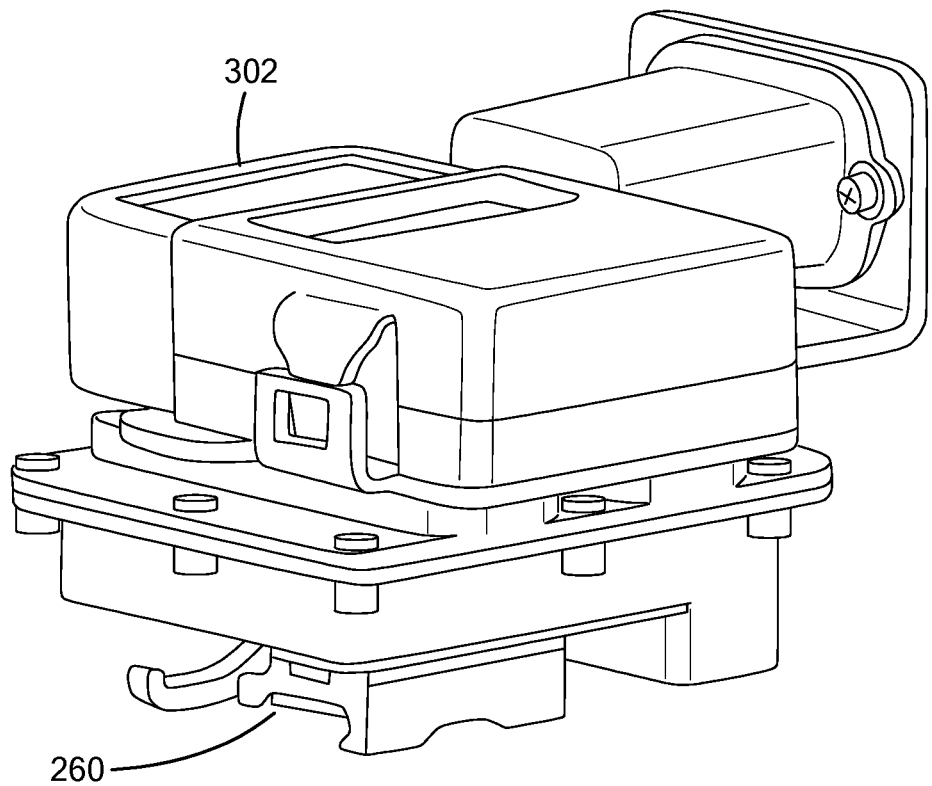
Figure 40C:
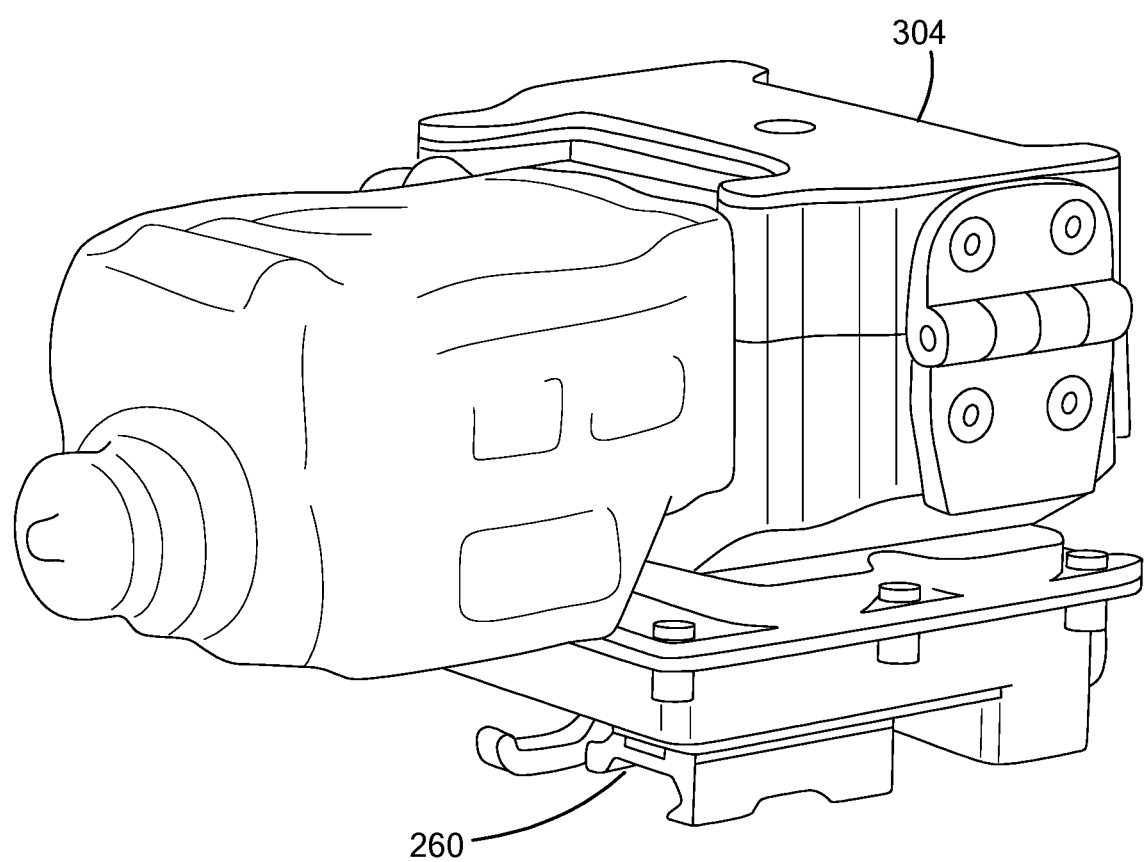

FIGS. 40A-40C depict other sensors and the like each including a Picatinny rail clamp 260 for mounting to the robot chassis, the robot arm, the rearward arm foldable base member and/or the foldable camera assembly base member. Sensor assembly 300 FIG. 40A may be a chemical agent detector, sensor assembly 302, FIG. 40B may be a dosimeter, and sensor 304 FIG. 40C may include a vapor detector and/or a gas monitor or a combination vapor detector and gas monitor. Also, other sensor assemblies may be mounted to the robot arm, the robot chassis, the rearward arm foldable base member, and/or the forward camera assembly base member.

Figure 41:
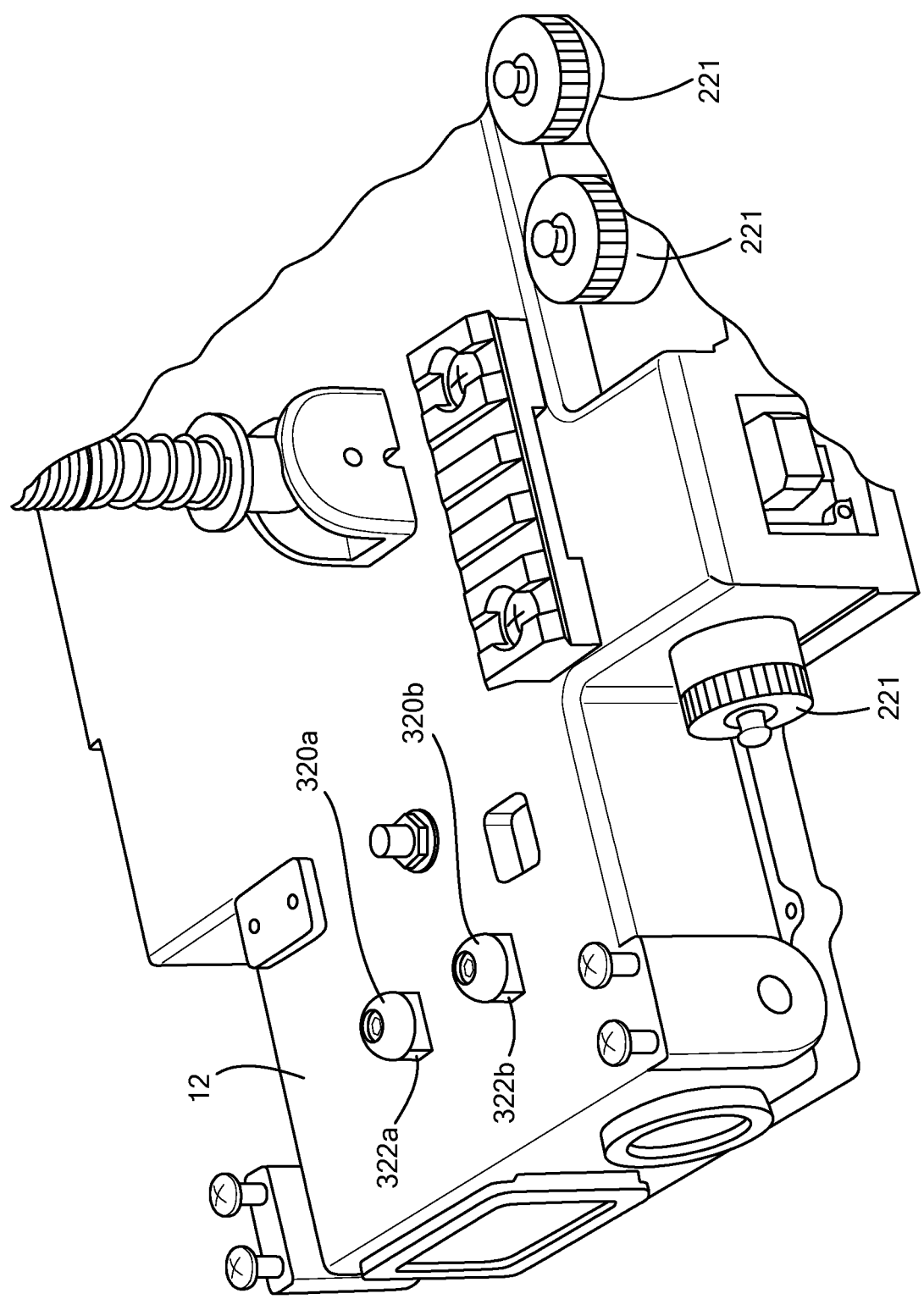
FIGS. 41-42 are schematic view showing a foldable base plate member for the robot arm and a preferred latch assembly associated therewith.
Figure 42:
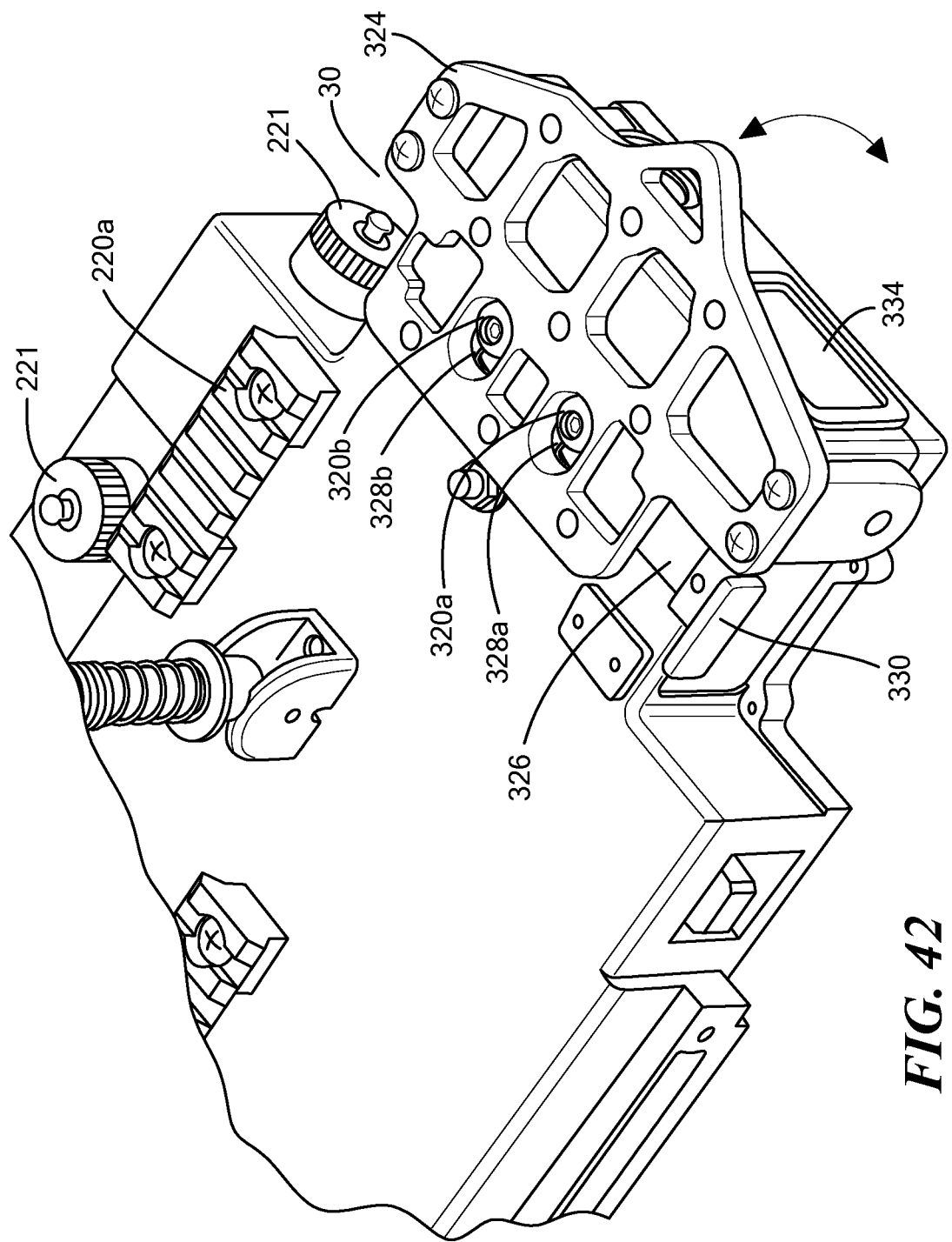

FIGS. 41-42 show one preferred latch assembly for the rearward arm foldable base member mount 30. The latch assembly functions to reliably maintain the base member and a robot arm mounted thereto on the top of the chassis and at the same time makes it easier to manually pivot the base member and fold the arm underneath the robot chassis. Chassis 12 is fitted with two one-half balls 320a, 320b, upstanding from rectangular cross sections stems 322a, 322b, respectively. Plate 324 of foldable base member 30 includes slide 326 movable relative to plate 324 and biased via a spring (not shown) into the position shown in FIG. 42. The slide 326 has channels 328a, 328b which receive the ball members 320a, and 320b therethrough and each channel terminates in a blade engaging the ball stem and the flat underside of the respective half ball members. In this way, by pushing on handle 330, the slide 326 releases the ball members and plate 324 pivots via pin or shaft 332 downward to fold the arm underneath the robot chassis.

FIG. 42 also shows optional rearward camera or sensor 334, foldable antennas 140b, and electrical connectors 221 for electrically connecting the arm and/or other sensors to the electronics section of the robot. In this way, various motors of the robot arm are electrically controlled by the robot electronics section based on commands received from the OCU.

Figure 43:
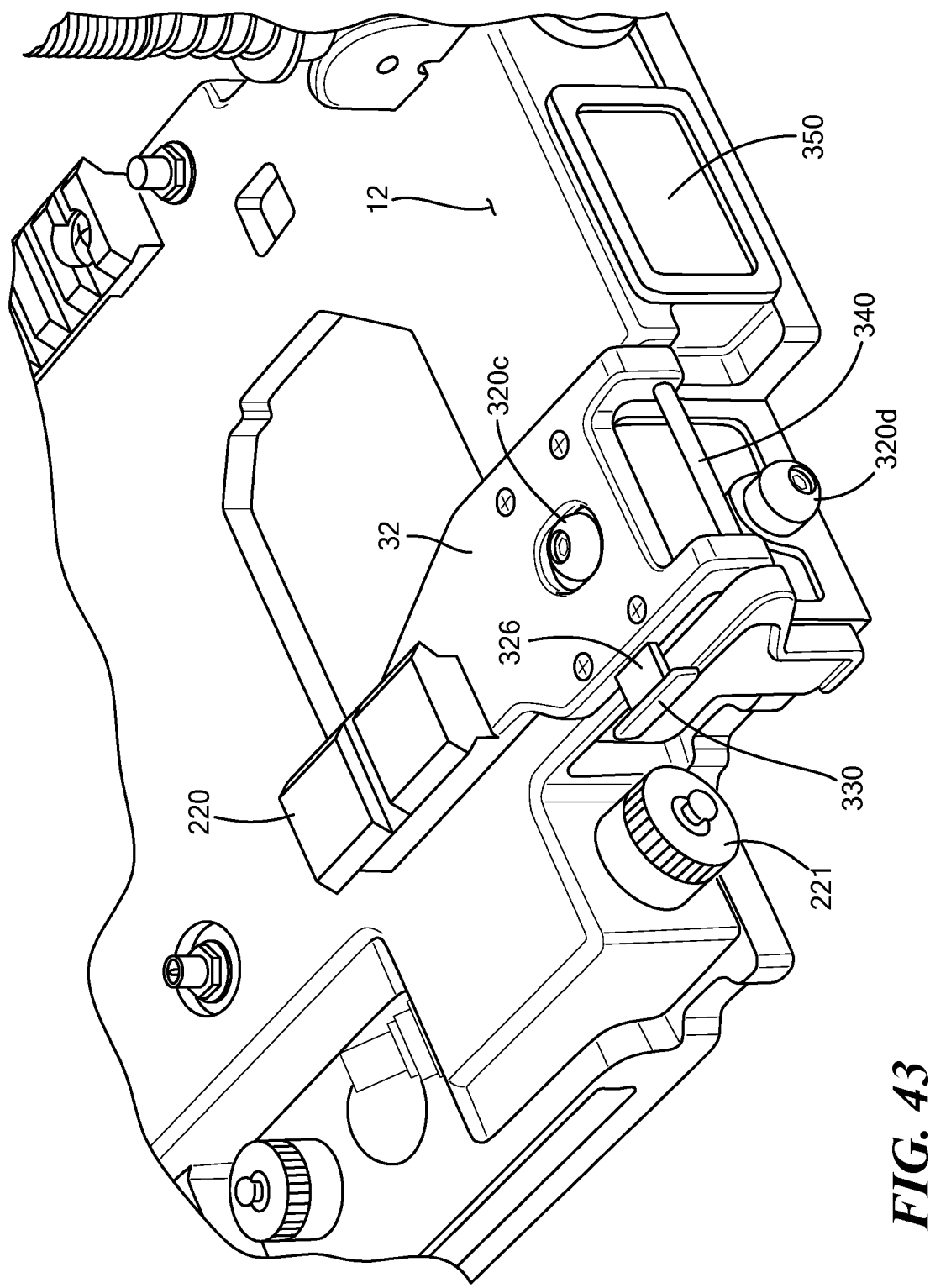
FIG. 43 is a schematic view showing a preferred foldable base plate for the camera assembly or other payload and a preferred latch assembly associated therewith.
Figure 45:
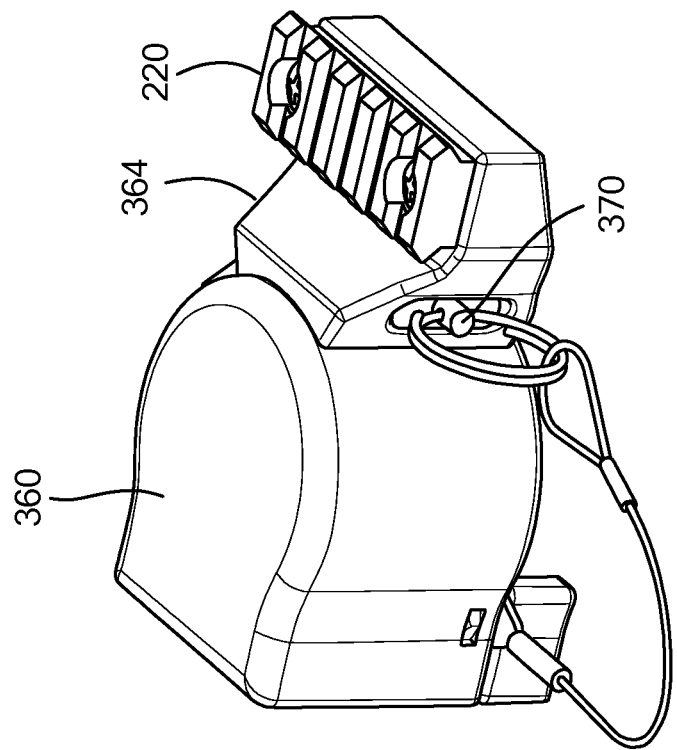
FIGS. 44-48 are schematic views showing a preferred example of a mount for securing the camera assembly to the robot arm.
Figure 44:
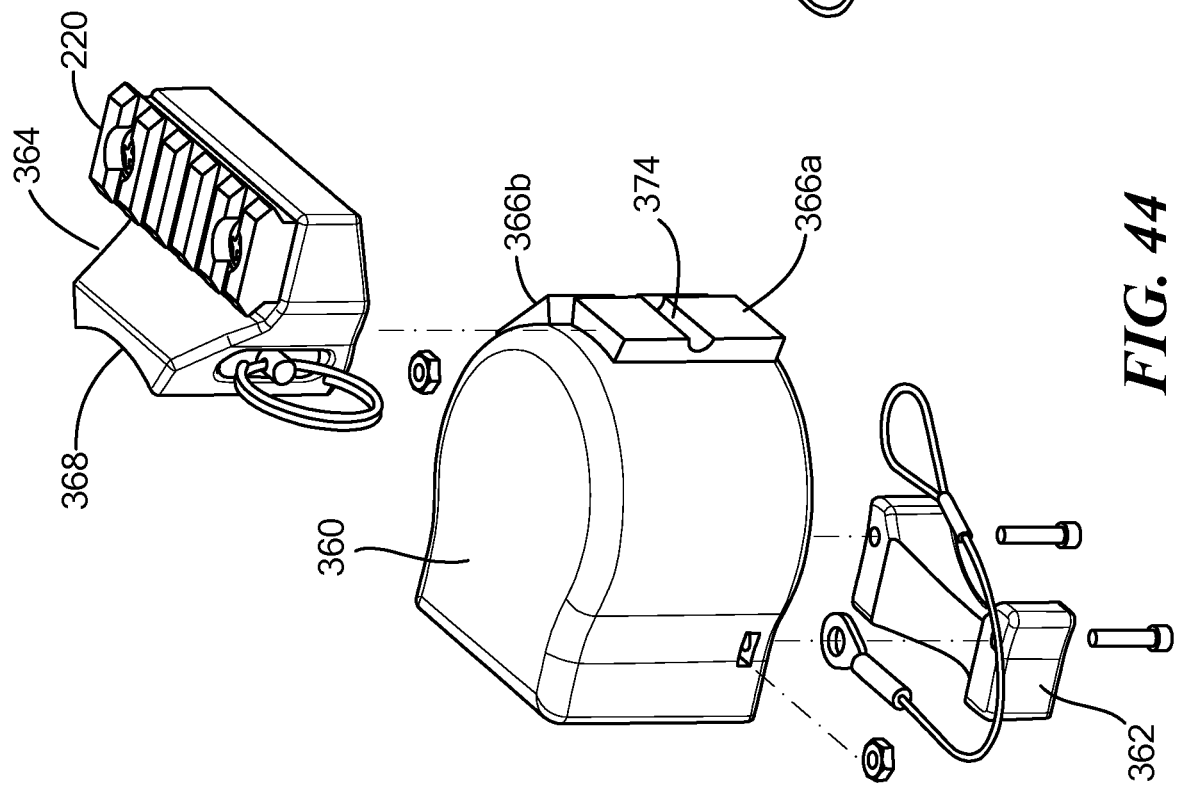
Figure 46:
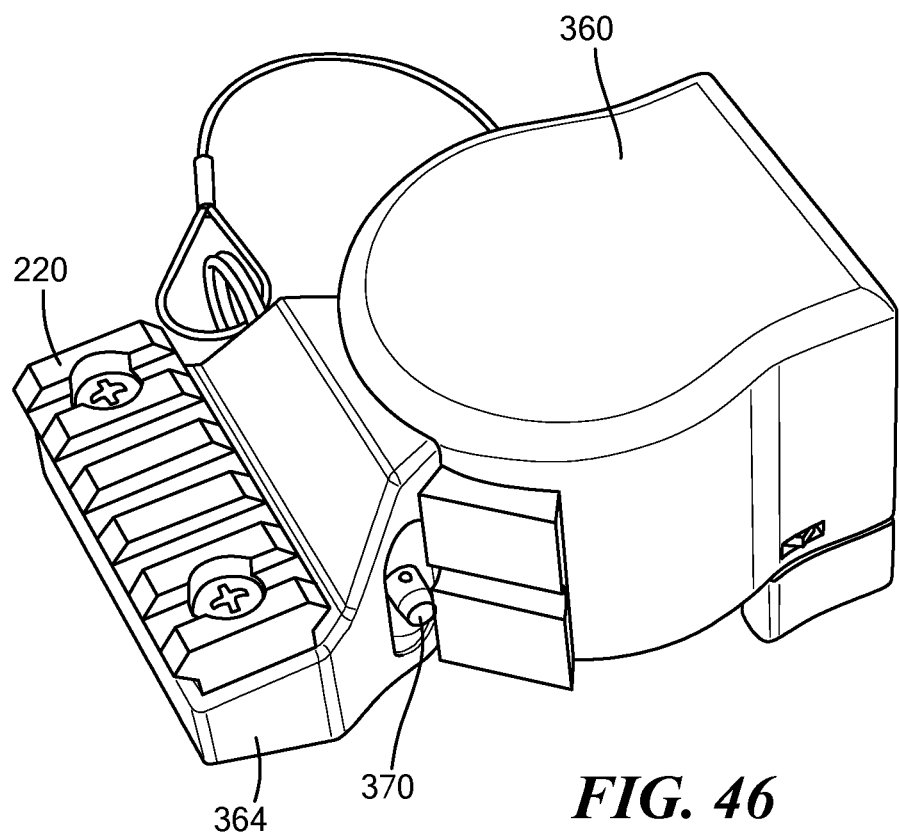

FIG. 43 shows rearward camera assembly mount platform 32 pivotable about shaft 340 and including Picatinny rail 220 for the camera assembly. Again, the latch mechanism includes a slide 326 releasably engaging half ball member 320c upstanding from the top of chassis 12 to lock platform 32 to the top of the chassis. When the handle is pushed, ball 320c is released and the plate 32 pivots via shaft or pin 340 when upon slide 326 engages ball 320d to releasably maintain the plate 32 in its folded pivoted position with the camera assembly stored underneath the chassis. FIG. 43 also shows electrical connection 221 for the camera assembly and also an optional forward camera 350.

Figure 47:
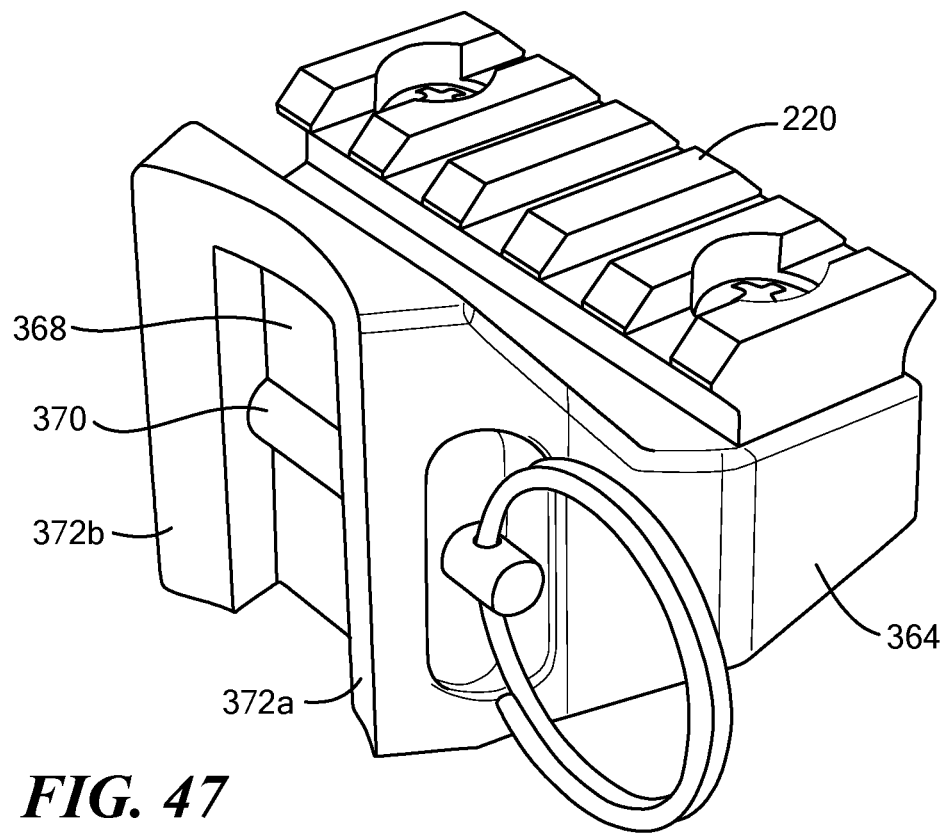
Figure 48:
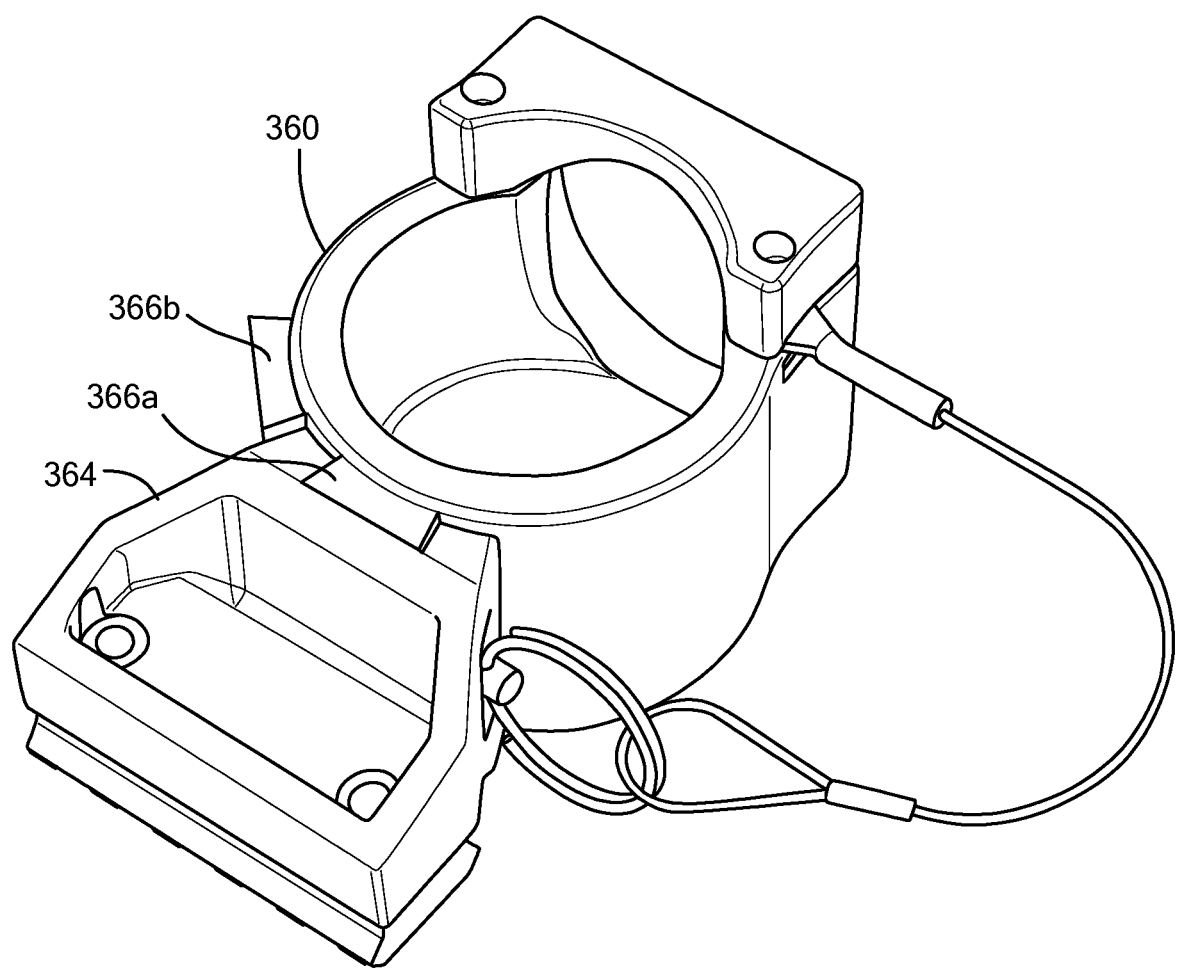
Figure 49:
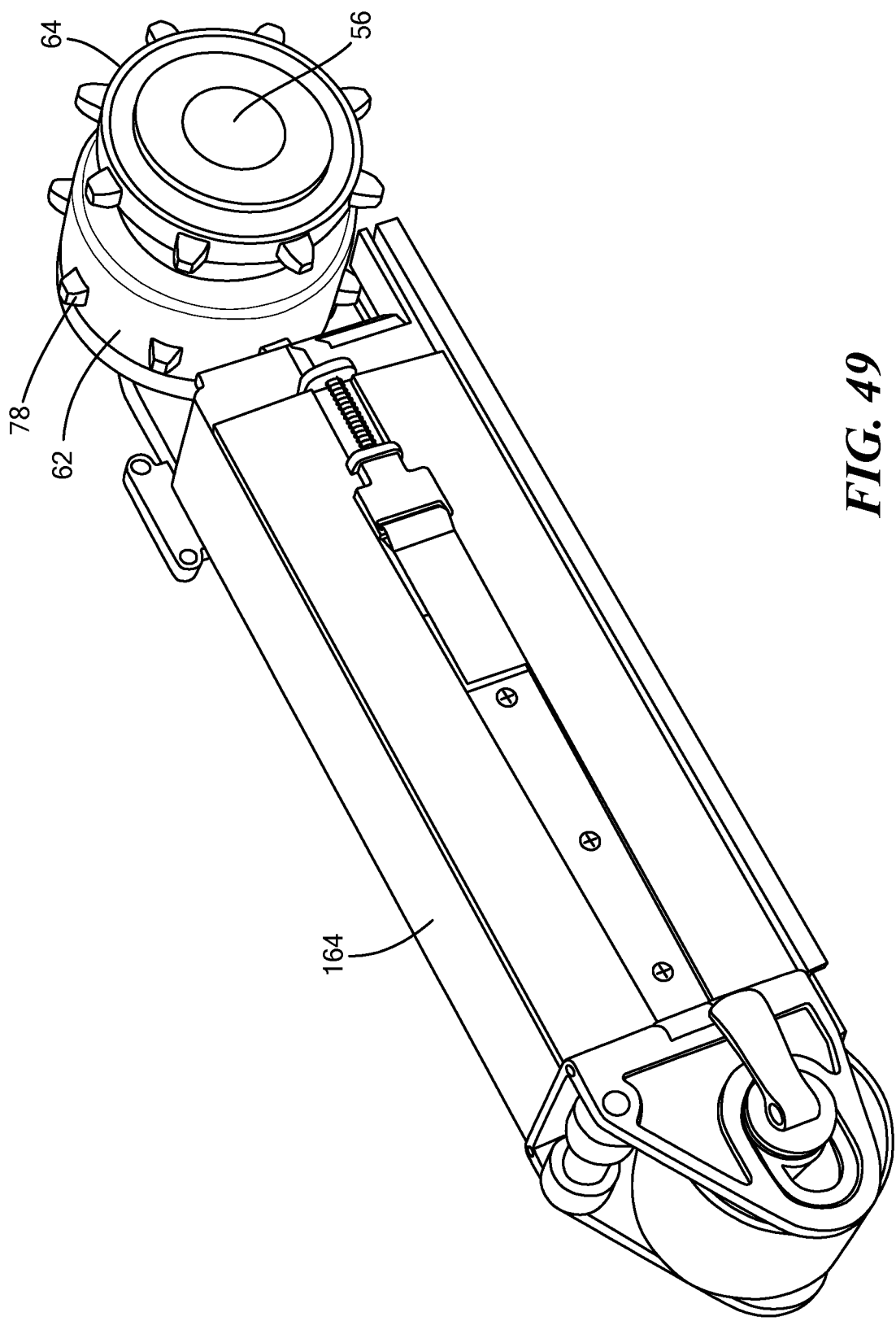
FIGS. 49-52 are schematic views showing a preferred tensioning mechanism for the main tracks.

One reliable way to mount camera assembly 20, FIG. 32 to arm shoulder 200 (FIG. 30) as shown in FIG. 31A is to place a Picatinny rail or similar mount on top of shoulder 200. Another preferred method includes using a socket member configured to engage and cover the robot arm shoulder. FIGS. 44-48 show socket member 360 and bracket clamp 362 configured to releasably and reliably mount socket member 360 to the robot arm shoulder. Further included is mount member 364 which mounts to socket member 360 and includes Picatinny rail 220 or a similar mount for the camera assembly. Various joining schemes may be used to vary the position of mount 364 relative to socket member 360. See also FIGS. 31A-31B. In the specific examples shown, dovetail mounts 366a and 366b, FIGS. 44-48 are located on the sides of socket member 360 and mount member 364 includes a channel 368 which engages mounts 366a or 366b. Pin 370 can be used to more securely releasably fasten mount 364 to socket member 360. As shown in FIG. 47, pin 370 extends through the sidewalls 372a, 372b of channel 368 and through grooves 374, FIG. 44 of dovetail mount 366.

In this way, the camera assembly can be adjusted relative to the robot arm shoulder for viewing, folding of the arm, stair climbing and the like. By mounting the camera assembly to the arm shoulder, operations where the arm is used to pick up items located 360° about the robot is now more easily visualized by the operator viewing screen 245, FIG. 34 of OCU 240 which shows images captured by the camera assembly.

FIGS. 49-52 show a preferred side pod 164 for a main track. Rotor 62 rotates the main track and sprocket 64 rotates the flipper track. Slip clutch 56 is fixed to the flipper arm and rotates the flipper arm.

Figure 50A:
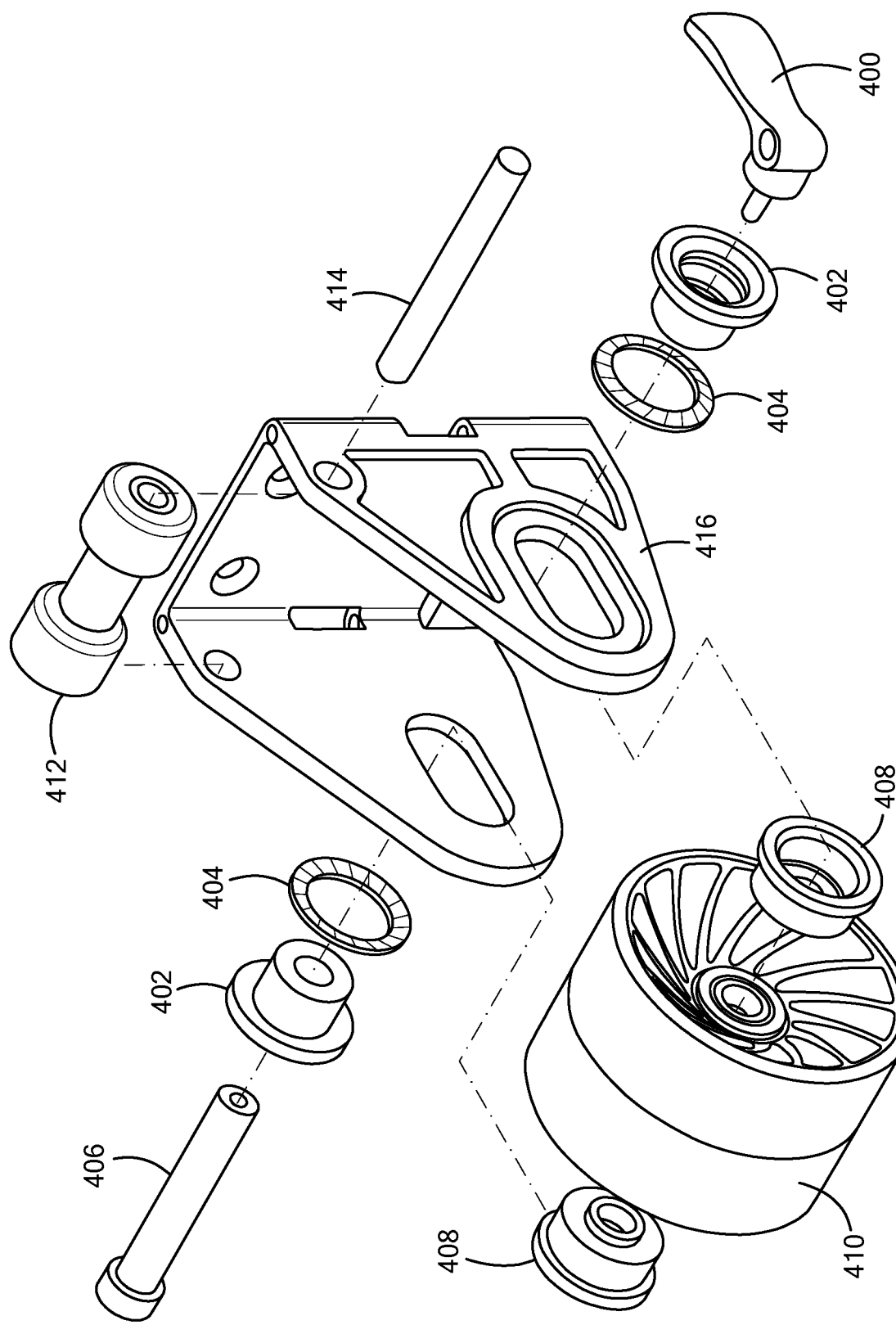
Figure 52:
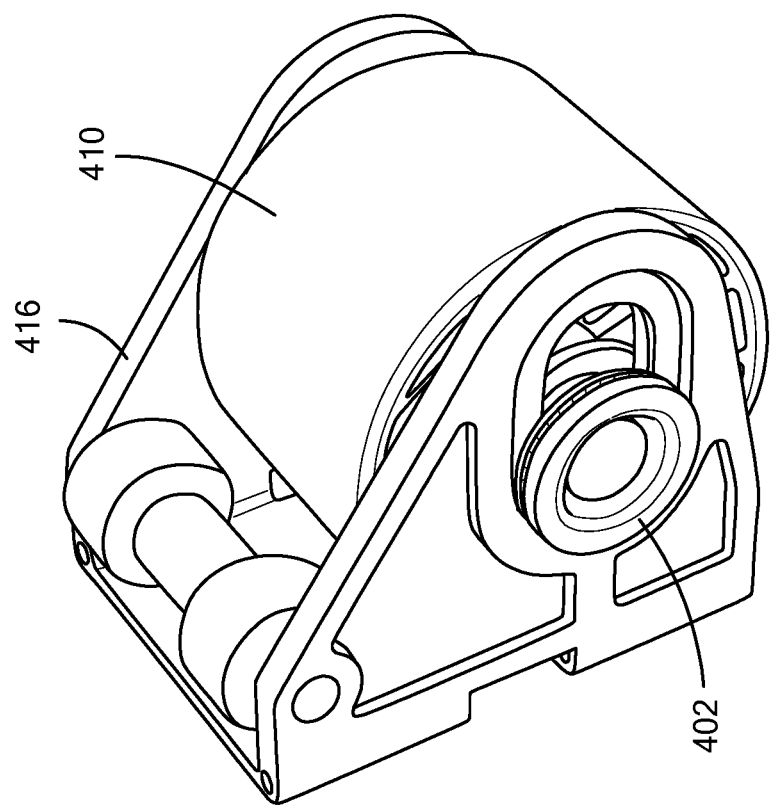
Figure 51:
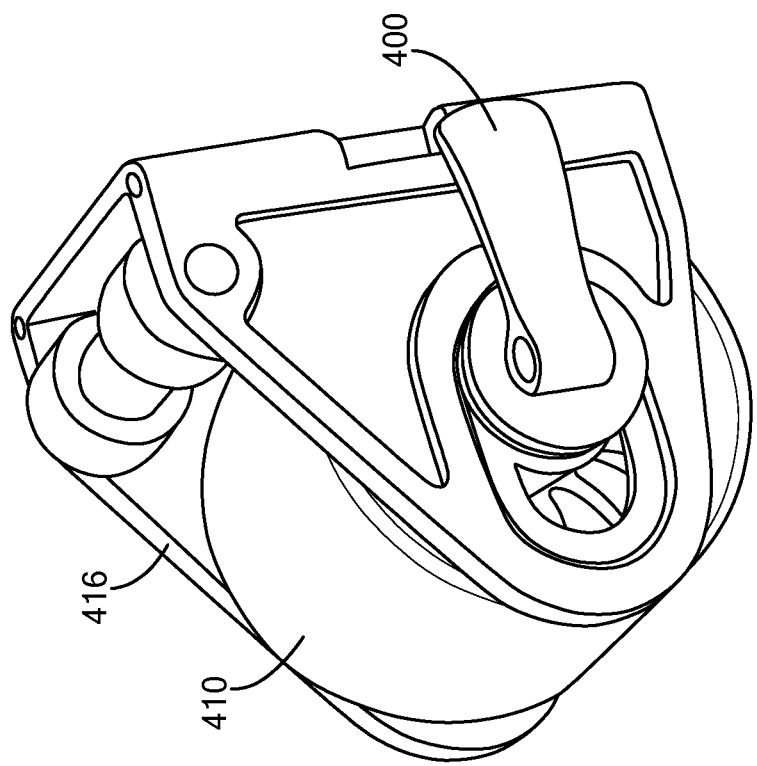

FIG. 50A shows an exploded view of the tensioning mechanism for the main side track. The main bogey wheel 410 rolls on the bogey wheel axle shaft 406, held in place by main bogey spacers 408. Clamping handle 400 attached to the end of the bogey wheel axle shaft 406 applies a clamping force on or release the clamping force the on the main tensioner assembly, composed of a spacer collar 402 and a serrated washer 404. The clamping force on the serrated washers 404 sets their position on the main track tensioner housing 416, fixing the position of the main tensioner assembly within the oval slot of the main track tensioner housing 416, holding the track in tension. FIG. 50B further shows the clamping handle 400 in the tensioned and released states, also showing the position of the main track 14 in relation to the main track tensioner.

Figure 53:
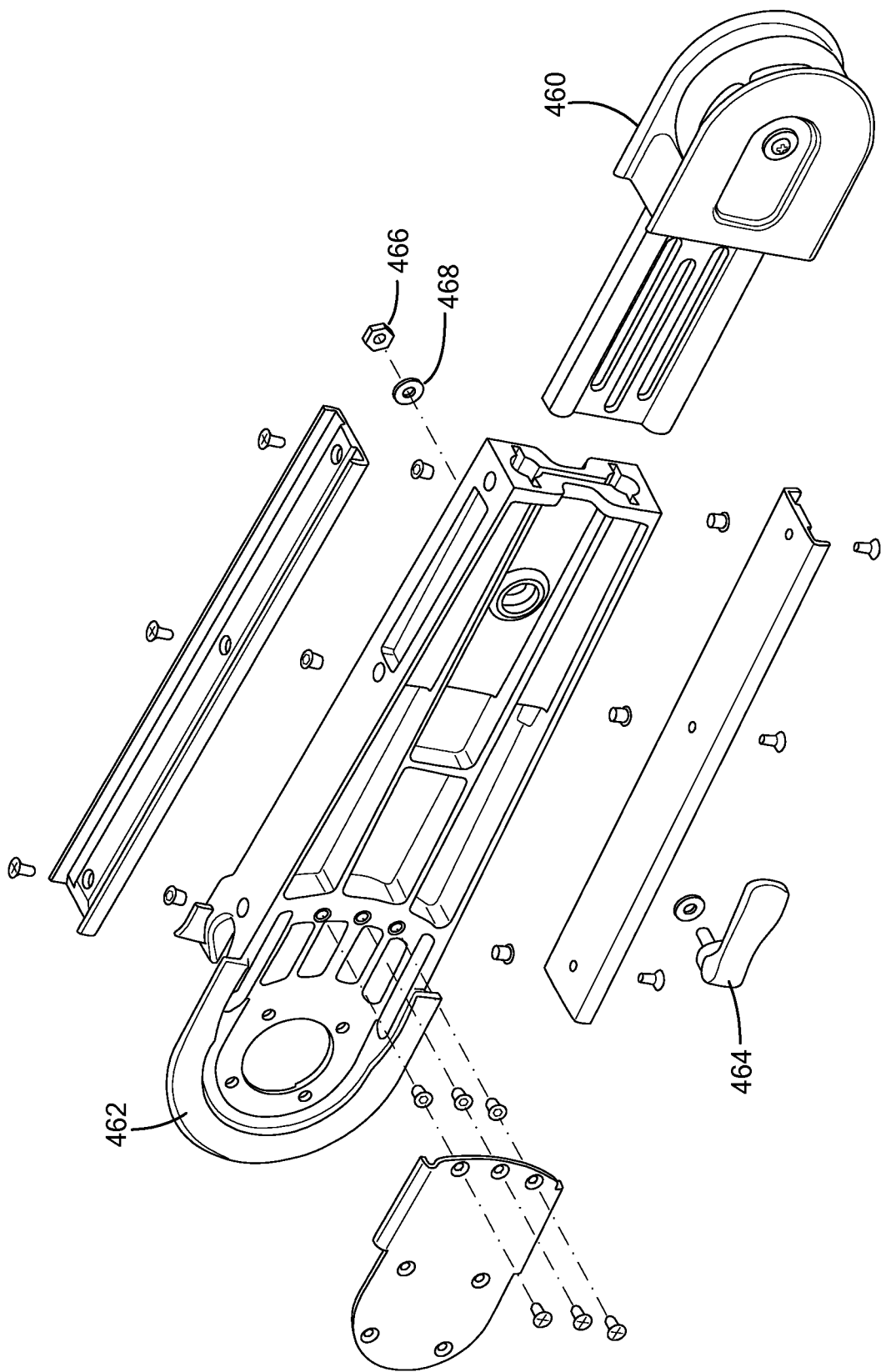
FIGS. 53-56 are schematic views showing a preferred tensioning mechanism for the flipper tracks.
Figure 54:
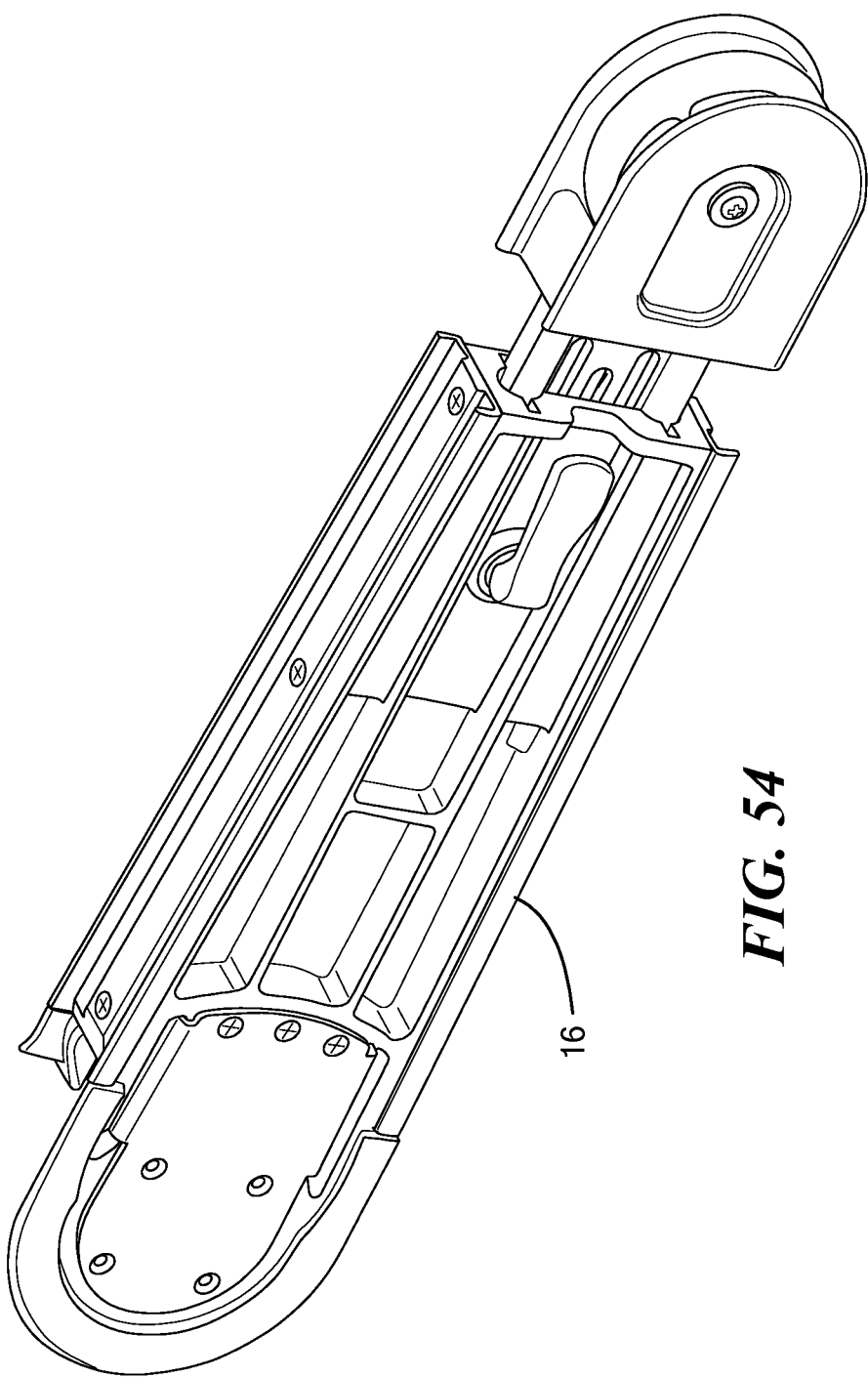
Figure 55:
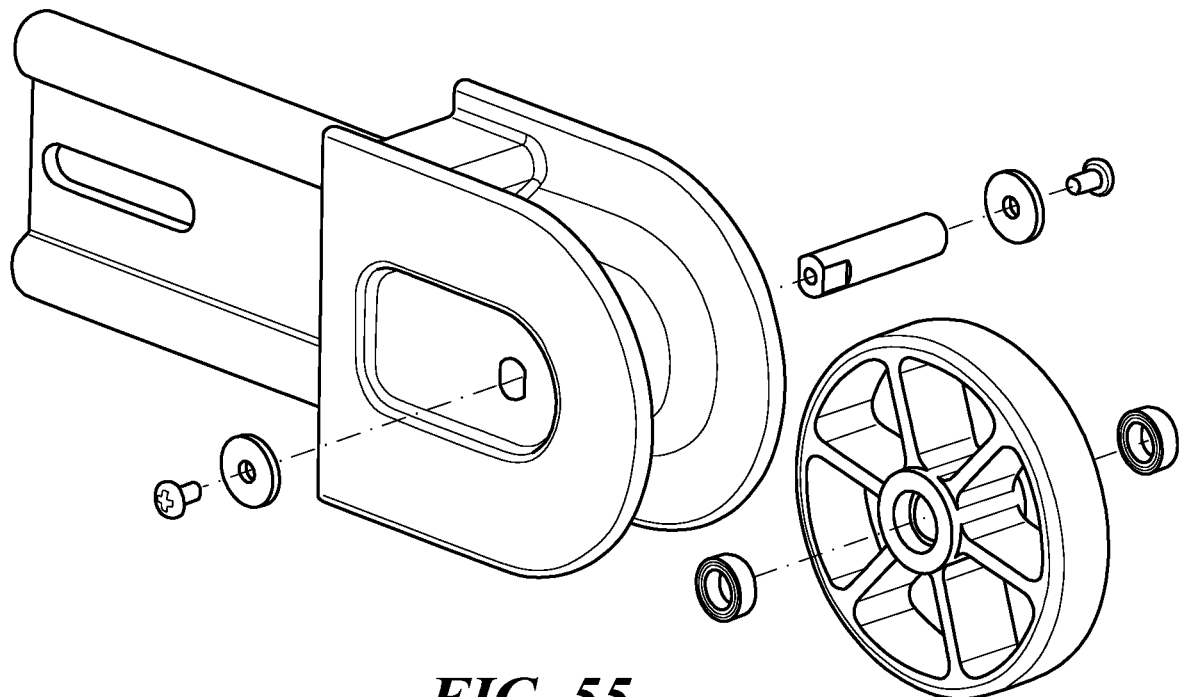
Figure 56:
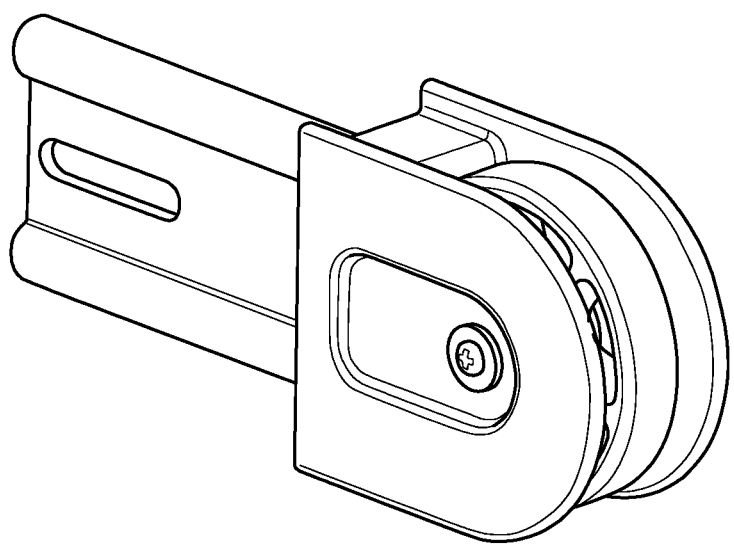

FIGS. 53-56 show a preferred driven rotatable flipper arm 60 about which the flipper track rotates and the preferred flipper track tensioning mechanism. In FIG. 53, the flipper track tensioner wheel assembly 460 moves inside a slot within the flipper arm main housing 462. A clamping handle 464 secured by a bolt 466 and washer 468 fix the position of the flipper track tensioner wheel assembly 460 within the flipper track tensioner wheel assembly 460 when the clamping handle is in the tensioned position. When in the released position, the clamping handle 464 is not engaged and allows the flipper tract tensioner wheel assembly 460 to move freely within its slot so that the flipper track can be tensioned.

Small military robots are powered by military rechargeable lithium ion batteries like the Brentronics BT-70716BG. These batteries have internal circuit breakers that turn off the battery if the current draw from the battery is too large. The fundamental purpose of these circuit breakers is safety—these batteries are a fire hazard without current limiting circuitry.

Small robots, especially those meant to be backpackable, place a high premium on weight. To reduce weight to the greatest possible degree, the system is designed so that the batteries are sometimes run at or near the current limit. For these small robots, the circuit breakers can be the cause of mission failure if slightly too much current is drawn and the battery circuit breaker is tripped.

Figure 57:
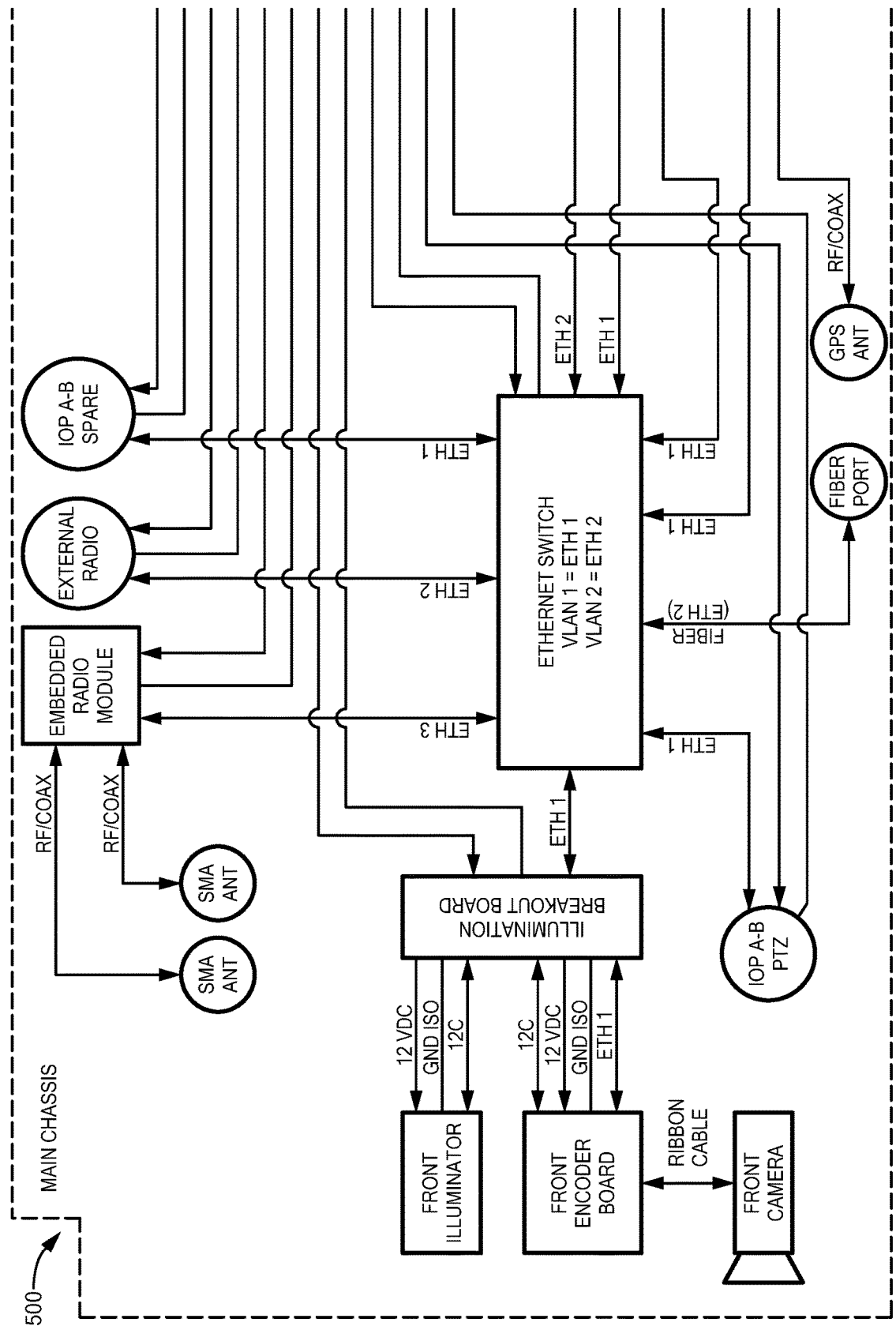
FIGS. 57-58 are electrical diagrams for the various subsystems associated with the electronics section.
Figure 57:
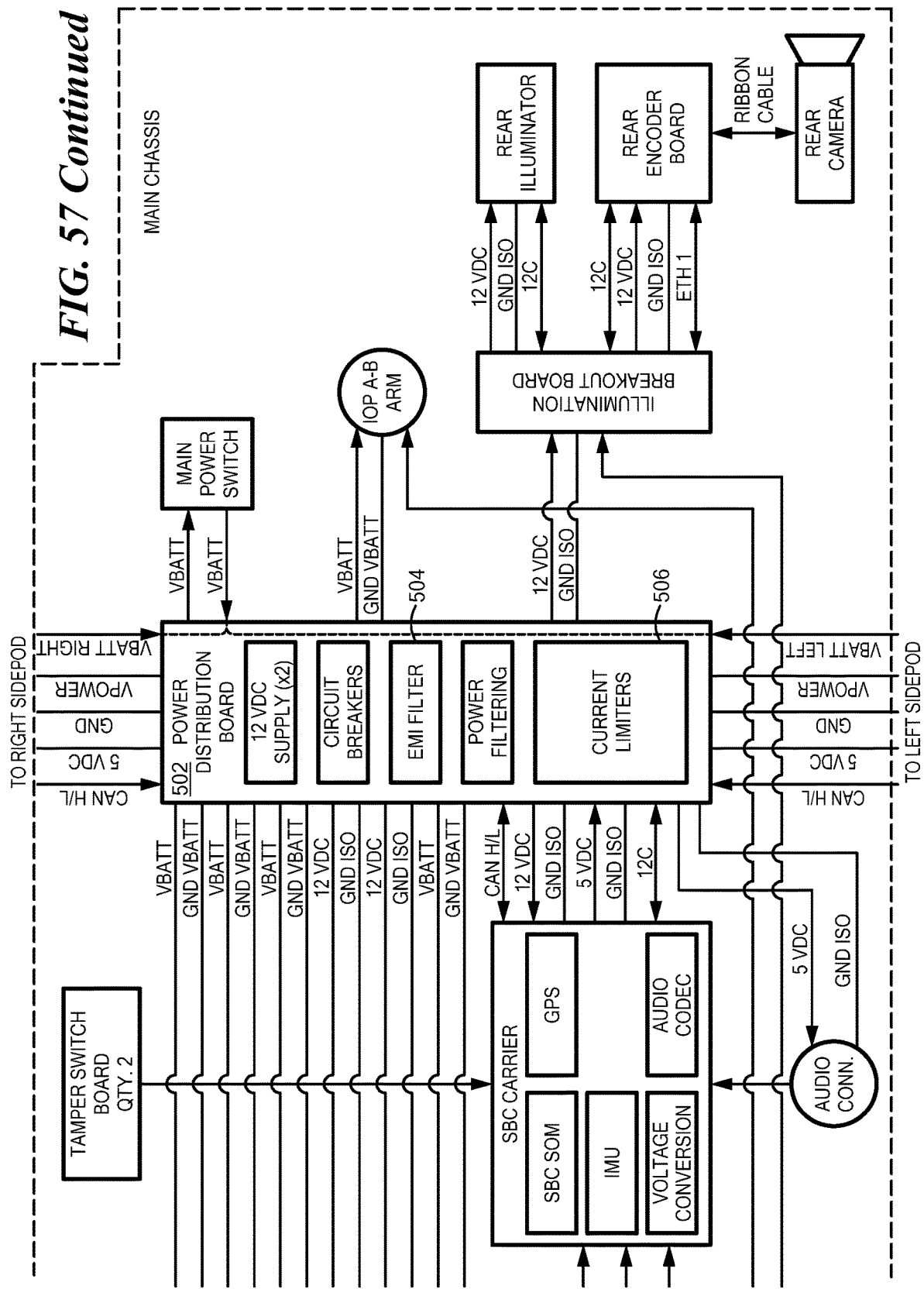
Figure 58:
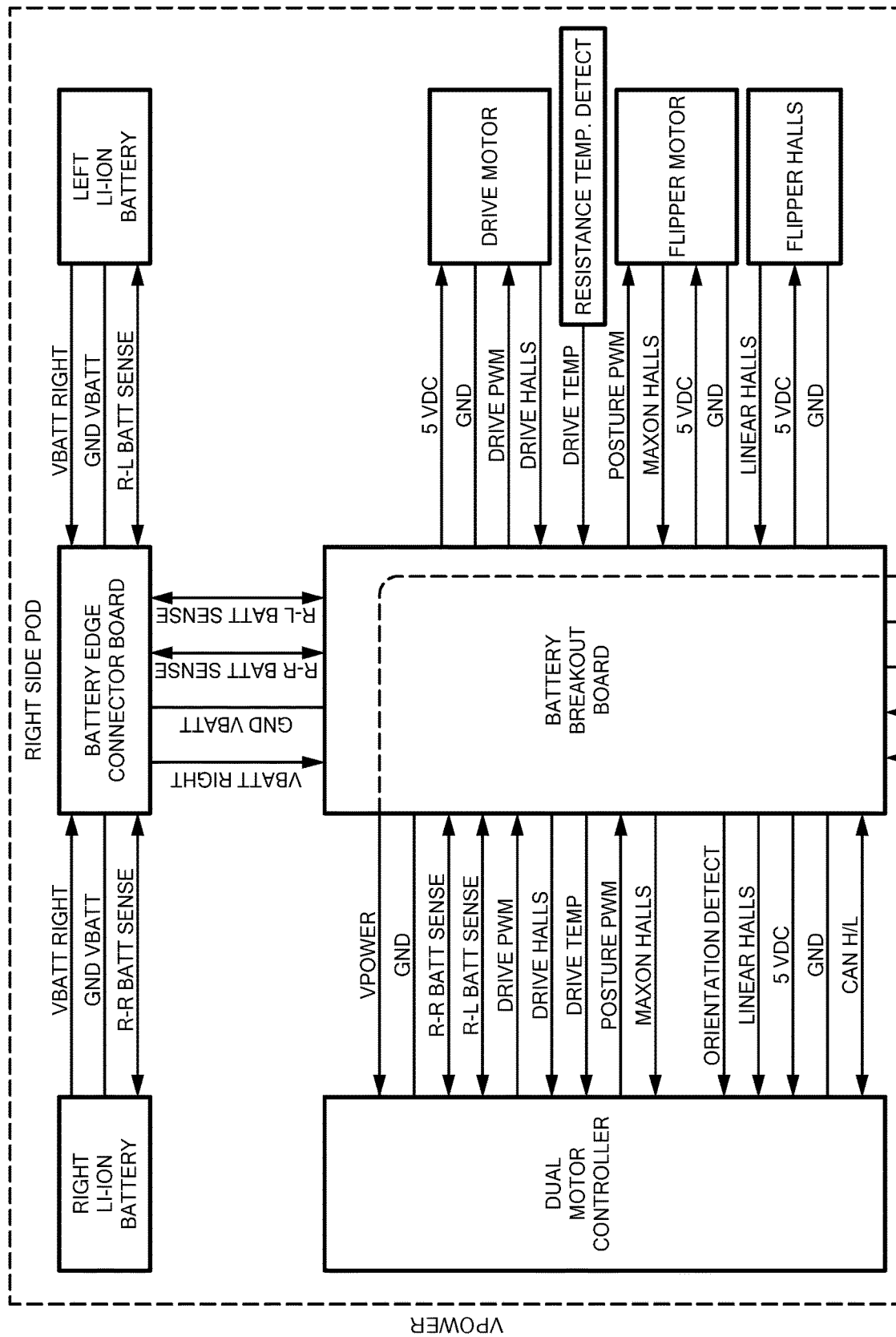

FIGS. 57-58 depict various aspects of the preferred electronics section 500 of the robot mounted to the robot chassis. Featured is a power distribution board (PDB) with two current-limiting stages.

The first stage both balances the current draw between parallel banks of batteries and limits the current draw to any one bank to a current level slightly below the battery's current limit. Rather than cutting off when the current limit is reached, the power distribution board lowers the output voltage of the power distribution board to maintain the current at the board's current limit. The robot's computers and internal electronics are powered off of the first stage.

A second current limiting stage limits current to the robot's drive motors at a slightly lower current level. The lower current level assures that enough power is available to run the robot's electronics (i.e. that the drive motors don't hog all available power under power limiting conditions). The second stage also protects against regenerating power back into the batteries, another phenomenon that can cause the battery circuit breakers to trip.

A companion algorithm in the software of the drive motor controllers configured to throttle back the current demanded by the motor controllers when limits are reached, allowing the greatest efficiency possible under current limiting conditions.

The purposes of the PDB and associated motor control algorithms are:
  Hard limiting of the current out of any battery at a level slightly less than the battery's shut-off current
  Balance load between parallel banks of batteries (i.e. both battery banks power all loads, and the load current is split equally between battery banks)
  Protect essential loads (i.e. robot's main computer and radio) from under-voltage during current limiting conditions
  Protect from regenerating power back to the batteries
  Throttle back drive motor demand under current limiting conditions to obtain the highest possible power applied to the motors.
  Other goals of the design are:
  Achieve the desired functionality with as low a weight as possible
  Achieve the desired functionality with as high an efficiency as possible.

In the preferred embodiment, each current limiter is based on a Linear Technologies LT4363 "High Voltage Surge Stopper with Current Limit" along with an LTC4357 "Positive High Voltage Ideal Diode Controller" to stop power from flowing regeneratively to the batteries (and causing them to fault out). The LT4363 limits current by
  Sensing the current sourced by the battery
  Controlling the gate of an N-channel MOSFET to vary the resistance of the MOSFET. Depending on the voltage applied to the gate, the resistance of the MOSFET can vary from its on resistance of 1's of mΩ up to many Ml when turned off. Under overcurrent situations, the LT4363 selects the resistance of the MOSFET to cap the output current at the specified maximum level.

The LT4363 includes a line that communicates between the current limiters, allowing the limiters to approximately share current even under non-current-limiting conditions. This extra connection allows the two LT4363s to share the same output voltage feedback and regulate to the same voltage level.

Associated algorithms take place on the Single Board Computer (SBC) and the Dual Motor Controller (DMC) shown in FIG. 58. The SBC measures the battery voltage at a relatively low rate, and the DMC regulates the voltage at a relatively high rate.

At a rate of 50 Hz, the SBC queries sensors that measure the voltage of both battery banks. The SBC then takes the higher of the two sensed voltages to be $V_{batt}$, the battery voltage. The SBC then computes a value be used as a voltage limit ($V_{min}$), defining the voltage at which voltage sag mitigation algorithms in the DMCs are enabled. Limit $V_{min}$ is defined as:

$$V_{min} = V_{batt} - V_{irdrop} \quad (1)$$

where $V_{irdrop}$ is the approximate value of resistive voltage drop across the robot's wiring harness under maximum current conditions. In the typical case, $V_{batt}$ is on the order of 24V, and dV is on the order of IV.

The DMC in each side pod controls the side pod's associated drive motor and flipper motor. The DMC measures its supply voltage, $V_{pdb}$, which is essentially the voltage at the output of the second current limiting stage. To limit current, the current limiting stage drops the $V_{pdb}$ to whatever voltage regulates the output current at the current limit.

The DMC commands voltage $V_{cmd}$. Voltage command $V_{cmd}$ is generated by a feedback control loop that attempts to regulate motor speed to a commanded value.

The goal of the voltage sag mitigation algorithm in the DMC is to reduce the demanded voltage, thereby reducing the required current, so that the voltage sag condition abates. The actions of the voltage sag mitigation tend to control voltage $V_{pdb}$ to equal voltage $V_{min}$ under current limiting conditions.

The voltage that is actually commanded by the DMC to the drive motor windings is denoted as $V_{out}$. Nominally (under conditions where no limiting is present), $V_{out}$ is equal to $V_{cmd}$. However, under limiting conditions, an algorithm defined by the following pseudocode is used to reduce $V_{out}$ to mitigate voltage droop:

```
if (Vpdb < Vmin)
    // Knock down the commanded voltage magnitude
    // if a voltage sag is indicated
    Vout = Vout - sign(Vout) * dV;
}
else{
    // Slew Vout so that Vout is the same is Vcmd
    Vout = Vout + sign(Vcmd - Vout) * dV;
}
```

This code runs at a high rate (typically 15 kHz) versus a fairly low rate of command update (typically 100 Hz). The dV voltage step is about 1% of the full range voltage so that any change in $V_{cmd}$ is traced by $V_{out}$ in the time between successive updates of $V_{cmd}$.

Although the current limiters are linear devices (rather than switching devices), power dissipated in the current limiters is very low due to the actions of the DMC voltage limiting algorithms.

The PDB is relatively lightweight. The design avoids bulky magnetics, which would be needed for switching voltage regulators (an alternate topology to achieving similar ends).

The PDB solution is highly efficient. Under normal conditions, the only losses are small conduction losses across the various MOSFET switches in the current limiters, typically 1's of milliOhms. Under normal conditions, efficiency is about 99%, higher than a switching voltage regulator which typically has an efficiency of about 85%.

Second current-limiting stage ensures that vital electronics loads are never "browned out" under conditions in which the drive motors draw high power.

The voltage sag algorithm occurs whether the 14 A OR the 8 A limit are reached, and whichever happens first. This attribute acts as a de facto "graceful degredation" in the case of a failed battery bank. When only one battery bank is installed, the 14 A limit of the second stage can never be reached. However, the DMC algorithm still sees and responds to sags due to the 8 A current limiting in the first current limiting stage.

Figure 61:
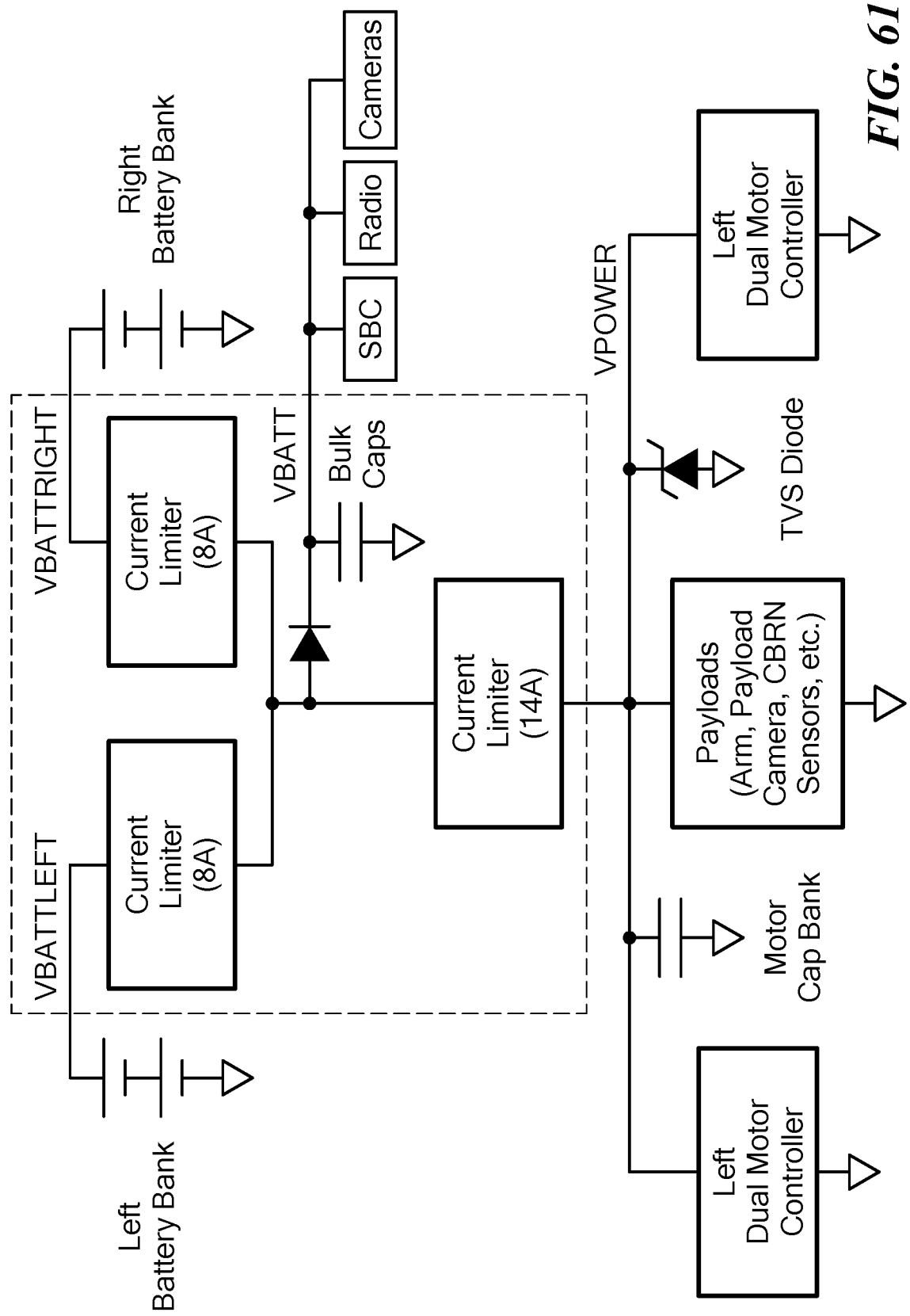
FIG. 61 is a schematic diagram showing a preferred power distribution board.

One power distribution subsystem (FIG. 61) includes a first stage configured to provide current to the robot electronics section, balance the current draw from the first and second batteries to said electronics section and drive motors, and limit the current draw from the first and second batteries to a second level less than the first current level.

Figure 60:
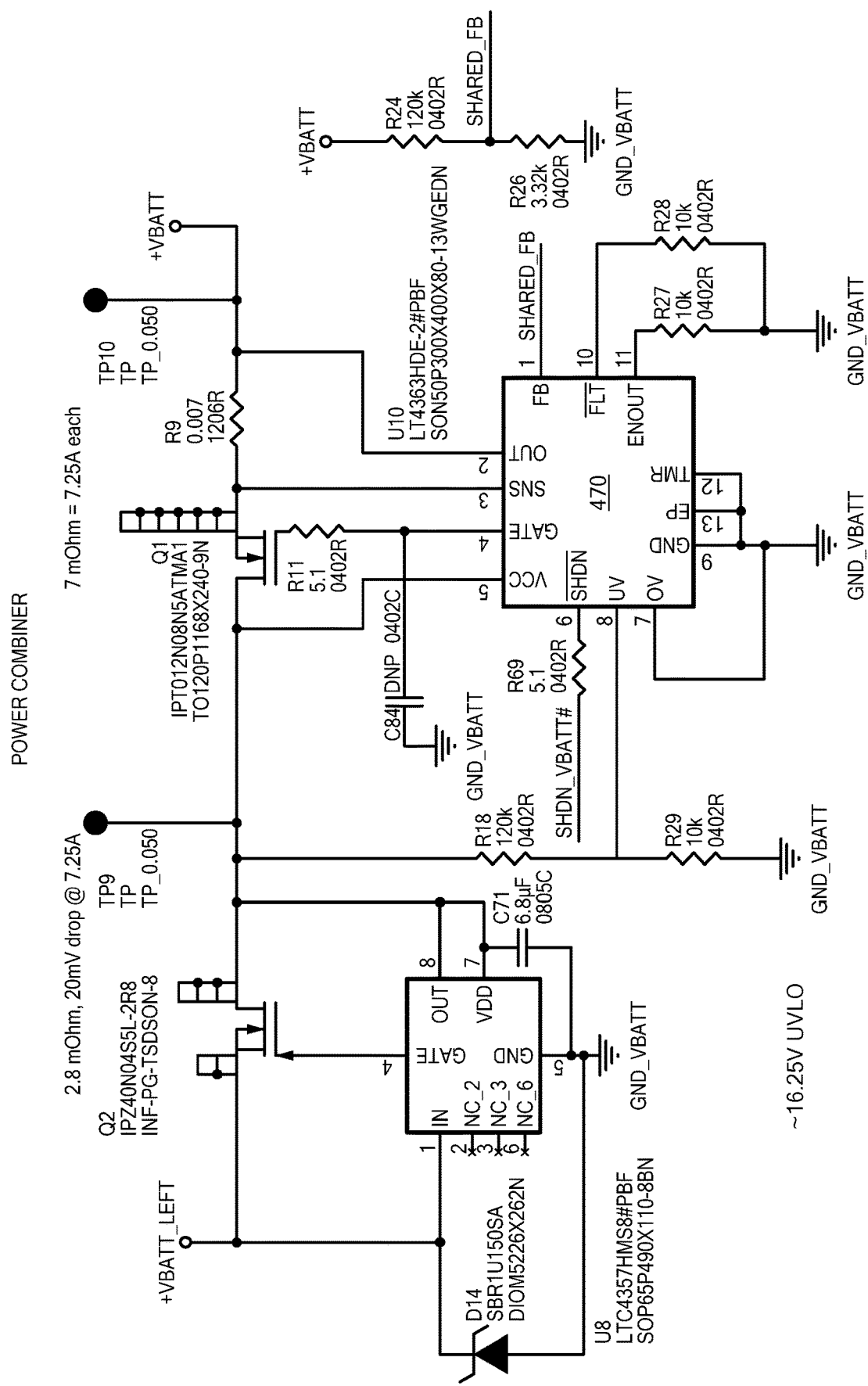
Figure 60:
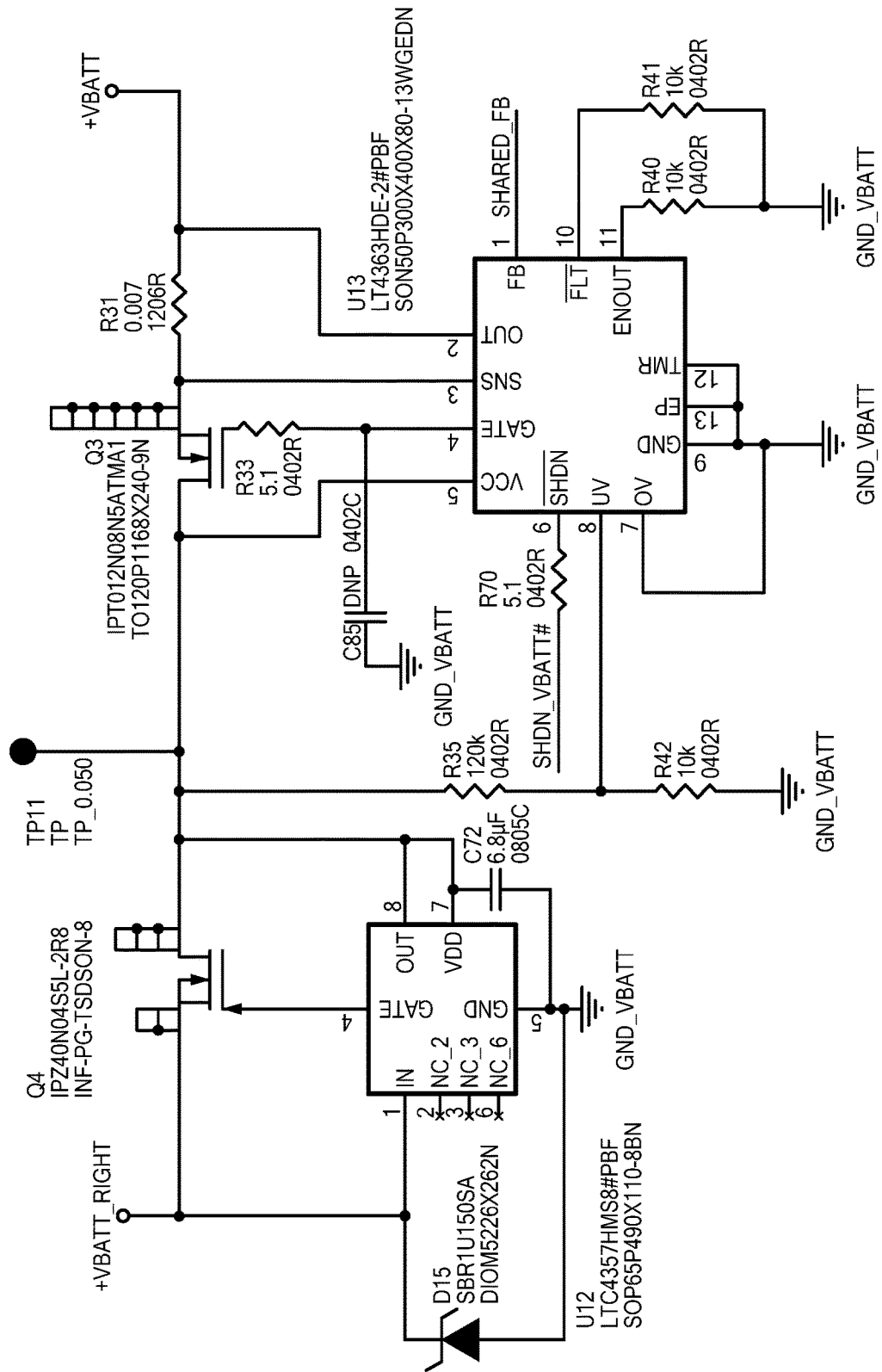

See the current limiting controller 470, FIG. 60.

Figure 59:
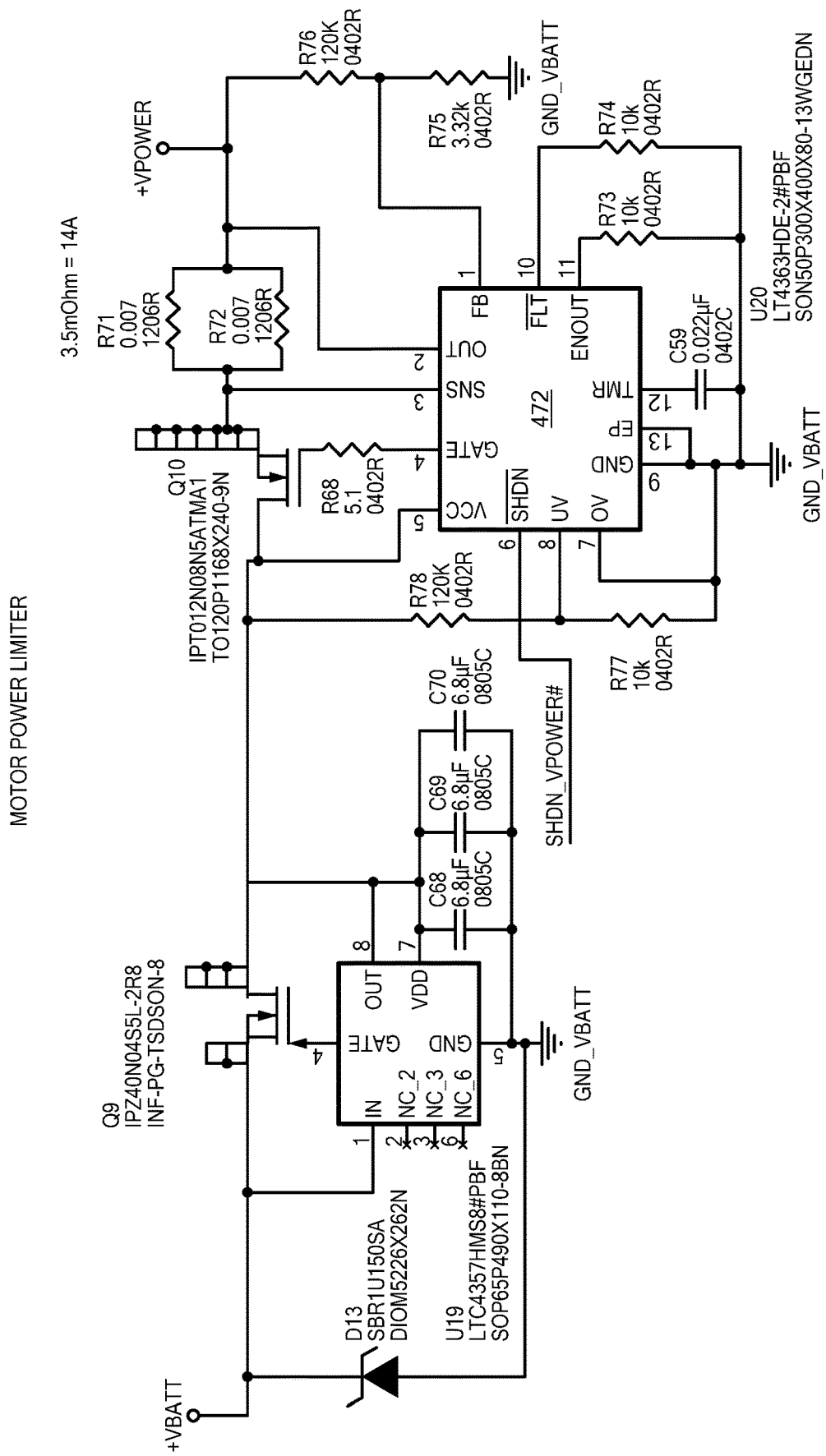
FIGS. 59-60 are schematic diagrams showing a preferred electronics section power distribution scheme.

A second stage (see FIG. 59) is configured to provide current to the robot drive motors, and limit said current draw to a third level less than said second level. See the current limiting controller 472.

Although specific features of the invention are shown in some drawings and not in others, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant cannot be expected to describe certain insubstantial substitutes for any claim element amended.

Other embodiments will occur to those skilled in the art and are within the following claims.

What is claimed is:

1. A remotely controlled packable robot comprising:
   a chassis with a top surface and a bottom surface;
   a motive subsystem for maneuvering the chassis;
   an open channel under the robot defined by the bottom surface of the chassis and the motive subsystem;
   a camera assembly;
   a robot arm including a rotatable shoulder, an upper arm pivotable with respect to the shoulder, a forearm, an elbow between the upper arm and the forearm, a wrist connected to the forearm, and a gripper attached to the wrist;
   a rearward arm base member mount between the chassis and the rotatable arm shoulder and pivotable with respect to the chassis to store the arm underneath the robot in said open channel;
   a forward camera assembly base member mount for the camera and pivotable with respect to the chassis to store the camera assembly underneath the robot in said open channel; and
   a camera mount for retaining the camera assembly on the shoulder of the robot arm.

2. The robot of claim 1 in which said camera mount includes a socket member configured to engage and cover the robot shoulder.

3. The robot of claim 2 in which the camera mount further includes a camera mount member associated with the socket member.

4. The robot of claim 3 in which the camera mount further includes means for selectively positioning the camera mount member relative to the socket member.

5. The robot of claim 4 in which said means for selectively positioning includes two or more dovetail members on a side of the socket member and a channel in the camera mount member receiving a dovetail of the socket member therein.

6. The robot of claim 3 in which the camera mount member includes a rail thereon and the camera assembly includes a clamp member securable to said rail.

7. The robot of claim 1 in which the camera assembly includes a spring portion for absorbing shock forces imparted at the camera assembly.

8. The robot of claim 1 further including a latch assembly for the rearward arm base member mount.

9. The robot of claim 8 in which the latch assembly includes at least one ball portion on a stem upstanding from the chassis top surface and a biased slide moveable with respect to the rearward arm base member mount and including a channel receiving the ball member therethrough and terminating in a blade engaging the stem and the underside of the ball.

10. The robot of claim 1 further including a camera mount latch assembly for the forward camera assembly base member mount.

11. The robot of claim 10 in which the camera mount latch assembly includes at least one ball member on a stem upstanding from the chassis top surface and a biased slide member movable with respect to the base member mount and including a channel receiving the ball member therethough and terminating in a blade engaging the stem and an underside of the ball.

12. The robot of claim 11 further including a latch assembly for releasably securing the forward camera assembly base member mount in its pivoted position.

13. The robot of claim 12 in which said latch for retaining the forward camera assembly base member mount in its pivoted position includes a second ball member mounted to a sidewall portion of the chassis.

14. The robot of claim 1 further including rotatable flipper EMS for maneuvering the chassis.

15. The robot of claim 1 in which the motive subsystem includes right and left main tracks.

16. The robot of claim 15 in which the flipper arms each include a track.

17. The robot of claim 16 further including an integrated drive assembly for each main track and flipper pair including:
   a motor in a housing for rotating a flipper, and
   a stator and rotor disposed about the housing for driving a main track and a flipper track.

18. The robot of claim 17 further including a slip clutch attached to a flipper arm and driven by said motor via a gear train.

19. The robot of claim 17 in which the stator is affixed about the housing and includes teeth with windings thereabout.

20. The robot of claim 19 in which the rotor includes exterior teeth driving a main track.

21. The robot of claim 19 further including a sprocket attached to the rotor driving a flipper track.

22. The robot of claim 17 in which the rotor rotates about the housing and includes magnets therein.

23. The robot of claim 1 further including a skid plate for each main track.

24. The robot of claim 1 further including:
   an electronics section;
   drive motors for the motive subsystem;
   first and second batteries each including a current draw limiting circuit preventing further power draw from the battery if the battery current draw exceeds a first current level; and
   a power distribution subsystem associated with the electronics section and including:
   a first stage configured to:
   provide current to the robot electronics section, balance the current draw from the first and second batteries to said electronics section and drive motors, and limit the current draw from the first and second batteries to a second level less than the first current level, and a second stage configured to:
provide current to the robot drive motors, and
limit said current draw to a third level less than said second level.

25. The robot of claim 24 further including a motor controller for each drive motor configured to reduce the motor's power draw when current limiting is detected.

26. A remotely controlled packable robot comprising:
a chassis with a top surface and a bottom surface;
a pair of main side tracks for maneuvering the chassis;
an open channel under the robot defined by the bottom surface of the chassis and the main tracks;
a camera assembly;
a robot arm including a rotatable shoulder;
a robot arm base member mount between the chassis and the rotatable arm shoulder and pivotable with respect to the chassis to store the arm underneath the robot in said open channel; and
a camera mount for retaining the camera assembly on the shoulder of the robot arm.

27. The robot of claim 26 further including a camera assembly base member mount pivotable with respect to the chassis.

28. The robot of claim 27 in which the camera assembly includes a spring portion for absorbing shock forces imparted at the camera assembly.

29. The robot of claim 26 in which said camera mount includes a socket member configured to engage and cover the robot shoulder.

30. The robot of claim 29 in which the camera mount further includes a camera mount member associated with the socket member.

31. The robot of claim 30 in which the camera mount further includes means for selectively positioning the camera mount member relative to the socket member.

32. The robot of claim 31 in which said means for selectively positioning includes two or more dovetail members on a side of the socket member and a channel in the camera mount member receiving a dovetail of the socket member therein.

33. The robot of claim 30 in which the camera mount member includes a rail thereon and the camera assembly includes a clamp member securable to said rail.

34. A remotely controlled packable robot comprising:
a chassis with a top surface and a bottom surface;
a pair of main side tracks for maneuvering the chassis;
an open channel under the robot defined by the bottom surface of the chassis and main tracks;
a camera assembly;
a robot arm;
a rearward arm base member mount between the chassis and the rotatable arm shoulder and pivotable with respect to the chassis to store the arm underneath the robot in said open channel; and
a camera mount for retaining the camera assembly on the robot arm.

35. A remotely controlled robot comprising:
a chassis;
a drive subsystem for the chassis including at least two drive motors;
an electronics section in the chassis;
first and second batteries each including a current draw limiting circuit preventing further power draw from the battery if the battery current draw exceeds a first current level; and
a power distribution subsystem associated with the electronic section and including:
a first stage configured to:
provide current to the robot electronics section,
balance the current draw from the first and second batteries to said electronics section and drive motors, and
limit the current draw from the first and second batteries to a second level less than the first current level, and
a second stage configured to:
provide current to the robot drive motors, and
limit said current draw to a third level less than said second level.

36. The robot of claim 35 further including a motor controller for each drive motor configured to reduce the motor's power draw when current limiting is detected.

* * * * *